(12) United States Patent
Harvill

(10) Patent No.: US 11,733,853 B1
(45) Date of Patent: *Aug. 22, 2023

(54) PARAMETRIC MODELLING AND GRADING

(71) Applicant: Zazzle Inc., Menlo Park, CA (US)

(72) Inventor: Young Leslie Harvill, Olympia, WA (US)

(73) Assignee: ZAZZLE INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/955,394

(22) Filed: Sep. 28, 2022

(51) Int. Cl.
| | |
|---|---|
| G06F 3/04847 | (2022.01) |
| G06T 17/00 | (2006.01) |
| G06F 3/14 | (2006.01) |
| G06F 3/04845 | (2022.01) |
| G06F 3/04815 | (2022.01) |
| G06Q 30/0601 | (2023.01) |
| G05B 13/04 | (2006.01) |
| G06Q 50/04 | (2012.01) |
| G06F 3/04842 | (2022.01) |

(52) U.S. Cl.
CPC ....... *G06F 3/04847* (2013.01); *G05B 13/042* (2013.01); *G06F 3/04815* (2013.01); *G06F 3/04845* (2013.01); *G06F 3/1454* (2013.01); *G06Q 30/0621* (2013.01); *G06Q 30/0643* (2013.01); *G06Q 50/04* (2013.01); *G06T 17/00* (2013.01); *G06F 3/04842* (2013.01); *G06F 2203/04803* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,304,332 B2* | 4/2016 | Fonte | G02C 7/024 |
| 11,455,073 B2* | 9/2022 | Delfino | G06T 19/20 |

(Continued)

*Primary Examiner* — Mandrita Brahmachari
(74) *Attorney, Agent, or Firm* — Patterson & Sheridan LLP; Malgorzata A. Kulczycka

(57) ABSTRACT

In some implementations, a method for custom fitting and manufacturing parametric products comprises generating a plurality of parametric 3D models of a custom product based on past learned data pertaining to the custom product; generating a first user interface comprising at least a first graphical representation of the custom product; receiving a plurality of adjustment 3D parameters for improving a fit of the custom product in relation to user-specific data; determining two particular parametric 3D models of the plurality of parametric 3D models, each having at least one 3D parameter, of the plurality of corresponding 3D parameters, that is within a particular tolerance of at least one 3D parameter of the plurality of adjustment 3D parameters; generating a parametric 3D fit model having a plurality of 3D fit model parameters by interpolating, for the at least one parameter of the two particular parametric 3D models, between a plurality of corresponding 3D control points of a first parametric 3D model and a plurality of corresponding 3D control points of a second parametric 3D model of the two particular parametric 3D models; transmitting the parametric 3D fit model to a manufacturer to cause the manufacturer to produce a parametric physical product based on the plurality of 3D fit model parameters of the parametric 3D fit model.

20 Claims, 31 Drawing Sheets

(56) References Cited

U.S. PATENT DOCUMENTS

| | | | |
|---|---|---|---|
| 2016/0148437 A1* | 5/2016 | Vlutters | G06V 40/172 |
| | | | 382/128 |
| 2017/0039622 A1* | 2/2017 | Chen | G06Q 30/0201 |
| 2017/0312634 A1* | 11/2017 | Ledoux | A63F 13/655 |
| 2018/0197331 A1* | 7/2018 | Chen | G06T 19/20 |
| 2022/0253923 A1* | 8/2022 | Donnelly | G06Q 30/0643 |

* cited by examiner

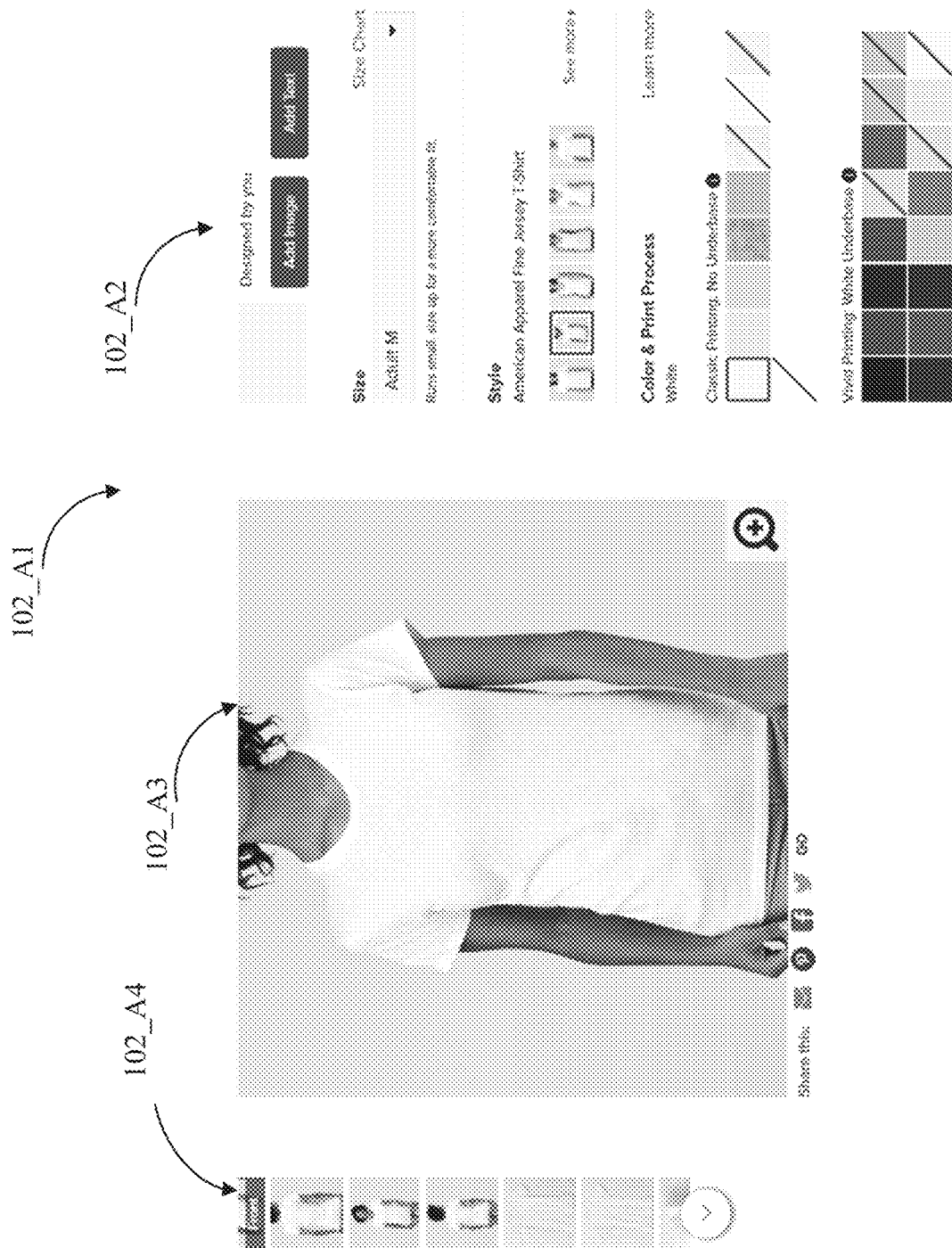
FIG. 1A1

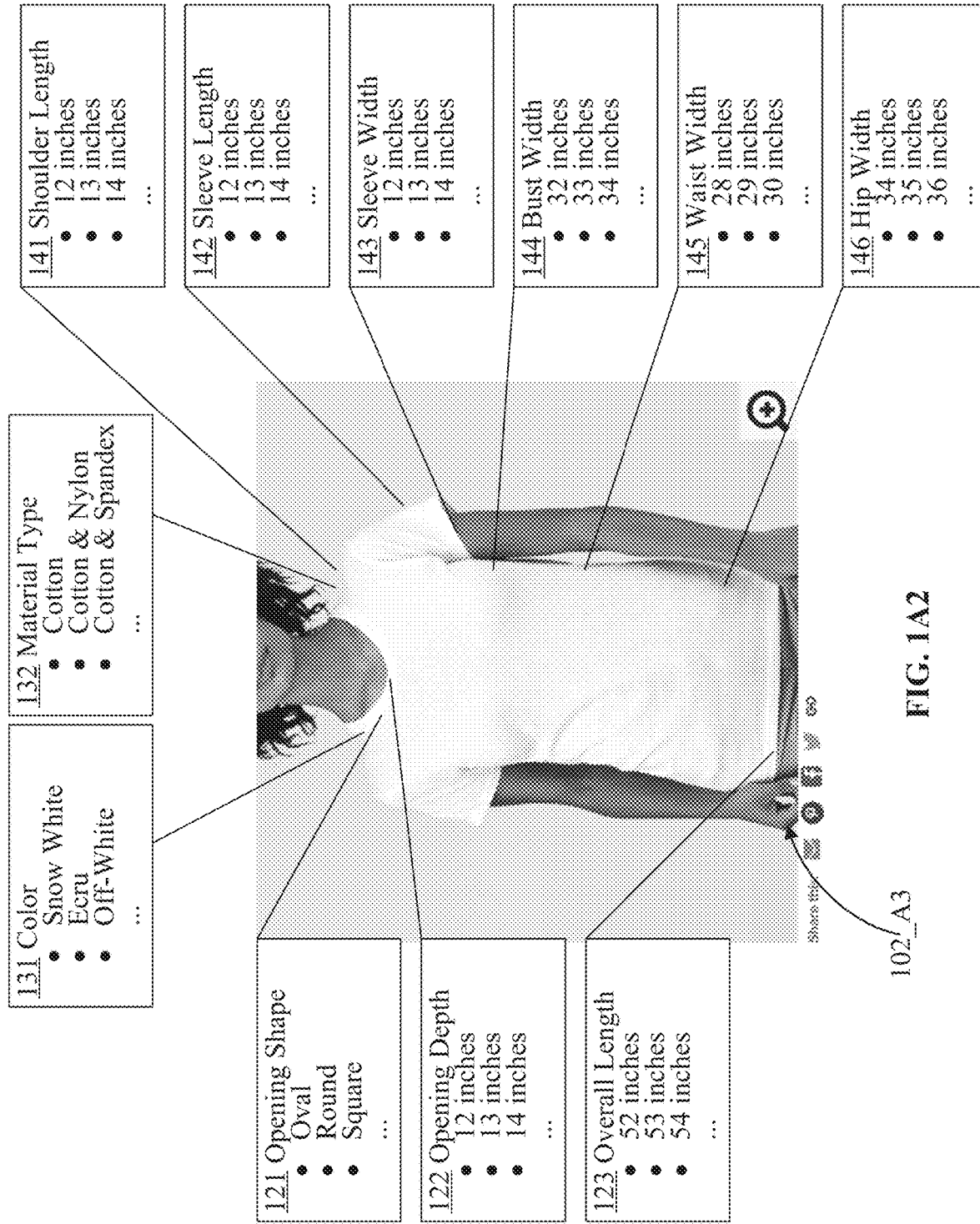
FIG. 1A2

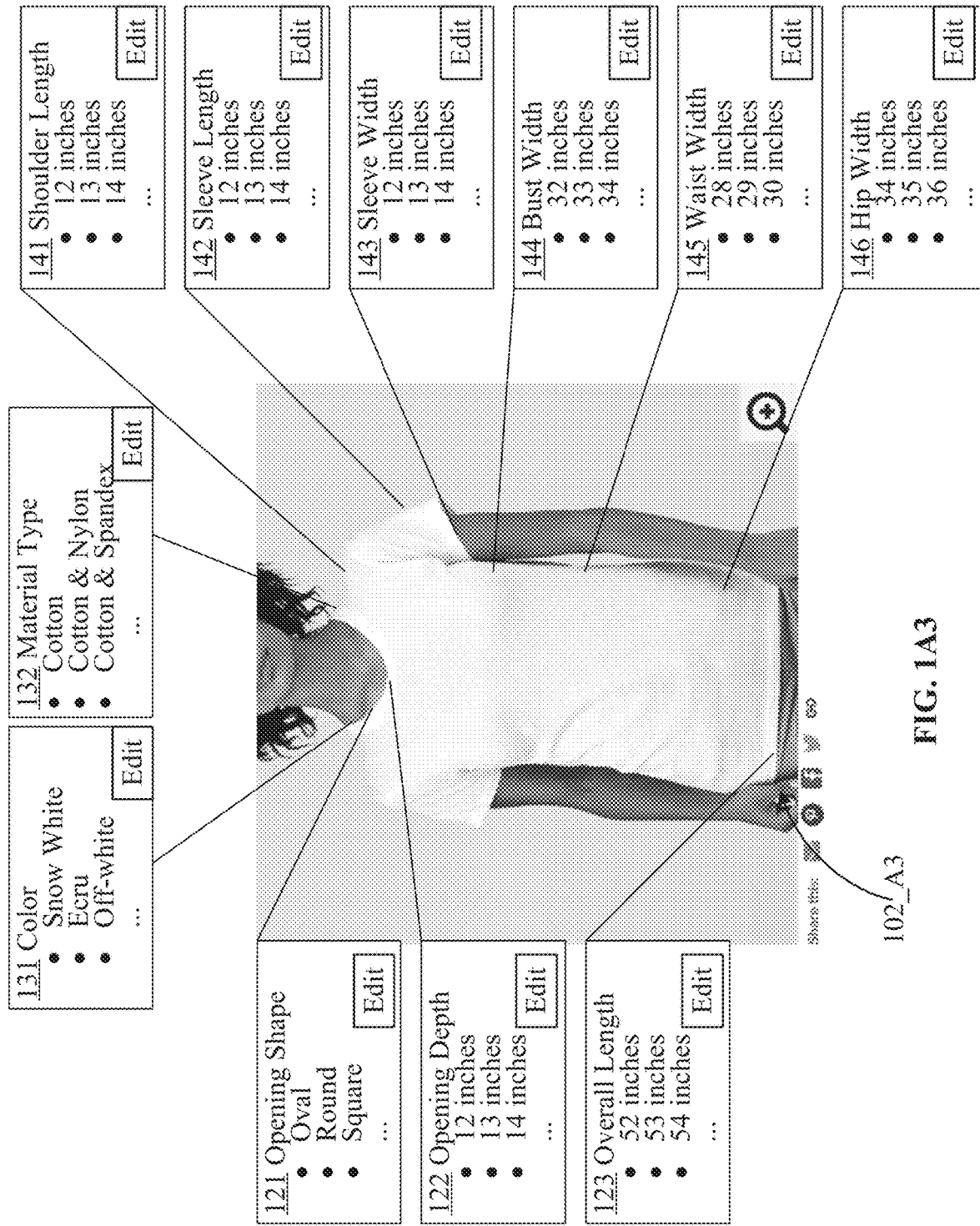
FIG. 1A3

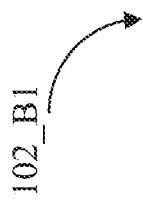
FIG. 1B1

| Subject No | Acromial Ht Sit Lt (in) | Acromial Ht Sit Rt (in) | Bi-lateral Femoral Epicondyle Bth (in) | Bi-lateral Humeral Epicondyle Bth Sit (in) | Bitrochanteric Brth Sit (in) | Buttock to Trochanter Lth (in) | Elbow Ht Sit Lt (in) | Elbow Ht Sit Rt (in) | Femoral Epicondyle Lat to Malleolus Lat Lt (in) | Femoral Epicondyle Lat to Malleolus Lat Rt (in) | Infrapatella Ht Sit Lt (in) | Infrapatella Ht Sit Rt (in) | Trochanter to Femoral Epicondyle Lat Lt | Trochanter to Femoral Epicondyle Lat Rt | Trochanter to Seated Surface Lt (in) | Trochanter to Seated Surface Rt (in) |
|---|---|---|---|---|---|---|---|---|---|---|---|---|---|---|---|---|
| 1 | | | 20.80 | 20.21 | 21.29 | | | | 16.90 | 16.11 | | | 19.05 | 17.79 | | |
| 2 | 25.12 | 25.08 | 17.12 | 23.21 | 17.07 | 5.98 | 12.72 | 12.36 | 15.70 | 16.67 | 31.85 | 31.77 | 17.55 | 17.78 | 4.61 | 4.45 |
| 4 | 23.90 | 23.35 | 16.74 | 22.13 | 15.79 | 6.48 | 12.72 | 11.73 | 16.04 | 14.90 | 30.98 | 30.83 | 15.34 | 16.25 | 4.21 | 4.21 |
| 5 | 24.13 | 23.86 | 16.80 | 21.59 | 15.29 | 6.28 | 11.61 | 10.83 | 16.80 | 17.34 | 32.32 | 32.24 | 17.61 | 18.12 | 5.16 | 4.45 |
| 6 | 24.17 | 23.50 | 16.99 | 22.35 | 16.00 | 6.13 | 12.01 | 11.38 | 16.08 | 15.90 | 30.75 | 30.83 | 17.21 | 17.04 | 4.61 | 4.06 |
| 7 | 25.24 | 24.45 | 19.16 | 24.16 | 16.74 | 6.74 | 13.19 | 12.17 | 16.00 | 16.49 | 32.99 | 32.99 | 17.80 | 18.08 | 5.31 | 5.24 |
| 10 | 22.48 | 21.50 | 17.32 | 20.15 | 15.51 | 6.45 | 11.18 | 10.47 | 14.33 | 14.85 | 30.47 | 30.43 | 17.09 | 17.31 | 5.63 | 5.31 |
| 13 | 22.08 | 21.22 | 14.63 | 19.78 | 14.13 | 6.69 | 9.89 | 9.06 | 16.77 | 16.31 | 29.72 | 29.88 | 17.15 | 16.71 | 5.16 | 5.24 |

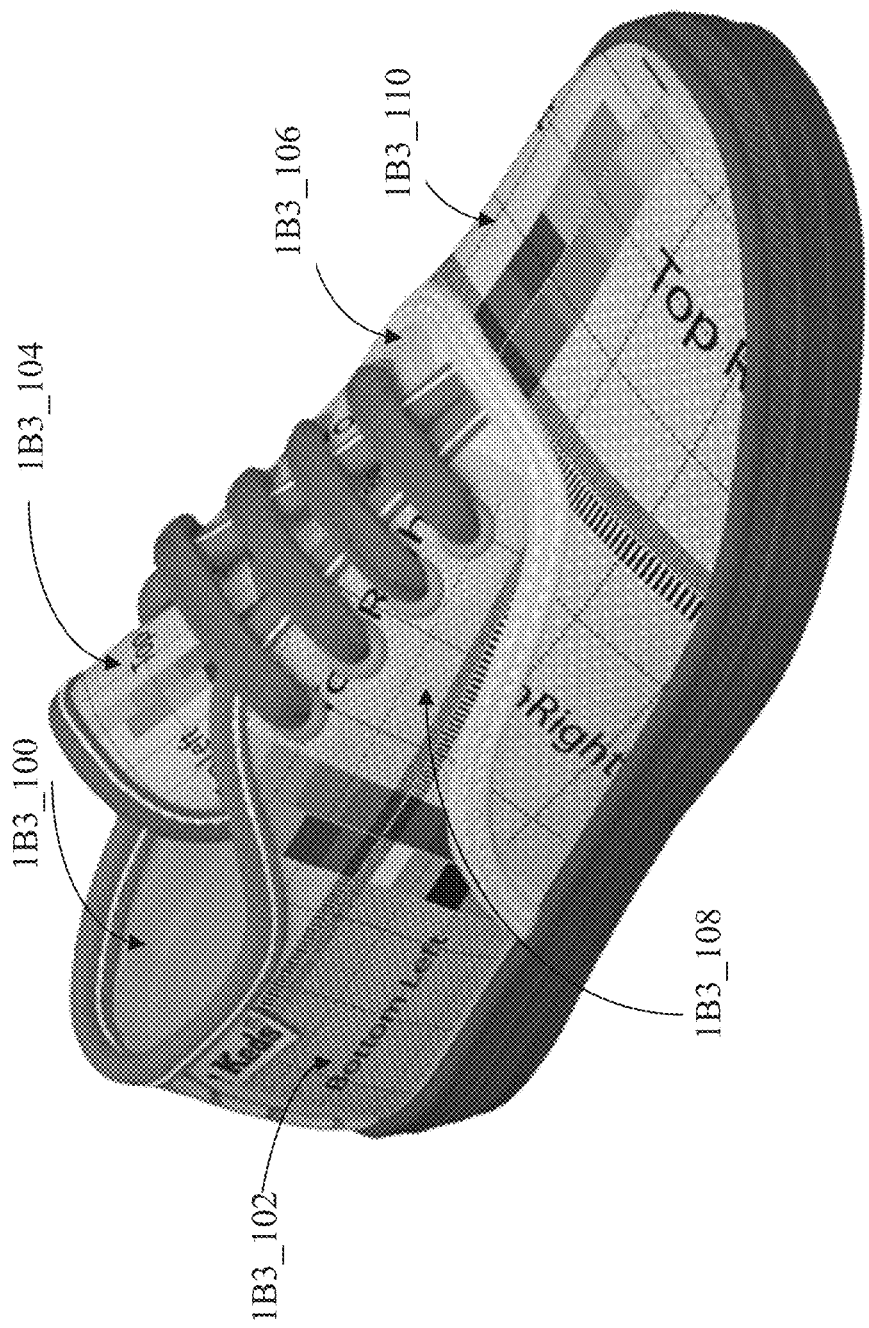
FIG. 1B3

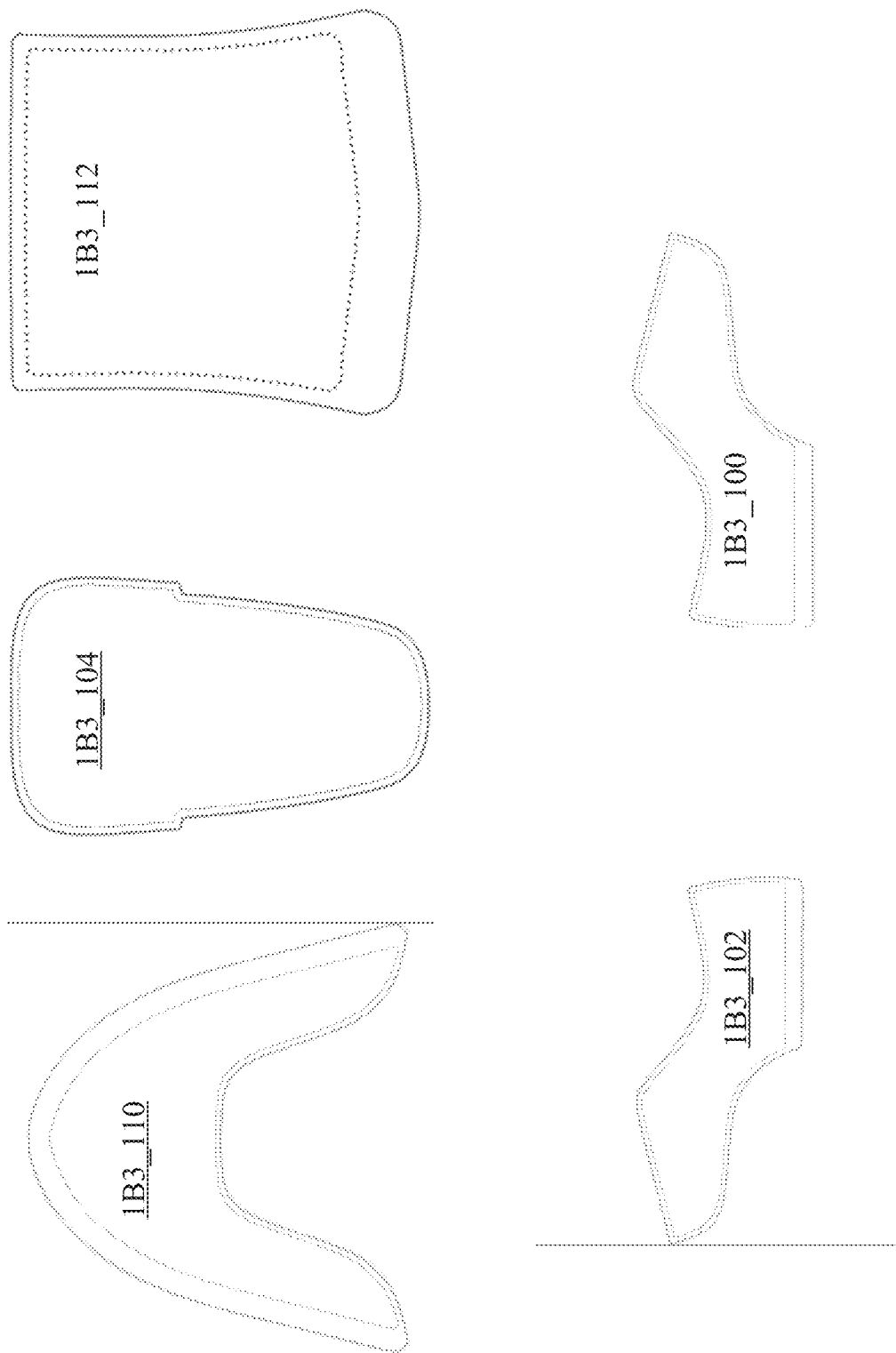
FIG. 1B4

PARAMETRIC MODELLING AND GRADING

FIELD OF DISCLOSURE

One technical field of the present disclosure is digital image processing for product customization purposes. Another technical field includes computer-implemented techniques for defining, custom fitting, parametric-based fitting, assembling, and displaying customized products using digital image processing. Another technical field includes producing customized, parametrically fitted products using manufacturing processes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Advancements in manufacturing of various custom products over time made it possible to customize various components of the manufactured products. These days, a user may customize, for example, the ornamentation, coloring, or decoration of the manufactured products. Furthermore, in the clothing industry, a user may customize not only the colors or decorations of the clothing, but also the clothing's fit.

However, providing a method and integrating such a method into computerized systems in a simple manner appears to be quite difficult and complex. For example, there is no current standard or system that provides the technologies for implementing, for instance, the required transformations of user data to accommodate the user's needs and to create and refine fitted and tailored products.

BRIEF DESCRIPTION OF THE DRAWINGS

FIG. 1A1 is a block diagram showing an example computer-generated interface for custom fitting and manufacturing parametric products.

FIG. 1A2 is a block diagram showing example options for custom fitting and manufacturing parametric products.

FIG. 1A3 is a block diagram showing example options for modifying custom fitting and manufacturing parametric products.

FIG. 1B1 is a block diagram showing example user characteristics.

FIG. 1B2 is a block diagram showing example user characteristics.

FIG. 1B3 is a block diagram showing an example custom product.

FIG. 1B4 is a block diagram showing example templates of an example custom product.

FIG. 2 is a block diagram showing an example of a collaboration platform.

FIG. 3 is a block diagram showing an example of collaboration on custom fitting and manufacturing parametric products.

FIG. 4I is a block diagram showing an example of a template used to custom fit a parametric product using a 3D BSpline interpolation based on the product's sizes and 3D control points.

DESCRIPTION OF EXAMPLE EMBODIMENTS

Figure 1A:
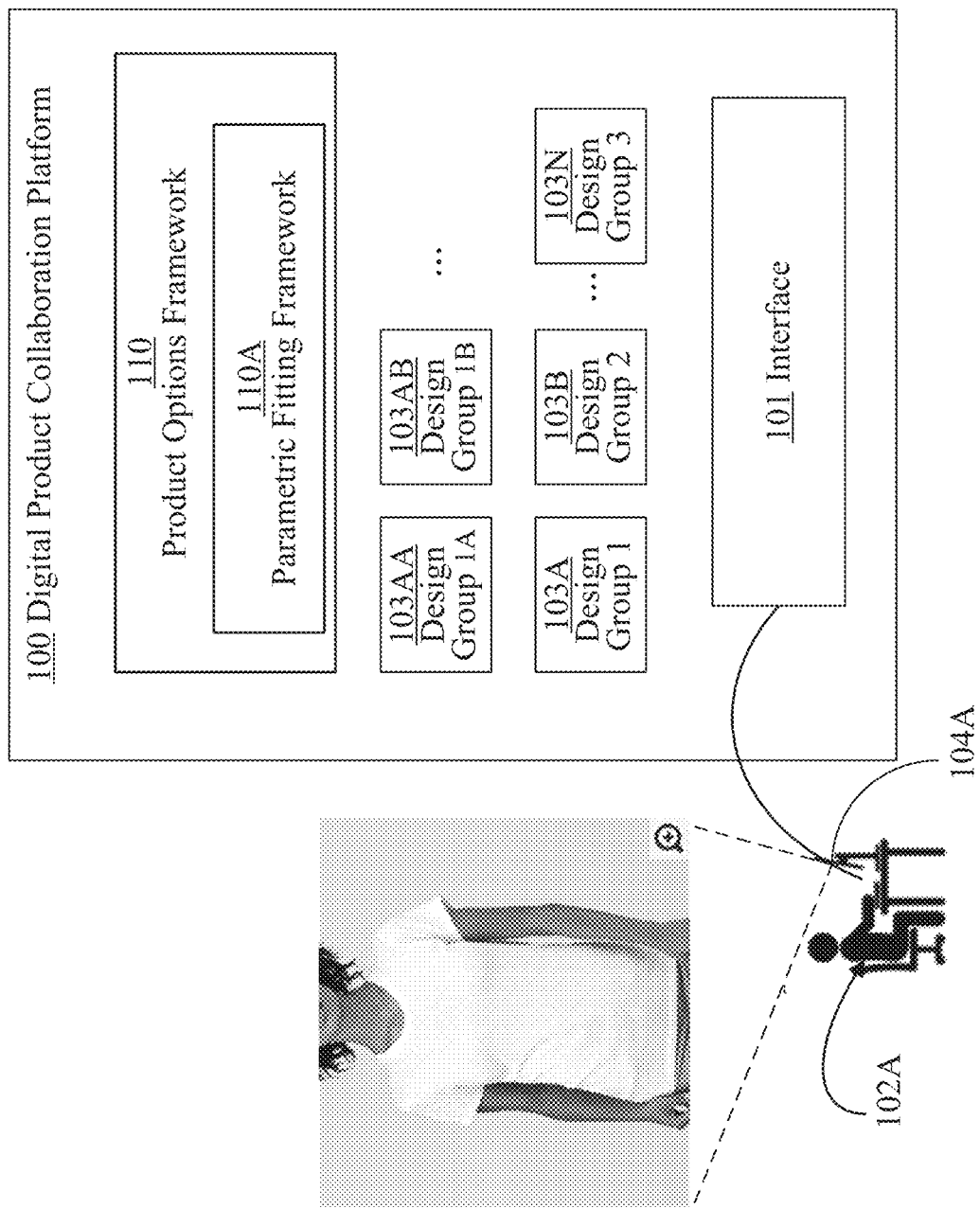
FIG. 1A is a block diagram showing an example environment for custom fitting and manufacturing parametric products.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. GENERAL OVERVIEW
2.0. EXAMPLE APPROACH
  2.1. INTRODUCTION TO PARAMETRIC APPAREL DESIGN
  2.2. OVERVIEW OF PARAMETRIC APPAREL DESIGN APPROACH
  2.3. CUSTOMIZATION EXAMPLES
    2.3.1. FITTING TO SHAPES
    2.3.2. PATTERN MATCHING
    2.3.3. FITTING USING INTERPOLATION
    2.3.4. FITTING USING CONTROL POINTS
  2.4. CUSTOM FITTING AND MANUFACTURING OF PARAMETRIC PRODUCTS
  2.5. COMPUTER-GENERATED INTERFACE FOR CUSTOM FITTING AND MANUFACTURING PARAMETRIC PRODUCTS
  2.6. EXAMPLE OPTIONS FOR CUSTOM FITTING
  2.7. EXAMPLE OPTIONS FOR MODIFYING CUSTOM FITTING
3.0. EXAMPLE ENVIRONMENT FOR COLLABORATION ON CUSTOM FITTING
4.0. EXAMPLES OF USER CHARACTERISTICS
5.0. EXAMPLES OF TEMPLATES
6.0. DECORATIVE SURFACES
  6.1. AUTOMATIC PATTERN MATCHING
    6.1.1. CUTOUTS
    6.1.2. PRINT CUTS
    6.1.3. ORNAMENTS
  6.2. TRANSFORMATIONS
    6.2.1. TRANSLATIONS, FLIPS AND ROTATIONS
    6.2.2. STRETCHING
    6.2.3. REPLICATIONS
  6.3. PRINTING ON PRODUCTS
7.0. EXAMPLE COMPUTER ENVIRONMENT
  7.1. USER DEVICES
  7.2. CLIENT APPLICATIONS
  7.3. FRONT END SERVERS
  7.4. CORE SERVICES
8.0. EXAMPLE MANUFACTURING SYSTEM
  8.1. OUTPUT STYLE
  8.2. EXAMPLE MANUFACTURING PROCESS
9.0. EXAMPLE PRODUCT COLLABORATION PLATFORM
10.0. DESIGNING AN ASSET
  10.1. ASSET DEFINITION DATA
  10.2. COLLABORATION ON CUSTOM FITTING
11.0. CUSTOM FITTING AND MANUFACTURING PARAMETRIC PRODUCTS
12.0. FITTING TO SHAPES
  12.1. TENNIS SHOE EXAMPLE
  12.2. PURSE EXAMPLE
13.0. CUSTOMIZATION USING A LINEAR INTERPOLATION
14.0. CUSTOMIZATION USING A LINEAR INTERPOLATION AND PRODUCTS' SIZES
15.0. CUSTOMIZATION USING BSPLINE INTERPOLATION AND PRODUCTS' SIZES
16.0. CUSTOMIZATION USING BSPLINE INTERPOLATION, PRODUCTS' SIZES AND 2D CONTROL POINTS
17.0. CUSTOMIZATION USING 3D BSPLINE INTERPOLATION, PRODUCTS' SIZES, AND 3D CONTROL POINTS
18.0. CUSTOMIZATION USING 3D BSPLINE INTERPOLATION AND 3D CONTROL POINTS
19.0. CUSTOMIZATION USING 2D BSPLINE INTERPOLATION, PRODUCTS' SIZES AND 2D CONTROL POINTS
20.0. CUSTOMIZATION USING 3D BSPLINE INTERPOLATION USING 3D CONTROL POINTS
21.0. EXAMPLE FLOW CHART FOR FITTING TO SHAPE
22.0. EXAMPLE FLOW CHART FOR CUSTOM FITTING USING INTERPOLATION
23.0. EXAMPLE FLOW CHART FOR CUSTOM FITTING USING INTERPOLATION BASED ON 2D CONTROL POINTS
24.0. EXAMPLE FLOW CHART FOR CUSTOM FITTING USING 3D INTERPOLATION BASED ON 3D CONTROL POINTS
25.0. EXAMPLE FLOW CHART FOR CUSTOM FITTING
26.0. IMPLEMENTATION MECHANISMS 1.0. General Overview In some implementations, the systems and the corresponding methods described herein address the need for an automatic, computer-based approach for modifying the appearance and shapes of custom and manufactured products to allow users to customize the products to satisfy the users' individual needs. The solution may be implemented in the design and customization processes of large and short runs of manufactured products and may be based on novel and improved parametric grading and modeling techniques.

The system implements the functionalities that allow users to modify, correct, and refine the fit of the customized products. More specifically, the system implements the functionalities that allow providing or determining anthropometric, biometric, and easily accessible data about the users and the data about the users' needs. It also allows the users to interact with a user interface that allows the users to review and tailor the products according to the users' needs. The system also implements the functionalities that allow the users to collaborate with knowledgeable and experienced agents/assistants and seek their assistance in meeting, for example, the users' special requirements and needs.

Furthermore, the system may implement the functionalities that allow generating manufacturing instructions that correspond to the products customized by the users and transmitting the instructions to manufacturers to tailor and produce the custom products for the users.

2.0. Example Approach 2.1. Introduction to Parametric Apparel Design

Parametric apparel design systems presented herein usually include several components. One component may include 2D software for designing patterns for apparel, such as dresses, shirts, pants, and the like. Each pattern may be graded allowing, for example, each fabric piece of the apparel, such as a shirt sleeve, to have several possible shapes determined based on the size of the finished shirt. Then, the graded patterns may have all pieces of the apparel sent to a manufacturer to allow the manufacturer to manufacture the apparel in the corresponding sizes.

The parametric apparel design systems presented herein may also include a 3D software component for visualizing patterns for apparel and how the apparel fits on human figures. That component of apparel design can use a graded pattern as input and use the provided pattern to fit it to a variety of 3D digital models of humans. This allows for an apparel designer to check for sizing, fit, and in some instances, how the fabric will drape and fall on the models.

In some embodiments, the software systems for parametric packaging design allow a designer to create a flat pattern with annotations for cuts and folds. The software systems may, for example, automatically calculate offsets between solid panels in the package given a specific material thickness. The software system may also visualize the folding of a flat layout to form a 3D model of the packaging design.

Furthermore, the packaging design systems support manufacturing of packaging using a print/cut/fold process. For example, the packaging material (such as card stock or corrugated cardboard) may be printed on master sheet sizes, die cut (or laser cut), and folded into the final shape. Similar methodologies and systems may be used in construction of products from flat sheets of metal or formed plastic.

2.2. Overview of Parametric Apparel Design Approach

In some implementations, a method for custom fitting and manufacturing parametric products comprises generating a parametric model of a custom product based on, at least in part, past learned data pertaining to the custom product and user-specific data of a user. In the parametric model, each parameter, of the plurality of parameters of the custom product, is represented as a key-value pair. A key-value pair (described in detail later) may be a data structure that includes an attribute key and a corresponding attribute value.

The parametric model of the custom product may be then translated to a plurality of parameters of the custom product.

Based on, at least in part, the plurality of parameters of the custom product, a first graphical representation of the custom product may be generated. Then, a first user interface may be generated. The first user interface comprising at least the first graphical representation of the custom product may be displayed on a computer display device.

The first user interface may display, on the computer display device, the first graphical representation of the custom product as a visualization of the parametric model of the custom product showing how the parametric physical product fits the user having the user-specific data. The parametric physical product is a product manufactured based on the plurality of fit model parameters using a plurality of fit key-values of the parametric fit model.

In some implementations, the first user interface further displays one or more regions of the visualization of the parametric model of the custom product. A region of the one or more regions of the visualization may be adjustable using one or more functionalities of the first user interface. The functionalities of the first user interface may allow, for example, adjusting a fit of the parametric physical product to the user' needs.

The method may further comprise receiving, from the first user interface, a selection of a region, from the one or more regions, and an indication that fit of the customized product should be improved. This may include an indication of, for example, either a looser fit or a tighter fit.

In some implementations, a plurality of adjustment parameters for improving the fit of the custom product in relation to the user-specific data is received via the first user interface.

Based on the plurality of adjustment parameters and the plurality of parameters of the custom product, a parametric fit model having a plurality of fit model parameters is generated for the custom product. A fit model parameter, of the plurality of fit model parameters of the parametric fit model, may be represented as a fit key-value pair, and each key-value pair may include a key and a corresponding parameter.

The method may further include storing the parametric fit model, having the plurality of fit model parameters, in association with a user profile of the user.

The parametric fit model may be transmitted to a manufacturer to cause the manufacturer to produce a parametric physical product based on the parametric fit model having the plurality of fit model parameters.

In some implementations, the method further includes receiving a request to invite an agent to collaborate on adjusting the parametric fit model. Based on, at least in part, a plurality of fit parameters of the parametric fit model, a second graphical representation of the parametric physical product is generated. Then, a second user interface is generated and displayed on a user computer display device. The second user interface may include at least the second graphical representation of the parametric physical product.

Furthermore, a third user interface may be generated and displayed on an agent computer display device. The third user interface may include at least the second graphical representation of the parametric physical product.

Upon receiving, via the second user interface, a plurality of user adjustment parameters for improving a fit of the parametric physical product and receiving, via the third user interface, a plurality of agent adjustment parameters for improving a fit of the parametric physical product, an adjusted parametric fit model is generated. The adjusted parametric fit model is generated based on the plurality of user adjustment parameters, the plurality of agent adjustment parameters and the plurality of fit parameters of the parametric physical product. The adjusted parametric fit model may have a plurality of new fit model parameters. A new fit model parameter, of the plurality of new fit model parameters of the adjusted parametric fit model, may be represented as an adjusted fit key-value pair.

The adjusted parametric fit model may be transmitted to the manufacturer to cause the manufacturer to produce the parametric physical product based on a plurality of adjusted fit model parameters of the adjusted parametric fit model.

In some implementations, the method further comprises receiving a request to adjust the parametric fit model. Based on, at least in part, a plurality of fit parameters of the parametric fit model, a fourth graphical representation of the parametric physical product is generated.

Furthermore, a fourth user interface may be generated and displayed on a user computer display device The fourth user interface may include at least the fourth graphical representation of the parametric physical product.

Upon receiving, via the fourth user interface, a plurality of user adjustment parameters for improving a fit of the parametric physical product, an adjusted parametric fit model may be generated based on the plurality of user adjustment parameters and the plurality of fit parameters of the parametric physical product. The adjusted parametric fit model may have a plurality of new fit model parameters. A new fit model parameter, of the plurality of new fit model parameters of the adjusted parametric fit model, may be represented as an adjusted fit key-value pair.

The adjusted parametric fit model may be transmitted to the manufacturer to cause the manufacturer to produce the parametric physical product based on a plurality of adjusted fit model parameters of the parametric fit model.

2.3. Customization Examples

The approach described herein addresses the need for customizing the appearance and shapes of customizable and manufactured products to allow users to customize the products to satisfy the users' individual needs. The customization may be facilitated by executing software-based visualization tools described later. Examples of the different types of customization are described below.

In general, a product customization means customizing, or changing, a shape of a custom product or a parametric grading of a product, or a parametric modeling of a product, or any combination of the above. The fitting to shapes includes determining a desired shape and selecting the best fit for the selected shape. The parametric grading usually includes determining two or more customized products and interpolating between the sizes of the determined custom product until a desired customized product is obtained. The parametric modeling of a product usually includes determining a customized product and modeling the parameters of the determined customized product until a desired customized product is obtained.

2.3.1. Fitting to Shapes

Customizing, or changing, a shape of a custom product usually includes determining a desired shape and selecting the best fit for the selected shape. For example, suppose that a user is browsing an online repository of custom products, and is particularly interested in selecting, customizing, and ordering a pair of shoes.

Part of the process of selecting a pair of shoes may include determining whether the user is looking for the shoes for a child, or for a teenager, or for a woman, or for a man, etc. From the implementation perspective, each of those types of shoes may have associated categories, and the categories may capture the information about the corresponding shoes' shapes. For example, children's shoes may have shapes that are different from women's shoes and/or men's shoes. Indeed, children's shoes may be smaller than women's or men's shoes. Suppose that the user selected the women's shoes.

The user may also want to determine the occasion for the shoes. For example, if the user selected the women's shoes, in the next step, the user may want to determine whether the user is looking for women's sneakers, or tennis shoes, sleepers, heels, boots, flats, flip flops, evening shoes, etc. From the implementation perspective, each of those subtypes of shoes may have associated categories, and the categories may capture the information about the corresponding shoes' shapes. For example, the women's evening shoes may have the shapes that are different than, for example, the women's sleepers and/or the women's boots. Indeed, the women's evening shoes may have heels, while the women's sleepers may have no heels. Suppose that the user selected the women's sneakers.

There are also different shapes and types of patterns for the customized products. Some custom products may come with different options, parameters, patterns, finishes, and the like. For example, the women's sneakers may come with a standard finish, an extra cushion, an extra support for an arch, leather finishes, leather shoelaces, fabric shoelaces, patterns, and the like. The subset of the options may be specific to the type of the shoes, the occasion, and the like.

For the shoes, for example, there might be a different set of flat patterns that are then sewn together to make the shoe. Hence, the fitting may include designing and fitting each of the flat patterns in the set for each size, each type, and the like.

2.3.2. Pattern Matching

Pattern matching is the process of checking whether a specific sequence of pattern's elements match along, for example, seams of a digital asset or whether the matching meets certain requirements. Examples of simple patterns include stripes, checks, twills, bird-eye, nails head, sharkskin, florals, paisley, dots, and the like.

Chalk stripes and pinstripes are the most common patterns. For example, in shirts, the often used stripes are the awning stripe, the Bengal stripe, candy stripes, and pencil stripes.

Checks are also quite common patterns. There's a wide variety of them—tartan, glen check, graph check, gingham, and tattersall, among others. A twill weave is a type of tight weave with the warp over the weft. The most commonly seen twill is the herringbone weave—a distinctive pattern that actually does look like a fish bone. A bird-eye, nails head, and sharkskin are small repeating patterns that may look like solids from a distance. Florals can be bold (with large patterns and bright colors) or subtle (with small repeating patterns and muted colors). Paisley are usually unique, swirling spirals never fail to grab attention. Dot patterns range all the way from formal to casual, depending on their size and the amount of contrast with the background fabric. A larger dot with high contrast is very casual. A dot that's small and subtle is more formal.

When customizing a custom product which may include several pieces (e.g., a custom sneaker may include an upper left front part, an upper right front part, an upper left side part, an upper right side part, an upper left back part, an upper right back part, and the like) it is important that the pattern shown on each individual piece match the pattern on the neighboring pieces that are sewn together to form the product (e.g., a customized shoe).

One of the solutions includes determining how to repeat the pattern across the pieces of the same custom product. This may include applying, so-called, a pattern repeat technique, in which the distance between starting points of the pattern, or where the pattern begins and then begins again—are measured by their horizontal and vertical dimensions. And then use the information to determine how to match the starting points across the pieces.

Usually, a designer of the custom product (e.g., a custom shoe), determines how to match the pattern for pieces of the custom product for several typical sizes (e.g., for the custom shoe: 7M, 7 W, 7½M, 7½W, 8M, 8 W, 8½M, 8½W, 9M, 9 W, 9½M, 9½W, 10M, 10W, and so forth), and if a user customizes his size to fit, the system may automatically determines how to match the pattern for pieces of the custom product for, for example, in-between sizes, and the like. The designer may, for example, lay the fabric over a physical product (e.g., a physical product), and determine how to cut the fabric so that the corresponding pattern matches along the seams of the physical product, and then most likely over the custom product (e.g., a custom shoe).

This may be repeated using the above and other techniques to make sure that the pattern transitions over the seams of the pieces of the custom product smoothly and correctly.

This process, or the modified process of the one explained above, is performed to make sure that the pattern matches one the resulting custom product. If needed, the pattern may be scaled or modified to satisfy the matching requirements. when they put another pattern on another piece of shoe by scaling and modifying the pattern.

These types of patterns are often referred to as parametric patterns and are usually applied in ornamentation designs. Matching the ornamental art may further include implementation solutions that allow matching the pattern to an arbitrary shape and may include the solutions for the pattern wrapping and rejoining.

The solutions described herein may be fully automated and fully implemented in the parametric apparel design, as described later.

2.3.3. Fitting Using Interpolation

Interpolation is a method of finding new values for any function using a known set of values. To interpolate means to connect discrete data points to obtain, for example, reasonable estimates of data points between the known points. In case of a linear interpolation, the new values for two known (i.e., given) points may be found using a linear interpolation formula. An example formula is $y=y1+((x-x1)/(x2-x1))*(y2-y1)$, where x is the known value, y is the unknown value, x1 and y1 are the coordinates that are below the known x value, and x2 and y2 are the coordinates that are above the x value.

A linear interpolation formula may include evaluating the following continuous linear function:

$$V2=((V1-V0)*t)+V0.$$

where t is in the range [0 . . . 1], V0 is a start vector, V1 is an end vector, and V2 is the interpolated result.

There is a distinction between interpolation and curve fitting. In interpolation, one constructs a curve through the data points. In doing so, an implicit assumption is made that the data points are accurate and distinct. Curve fitting, on the other hand, is applied to data that contain scatter (noise), usually due to measurement errors.

While an interpolation is used to determine a curve that passes through all of the data points, a curve fitting is used to determine the best-fit line or curve to a particular set of data. To fit a curve means to find a curve that would best indicate the trend of a given set of data.

Curve fitting is the process of constructing a curve, or mathematical functions, which possess the closest proximity to the real series of data. By curve fitting, one can mathematically construct the functional relationship between the observed dataset and parameter values, etc.

The curve fitting may be based on various interpolation techniques such as the Newton interpolation, the Lagrange interpolation, and the spline interpolation. The resulting equation can be used for the curve fitting.

2.3.4. Fitting Using Control Points

In computer-aided geometric design, a control point is a member of a set of points used to determine the shape of a spline curve or, more generally, a surface or higher-dimensional object. This property implies that the curve lies within the convex hull of its control points.

Examples of curves generated based on control points may include Bézier curves, spline curves, non-uniform rational Bézier splines (NURBS), and the like.

A Bézier curve is defined by a set of control points $P_0$ through $P_n$, where n is called the order of the curve (n=1 for linear, 2 for quadratic, etc.). The first and last control points are always the endpoints of the curve, while the intermediate control points (if any) generally do not lie on the curve.

A spline is a function defined piecewise by polynomials. A spline curve is a mathematical representation of a cure that may be used by a user to design and control the shape of complex curves and surfaces. For example, a user may enter a sequence of points, and the computer-implemented method, based on the provided points, constructs a curve that has a shape that closely follows the sequence of the points.

The spline bends a sheet of rubber that passes through the input points while minimizing the total curvature of the surface. It fits a mathematical function to a specified number of nearest input points while passing through the sample points. A control point spline usually does not pass through the selected points besides the first and last points. Unlike fit points, which define points that the spline must pass through, control points just define the underlying frame used to calculate the curve.

NURBS curves and surfaces behave in similar ways and share terminology. A NURBS curve is defined by four things: degree, control points, knots, and an evaluation rule.

The NURBS evaluation rule is a formula that involves the degree, control points, and knots. In the formula there are some things called B-spline basis functions. The B and S in NURBS stand for "basis spline." The number the evaluation rule starts with is called a parameter.

2.4. Custom Fitting and Manufacturing of Parametric Products

All drawing figures herein, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1A is a block diagram showing an example environment for custom fitting and manufacturing parametric products. In FIG. 1A, a user 102A uses a digital product collaboration platform 100 (described in detail later) to search for products that the user would like to customize and purchase. The products may be presented to the user in a variety of ways. For example, the product may be displayed on a user device 104A using an interface 101 that communicates from digital product collaboration platform 100 to user device 104A, and that displays a browser that allows the user to browse a catalog of the products that platform 100 offers. User 102A may search the products displayed in the browser, and if the user selects a particular product, then the user may provide the selection information to collaboration platform 100. Providing the selection information to collaboration platform 100 may include dragging-and-dropping depiction of the selected product to the collaboration platform via interface 101, downloading hyperlinks, typing-in search words and phrases, typing-in names of designers, and the like.

In some implementations, interactions between a user and a collaboration platform start from downloading a browser that generates a GUI for interacting with the collaboration platform. The GUI may generate a display and display a collection of images, pictures, or designs that the user may browse and/or select. The collection may be viewed to show, for example, different designs, different objects, different floral pattern tablecloths, different dishes, different shoes, different pieces of clothing, etc.

A user may be presented with a GUI that can display various products as previously described in, for example, U.S. patent application Ser. No. 17/240,074, U.S. patent application Ser. No. 17/038,659, and U.S. patent application Ser. No. 17/217,870. A user may select an existing product that matches their specific design sensibility and drag a depiction of the product to the GUI area.

Referring again to FIG. 1A, collaboration platform 100 may use the information about different products and product designs. The different product designs may be divided into different groups. The number of groups may vary from implementation to implementation. Examples of the groups depicted in FIG. 1A include design groups 103A, 103B, . . . 103N, 103AA, 103AB . . . , and the groups may include the products that correspond to the user's preferences in terms of aesthetics, designers, color pallets, embellishments, and the like. For example, if a user is in the process of decorating his kitchen, and the user wants to achieve a particular design look that expresses the user's individual taste and likes, then the user may want to explore an entire collection of different products (e.g., tablecloths, dishes, glassware, silverware, pots, and the like) that conform to the user's design styles and that platform 100 have grouped in functional product groups 103A, 103B, . . . 103N, 103AA, and/or 103AB . . . . For instance, if a user would like to decorate his kitchen in the country style, which refers to the aesthetic that represents a rural farmhouse-like design, then he would want to see collections of various products (e.g., tablecloths, dishes, glassware, silverware, pots, and the like), that incorporate pastels and bright colors with the addition of design elements like stenciling or vintage signage.

In some embodiments, collaboration platform 100 generates and maintains a plurality of functional product groupings 103A, 103B, . . . 103N, 103AA, 103AB . . . based on different types of designs or looks. For example, one functional product group maintained by platform 100 may include designs with floral patterns with mostly primary colors featuring the products such as napkins, tablecloths, towels, and the like. In some implementations, a functional product group comprises one or more products that have a specific aesthetic design, also referred to as a personal aesthetic or a personal preference.

2.5. Computer-Generated Interface for Custom Fitting and Manufacturing Parametric Products FIG. 1A1 is a block diagram showing an example computer-generated interface for custom fitting and manufacturing parametric products. Example GUI 101_A1 shown in FIG. 1A1 may be used to support customization of custom products, as well as collaborations between users in a process of customizing interactive designs. Customization of an interactive design may include creating the design and modifying the design. To be able to customize the design, the customer may request access to a product description data associated with the interactive design. To be able to collaborate with others, such as peers, customer support agents, graphics designers and others, the customer may request collaboration sessions using, for example, the functionalities of request selectors.

To initiate a customization session, a computer system may generate a user interface 102_A1 for a user. The interface may be generated based on, at least in part, information stored in a user profile. That information may include information indicating the user's role. The user interface may include the functionalities 102_A2 that are specific to the user, and that allow the user to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

In some embodiments, the computer system may cause displaying, in user interface 102_A1 executing in a user device of the user, an interactive design along with annotations representing attributes, attribute groups and the locations within the design to which the attributes apply. The attributes, default values for the attributes and default ranges for the values for the attributes may be provided by an attribute engine which may be part of the computer collaboration system. The attribute engine may define and/or filter the attributes according to constraints provided by manufacturers, designers, or system administrators.

In response to receiving, in the user interface, a rendering of the interactive design with the annotations, a user may select, using functionalities 102_A2 of the user interface, a specific attribute or a specific attribute group at a specific location within the depiction of the interactive design and select or adjust a value associated with the attribute. For example, the user may select a t-shirt 102_A3, and using the settings associated with functionalities 102_A2, the user may select the size of the t-shirt, the style, the color of the shirt, the color of the printing, and the like.

As the user selects various attributes of the custom product (e.g., the t-shirt), the computer system may generate various views of the custom product and display the generated views of the custom product in, for example, a window 102_A4.

A custom product may be defined by, so-called, serialized key-value pairs. The serialized key-value pairs may be modified each time the user, or a person with whom the user collaborates) provides modifications or customization changes.

Upon receiving a serialized key-value pair, a product options framework (described in detail later) may store the serialized key-value pair in a journaled list of modifications for the interactive design.

Upon receiving a request to view the journaled list from the user, the attribute engine may provide the journaled list to the user interface executing on the user device and cause the user interface to display the journal list. At this point, the user may review the modifications included in the journaled list, reorder the modifications included in the list, remove some modifications from the list and/or request applying of the modifications included in the list to the interactive object. The user may also request generating a rendering of the current interactive design. If the rendering of the current interactive design is completed, the user may view the rendering in any of a plurality of available views.

In some embodiments, the user may accept the rendered depiction of the modified design and request that the customized design be sent to a manufacturer or a distributor. Then the user may place an order for an actual product that is based on the customized design provided to the manufacturer or distributor.

2.6. Example Options for Custom Fitting

Figure 2:
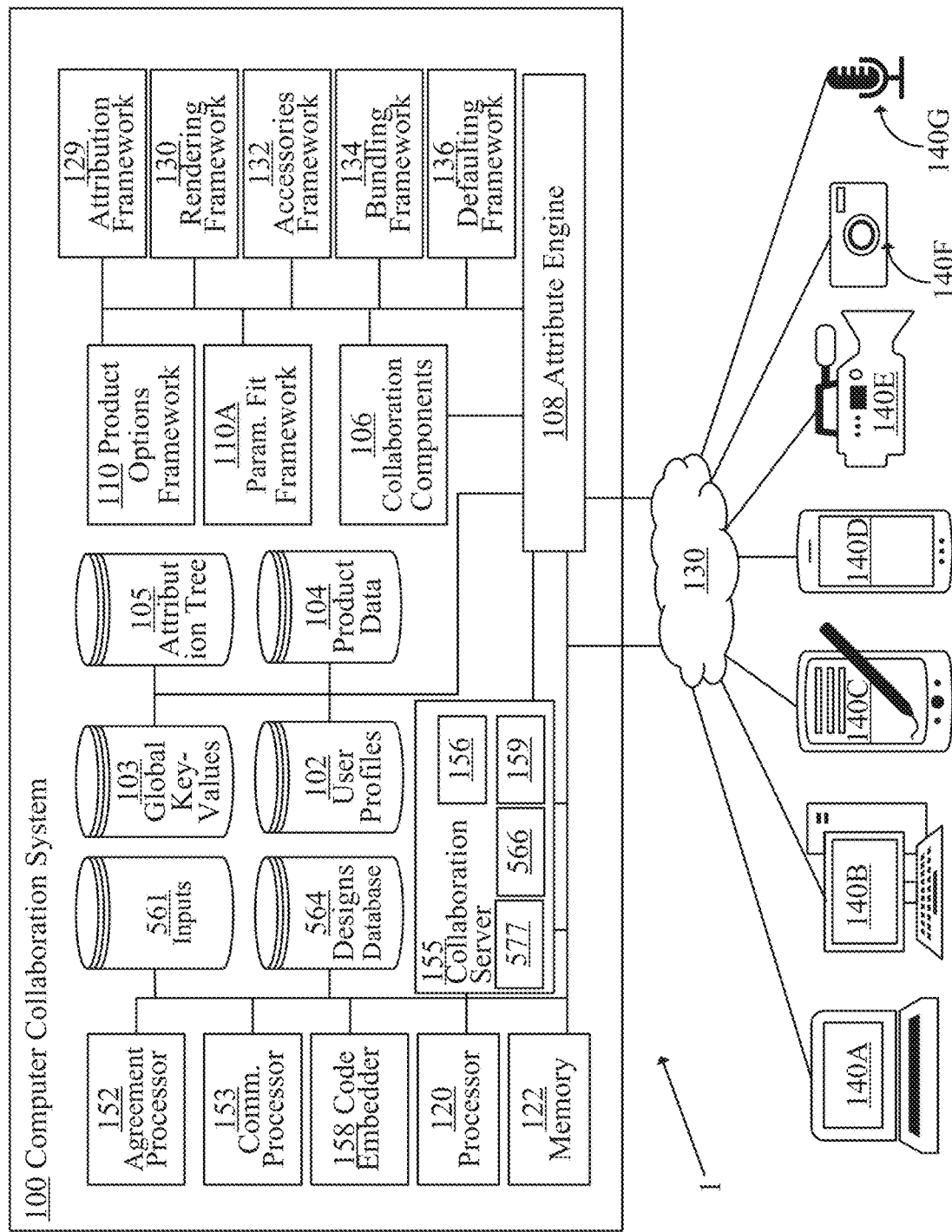

Continuing with the above example of customizing a t-shirt, FIG. 1A2 provides additional customization examples for customizing the t-shirt. The process for other custom products is, however, similar to the one described below.

FIG. 1A2 is a block diagram showing example options for custom fitting and manufacturing parametric products. In the depicted example, a user may customize various characteristics of a t-shirt, shown in a view 102_A3. Examples of characteristics may include characteristics that are indicated by the following submenus: an opening shape 121, an opening depth 122, an overall length 123, a color 131, a material type 132, a shoulder length 141, a sleeve length 142, a sleeve width 143, a bust width 144, a waist width 145, a hip width 146. Using any of the above submenus, the user may, for example, select the type of the opening of the t-shirt (e.g., whether the user would like an oval opening, a round opening, a square opening, and the like).

In other implementations, other characteristics may be available for t-shirts, and yet other characteristics may be available for other custom products.

2.7. Example Options for Modifying Custom Fitting

Figure 3:
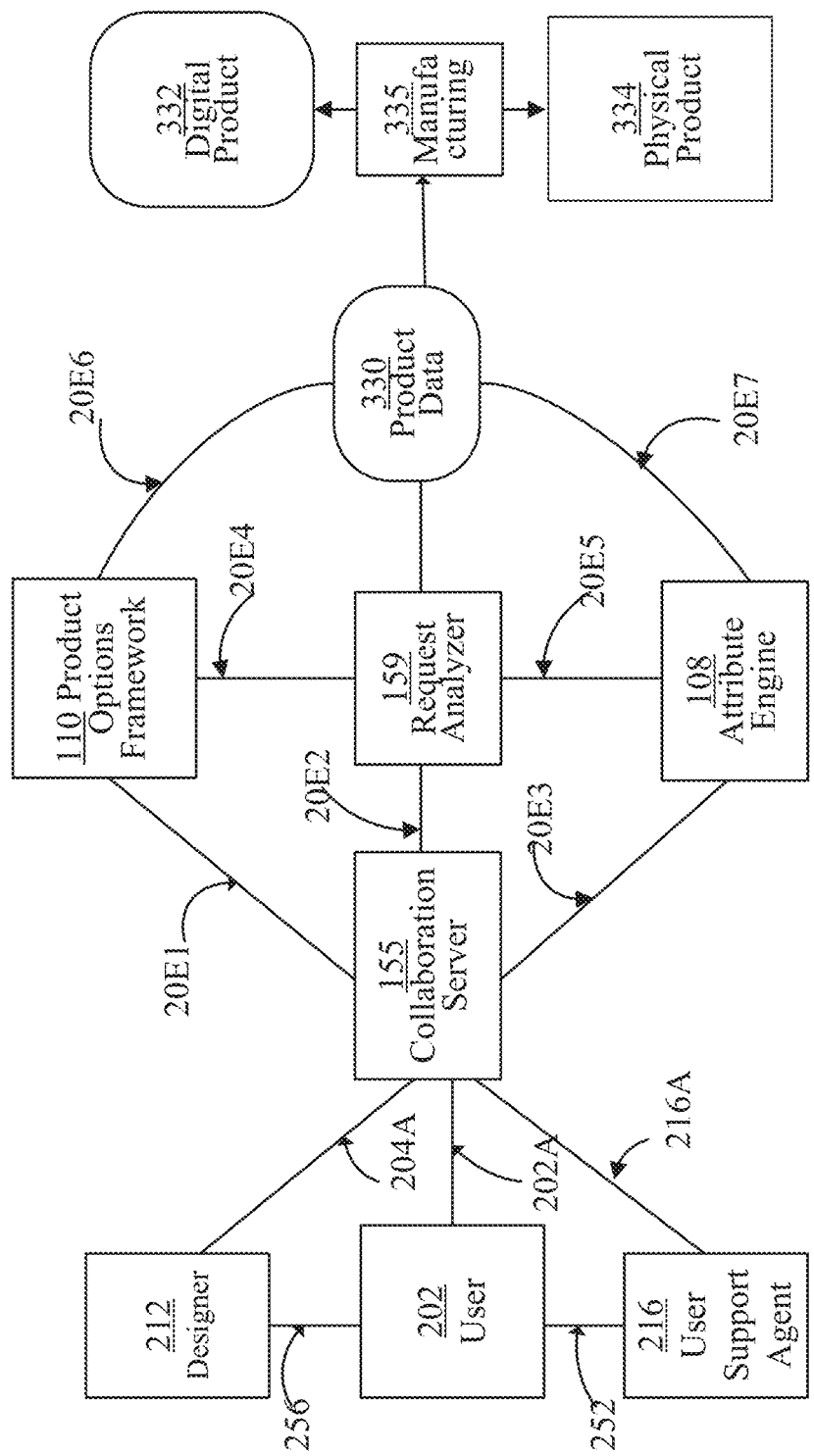

Continuing with the above example of customizing a t-shirt, FIG. 1A3 provides additional customization examples for customizing the t-shirt. The process for other custom products is, however, similar to the process described below.

FIG. 1A3 is a block diagram showing example options for modifying custom fitting and manufacturing parametric products. In the depicted example, a user may modify the customization characteristics of a t-shirt, shown in a view 102_A3. For example, the user may customize any of the characteristics described in FIG. 1A2 (which may be indicating any of the menus pointing to selections of, for example, opening shape 121, opening depth 122, overall length 123, color 131, material type 132, shoulder length 141, sleeve length 142, sleeve width 143, bust width 144, waist width 145, hip width 146) by pressing, for example, the corresponding EDIT button in the corresponding submenu. By pressing the corresponding EDIT button, the user may, depending on the implementation, provide the dimension of the corresponding characteristic that the user believes would be more appropriate for the user. For instance, using the submenu that allows modifying a sleeve length 142, the user may enter the length that is more appropriate for the user.

In other implementations, other ways of modifying the characteristics may be available for t-shirts, and yet other ways of modifying the characteristics may be available for other custom products.

3.0. Example Environment for Collaboration on Custom Fitting

Figure 1B:
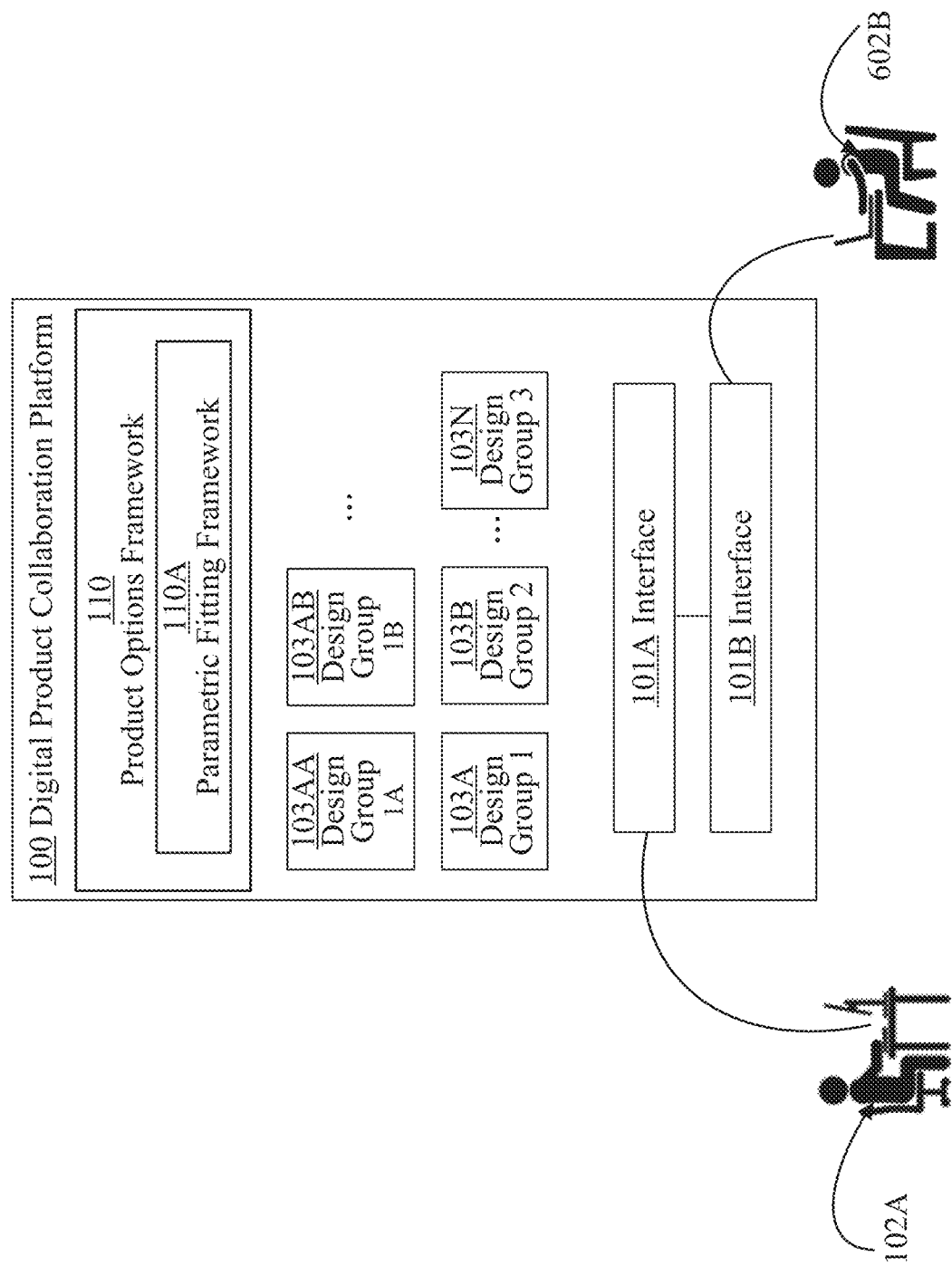
FIG. 1B is a block diagram showing an example environment for collaboration on custom fitting and manufacturing parametric products.

FIG. 1B is a block diagram showing an example environment for collaboration on custom fitting and manufacturing parametric products. In FIG. 1B, a user 102A interacts with digital product collaboration platform 100. For example, user 102A may use platform 100 to customize some custom products, such as a pair of shoes, a t-shirt, a coffee mug, and the like. Furthermore, user 102A may collaborate with a user 602B on designing and/or customizing the selected custom product. Collaboration platform 100 is described in detail later.

For the purpose of describing the custom fitting approach, it is assumed that collaboration platform 100 comprises a product options framework 110 (described in detail later) and a parametric fitting framework 110 A (also described in detail later).

User 102A may interact with collaboration platform 100 via a user interface 101A; while user 602B (if user 102A collaborates with user 602B) may interact with collaboration platform 100 via a user interface 101B. As it will be described later, interfaces 101A and 101B may communicate with each other, and the interactions between users 102A and 602B are coordinated, controlled, and managed by collaboration platform 100.

In some implementations, platform 100 is a distributed computer system implemented in one or more servers (described later) and/or one or more cloud storage systems (described later), allowing one or more modules of digital product collaboration platform 100 to cooperate with each other. Platform 100 is described in detail in FIG. 2.

In some implementations, collaboration platform 100 comprises a product options framework 110, which in turn executes a parametric fitting framework (described later).

Product options framework 110 is a computer-based module implemented in the platform and configured to support interactions between users and the platform. The product options framework is described in detail in FIG. 2.

In some implementations, platform 100 receives from a user an indication of a selection of a particular design style. Examples of the indications may include a keyword, a key phrase, a description of the user's preferences, and the like.

Based on the indication of a particular design style and definitions of different design types, different design genres, different design types, different design ornaments, and the like, stored in a database maintained by collaboration platform 100 determines one or more functional product groups 103A, 103B, and the like, that comprise a plurality of custom products having indicia of the particular design style. For example, if the indication suggests, or indicates, that the user likes floral patterns, then platform 100 may determine several functional groups that include collections of various products that have floral embellishments and designs.

In some embodiments, definitions stored in the database of different design types, different design genres, different design types, different design ornaments, and the like, may include a plurality of collections and designs that are grouped based on certain design styles. The styles may be defined using photographs depicting design styles, images of embellishments specific to design styles, images of articles showing the design styles, names of designers, words describing the design styles, and the like. Hence, determining functional product groups 103A, 103B, and the like, based on the indication of a particular design style and definitions stored in the database may include employing a parser, an image analyzer, an image comparator, a text comparator, and the like. Determining may include, for example, comparing the textual information included in an inspiration board (corresponding herein to an indication) and the textual information included in definitions stored in the database. Determining the functional product groups, based on the indication of a particular design style and the definitions may also include performing a digital comparison of the digital images included in the inspiration board and the digital images included in the definitions stored in the database.

Platform 100 may initiate a collaboration session between user 102A and one or more collaborators, including user 602B to cause displaying a plurality of custom products on a user device and on collaborators devices, to allow the user and the one or more collaborators to view the plurality of custom products, and to select, from the plurality of custom products, one or more particular custom products. For example, platform 100 may initiate the collaboration session between user 102A and one or more collaborators, including user 602B, and display one or more collections of products selected from 103A, 103B, 103N, 103AA, 103AB, that may include shoes, t-shirts, napkins, towels, teacups, mugs, and the like, having floral embellishments. Examples of collaboration sessions include collaboration video chats. The video chats may be used as part of collaborative video chat screen sharing using the collaboration platform.

If the user selects some particular products from the displayed collections, then, based on the selected particular products, platform 100 may determine, for each particular customized product, the product's associated product type of a plurality of product types.

Furthermore, for each product type of the plurality of product types, platform 100 may determine a manufacturing constraint of multiple manufacturing constraints. The constraints are described in detail later.

For a particular customized product from the group of customized products, platform 100 may obtain a manufacturing method for manufacturing the customized particular product and determine a product type of the customized particular product and a manufacturing constraint associated with the product type.

Based on, at least in part, the manufacturing constraint, platform 100 determines physical constraints and manufacturing instructions for manufacturing the customized particular product using the manufacturing method. Then, platform 100 may send the manufacturing instructions to a manufacturer. This process is described in detail later.

4.0. Examples of User Characteristics

FIGS. 1B1 and 1B2 example characteristics of users who may, for example, customize the products using a collaboration platform. The data depicted in FIG. 1B1-1B2 are fictitious data and are provided herein only to describe examples of the user's characteristics that could potentially be used in implementations of the parametric fitting approach.

FIG. 1B1 is a block diagram showing example user characteristics. In the example depicted in FIG. 1B1, a user's characteristics 102B1 include skin artifacts, head hair color, head hair, hair head style, posture, cap size, short size, bra size, cut size, clothing comment, head sensitivity, and the like. FIG. 1B1 also depicts identifiers for subjects (in column 1) and values for the corresponding characteristics for the subjects. For example, a subject #1 had medical tape on toes, was a brunette with short straight hair and a good posture.

In some implementations, a user's characteristics may be stored in a user's profile and available when the user accesses a corresponding computer system and/or customizes products using the computer system.

FIG. 1B2 is a block diagram showing example user characteristics. In the example depicted in FIG. 1B2, a user's characteristics 102_B2 include an acromial ht sit lt, acromial hit sit rt, bi-lateral femoral epicondyle brth, bi-trochanteric brth, and the like. For each of the subjects (listed in column 2), values for all corresponding characteristics are provided in the depicted table.

In some implementations, a user's characteristics and the corresponding values may be stored in a user's profile and available when the user accesses a corresponding computer system and/or customizes products using the computer system.

5.0. Examples of Templates

At a high level of abstraction, a process of custom fitting and manufacturing a parametric product includes generating a parametric model of the custom product, and then customizing the parametric model of the custom product to improve the fit of the product for a user. The parametric model of the custom product may include one or more sub-models, and each of the sub-models may correspond to a part, or a component, of the custom model.

This may be explained using an example of a shoe as a custom product. However, it should be understood that the example of the shoe should not be viewed as limited in any way. The description included herein is meant to be extrapolated to other custom products.

FIG. 1B3 is a block diagram showing an example custom product. In FIG. 1B3, the example custom product is a tennis shoe. FIG. 1B4 is a block diagram showing example templates of an example custom product.

Suppose that a custom product is a lace up shoe (such as a tennis shoe shown and described later in FIG. 1B3). In this example, the parts of the product/shoe may include a lace up left portion 1B3_100, a lace up right portion 1B3_102, a laceup tongue portion 1B3_104, a lace up right quarter 1B3_106, a laceup left quarter 1B3_108, a lace up front 1B3_110, and so forth. Each of the portions may have a corresponding template, and the templates for the portions may be captured in a parametric model of the custom product. Referring to FIG. 1B4, examples of templates may include a lace up left portion 1B3_100, a lace up right portion 1B3_102, a laceup tongue portion 1B3_104, a laceup tongue 1B3_112, a lace up front 1B3_110, and so forth.

Referring again to a shoe as an example of a custom product, the custom product may have different dimensions (e.g., sizes), which may be used as a starting point for a parametric model for the custom product. To allow a customer to customize the shoe so it fits the customer's foot, then the customer may provide adjustment parameters of, for example, the shoe width, the shoe length, and the like, to customize the fit of the shoe for the customer. The adjustment parameters may be used to modify the parametric model of the shoe and thus to generate a parametric fit model of the custom product so it fits the customer.

Among other things, the process of a custom fitting and manufacturing of a parametric product includes determining components, or parts, of the custom product, and then generating templates for the corresponding components, and customizing the templates according to a customer's provided adjustments to improve the fit of the custom product and to generate a parametric custom fit model. The process of generating the templates for the components may be referred to as generating a parametric model for the custom product, as described later, and the process of customizing the parametric model based on the customer-provided adjustments, as described later, may be referred to as generating a parametric fit model of the custom product.

More specifically, a core service may generate a parametric model of a custom product based on, at least in part, past learned data pertaining to the custom product and user-specific data of a user. Then, the core service may translate the parametric model of the custom product to a plurality of parameters of the custom product. Each parameter, of the plurality of parameters of the custom product, may be represented as a key-value pair, as described before.

Based on, at least in part, the plurality of parameters of the custom product, the core service may generate a first graphical representation of the custom product, and then generate a first user interface and display the first user interface comprising at least the first graphical representation of the custom product. The first user interface may be displayed on, for example, on a computer display device of a customer, or a designer, and any other user assisting in the customization of the product.

The first user interface may display, on the computer display device, the first graphical representation of the custom product as a visualization of the parametric model of the custom product showing how the parametric physical product, manufactured based on the plurality of fit model parameters using a plurality of fit key-values of the parametric fit model, fits the user having the user-specific data.

The key-value pair is a data structure that includes an attribute key and a corresponding attribute value and will be described in detail later.

Furthermore, the first user interface may also display one or more regions of the visualization of the parametric model of the custom product. Referring again to FIG. 1B3, the exemplary first user interface may display the different regions of the lace up shoe. A region of the one or more regions of the visualization may be adjustable using one or more functionalities of the first user interface. The one or more functionalities of the first user interface may allow adjusting a fit of the parametric physical product to the user having the user-specific data.

The first user interface may be used to, for example, receive a selection of a region, from the one or more regions, and an indication that the customized product should have either a looser fit or a tighter fit. Referring again to FIG. 1B3, using the first user interface, a user may provide a selection of, for example, lace up front portion 1B3_110, and provide an indication that that particular portion was, for example, wider to provide a looser fit.

The parametric model may be modified, or otherwise, adjusted, based on adjustment input that may be received either from a customer or a designer assisting the customer, or both. If the adjustment input is provided by, for example, the customer, then the adjustment input may be provided via the first user interface, described above, and may include so-called adjustment parameters.

In some implementations, if it is determined that a plurality of adjustment parameters for improving a fit of the custom product in relation to the user-specific data has been received, then, based on the plurality of adjustment parameters and the plurality of parameters of the custom product, the core service may generate a parametric fit model for the custom product. The parametric fit model may include, for example, a plurality of fit model parameters. A fit model parameter, of the plurality of fit model parameters of the parametric fit model, may be represented as a fit key-value pair.

Subsequently, the core service may transmit the parametric fit model to a manufacturer to cause the manufacturer to produce a parametric physical product based on the parametric fit model having the plurality of fit model parameters.

In some implementations, the adjustment input may be provided by, for example, an agent, or a designer, who assists the customer to custom fit the custom product for the customer. In this situation, suppose that the customer invited an agent to collaborate on adjusting the parametric fit model so it fits the customer.

To facilitate the collaboration between the customer and the agent, the core service may generate, based on, at least in part, a plurality of fit parameters of the parametric fit model, a second graphical representation of the parametric physical product. Then, a second user interface may be generated and displayed, on a user computer display device, the second user interface comprising at least the second graphical representation of the parametric physical product. Furthermore, the core service may generate a third user interface and display, on an agent computer display device, the third user interface comprising at least the second graphical representation of the parametric physical product. Once a plurality of user adjustment parameters for improving a fit of the parametric physical product is received from the customer, and once a plurality of agent adjustment parameters for improving a fit of the parametric physical product is received from the agent, an adjusted parametric fit model for the custom product is generated based on, at least, the plurality of user adjustment parameters, the plurality of agent adjustment parameters and the plurality of fit parameters of the parametric physical product. The adjusted parametric fit model may have a plurality of new fit model parameters. A new fit model parameter, of the plurality of new fit model parameters of the adjusted parametric fit model, may be represented as an adjusted fit key-value pair.

The adjusted parametric fit model may be transmitted to the manufacturer to cause the manufacturer to produce the parametric physical product based on a plurality of adjusted fit model parameters of the adjusted parametric fit model.

6.0. Decorative Surfaces 6.1. Automatic Pattern Matching

In computer science, pattern matching is an art of ensuring, using a computer and automated processes, that a given design elements of the pattern match the corresponding design elements across, for example, seams, edges, and the like.

The patterns generally have the form of either sequences or tree structures. Uses of pattern matching include outputting the locations (if any) of a pattern within a token sequence, to output some component of the matched pattern, and to substitute the matching pattern with some other token sequence (i.e., search and replace).

Sequence patterns (e.g., a text string) are often described using regular expressions and matched using techniques such as backtracking.

6.1.1. Cutouts

A cutout is something cut out or off from something else. For example, to custom build, or manufacture a sneaker shoe, an operator cuts certain templates out of template material, and then sews the templates together to assemble the sneaker. Examples of the cutout templates were described in FIG. 1B4.

6.1.2. Print Cuts

A print cut is a result of printing a cutout. For example, to custom build, or manufacture a sneaker shoe, an operator may use templates (e.g., a cut out of the template material) as a reference to cut, out of a fabric or plastic, the corresponding print cuts based on the templates made out of the template material.

6.1.3. Ornaments

Templates in the context of the present disclosure are computer-based, automated tools for generating, for example, print cuts. They guide an operator on how to cut an actual print cut out of a fabric, how to resize a print cut out to fit the substrate as well as allow you to see a mock-up of the final imaged product.

In some embodiments, a print cut may include ornaments. The ornaments may be parts of the final customized product.

The ornaments may have different sizes and shapes. Some ornaments may be, for example, cylindrical objects. Ornaments that are cylindrical objects may be made out of special templates that can be wrapped around and have marked the corresponding boundaries. Once the critical points are marked, the boundaries may be mapped onto a print cut.

Some ornaments may have irregular shapes, such as a star, heart, snowflake, etc. They can be traced or scanned and then transferred onto a print cut. One method is to use a pencil and carefully trace the edges of the object. After tracing is complete, you can scan it into your computer.

6.2. Transformations

A process of custom fitting and manufacturing parametric products includes, among other things, generating a digital graphics image, which is a result of many mathematical calculations and transformation of an original custom product. In fact, every part of the custom product may be transformed by, for example, translating, rotating, scaling, and the like. Furthermore, every pixel of every part of the custom product may be transformed by, for example, adjusting the color, luminescence, shading, and the like.

Examples of typical transformations that may be used in the process of custom fitting and manufacturing parametric products may include translation (e.g., moving an object), rotation (spinning an object), and scaling (changing a size of an object). The above transformation may be explained by reference to the Cartesian coordinates system, which has an X axis, Y axis, and Z axis.

6.2.1. Translations, Flips and Rotations

Translation of an object includes moving an object along one or more axes. A horizontal translation includes moving the object along the X axes. A vertical translation includes moving the object along the Y axis. A depth-based translation includes moving the object along the Z axes.

Flipping an object includes projecting the object with respect to one or more planes, including an XY plane, an XZ plane, a YZ plane, or combination thereof.

Rotation of an object includes rotating an object around one or more axes.

6.2.2. Stretching

Stretching of an object, also called scaling of an object, is modifying the size of the object along one or more axes. It is used to control the size of the object, as well as creating visual effects such as making the object appear closer or further away.

6.2.3. Replications

Replication of an object is a continuous copying of the object from one location to another. This may be used to create various visual effects and patterns.

6.3. Printing on Products

Printing on a custom product may include printing an ornament or another object on the custom product. For example, this may include applying a logo to a t-shirt, applying a phrase to a t-shirt, and the like.

7.0. Example Computer Environments

In some implementations, an approach for custom fitting and manufacturing custom product is implemented in a product collaboration platform (e.g., an element 16AA in FIG. 1C), and more specifically in a parametric fitting framework (e.g., an element 110A shown in FIG. 1A, FIG. 1B).

Generally, the product collaboration platform allows users, designers, customers, and support engineers, to, for example, design and create digital designs of products. An example computer environment for the process of creating digital designs, manufacturing products, and the like is described later in FIG. 1C.

A digital design for a product may be captured in, for example, product description data for the product. A hyperlink to the particular location may be created and transmitted from the collaboration platform to a manufacturing server to cause the manufacturing server to generate a final product based on the digital design.

Figure 1C:
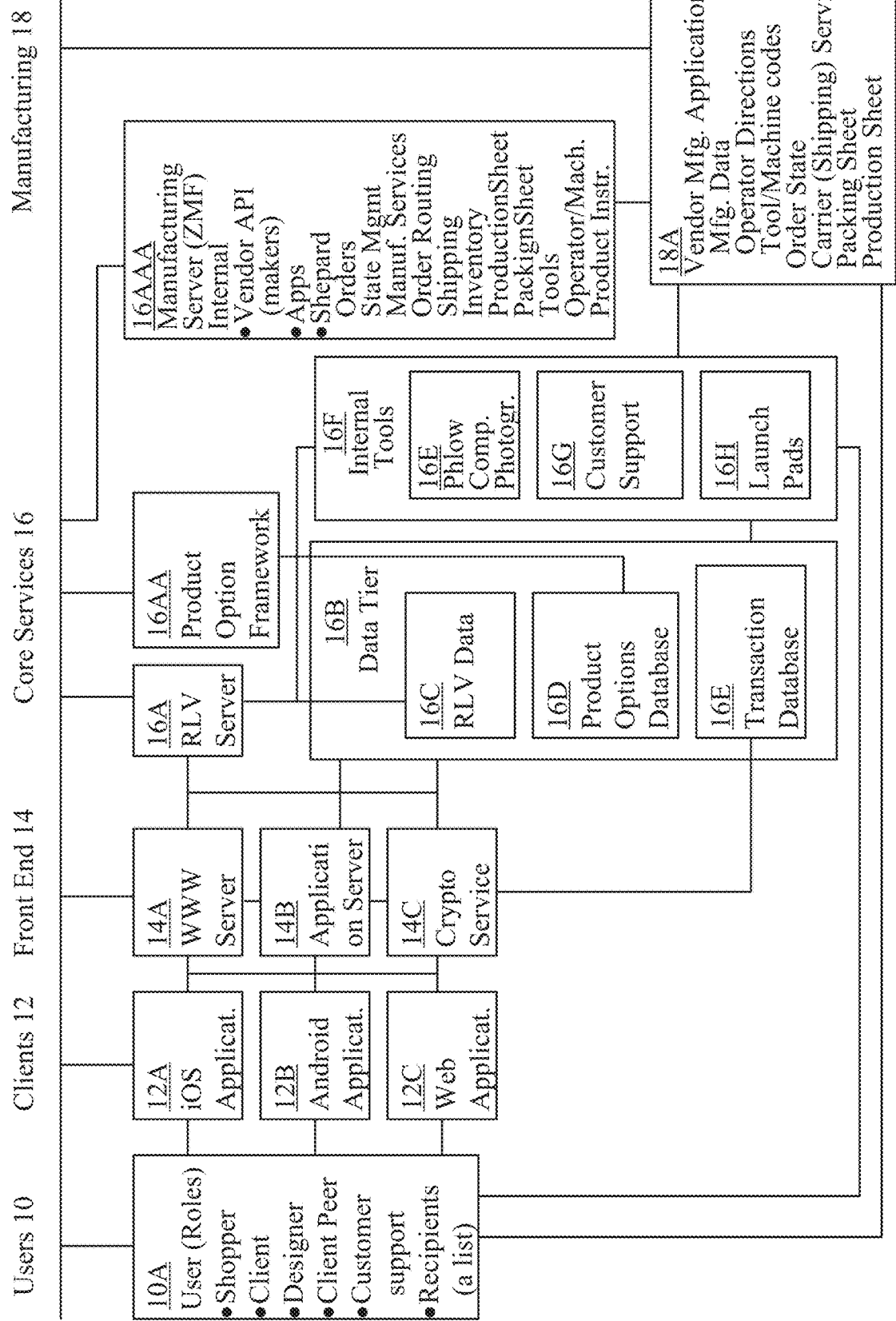
FIG. 1C is a block diagram showing an example system for custom fitting and manufacturing parametric products.

A product may be a digital product, such as a digital gift card, or may be a physical product, such as a physical t-shirt. FIG. 1C is a block diagram showing an example system for custom fitting and manufacturing parametric products.

FIG. 1C, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1C, users 10 are individuals who create and design digital designs of products; clients 12 correspond to software applications configured to facilitate communications between users 10 and front end servers 14; core services 16 correspond to software applications and tools configured to facilitate creating and designing of the digital designs and generating manufacturing instructions for manufacturing final products based on the digital designs; and manufacturing 18 corresponds to manufacturing servers and applications configured to manufacture, or cause manufacturing, the final products, and the like.

7.1. User Devices

FIG. 1C depicts several examples of users 10. Each of users 10 may use its own, or shared, computer device. Examples of user devices are described later in FIG. 2 (see devices 140A-G).

In some embodiments, examples of users 10 are determined based on the roles that may be assigned to the users. Examples 10A of roles may include a shopper, a client, a designer, a client peer, a customer support engineer, a recipient, and the like.

7.2. Client Applications

Clients 12 in FIG. 1C refer s to client applications that are implemented in client servers 14 and that are configured to support requests received from users 10A. Non-limiting examples of clients 12 may include iOS applications 12A, Android applications 12B, Web applications 12C, and the like.

7.3. Front End Servers

Front end servers 14 refer to computer-based servers that are configured to process requests received from clients 12 and in many cases interact with core services 16 to further resolve these requests. Examples of front end servers 14 include one or more WWW servers 14A, one or more application servers 14B, one or more cryptographic servers 14C. Cryptographic servers 14C may be configured to provide cryptographic services for encrypting/decrypting, transmitting, or otherwise communicating data between the entities depicted in FIG. 1C.

7.4. Core Services

Core services 16 in FIG. 1C refers to servers and services implemented in a role-based collaboration platform configured to provide functionalities for creating and designing digital designs, handle collaboration requests, and facilitate the customization requests received from users 10.

In some embodiments, a customization process performed by a user, of users 10, and intended to generate a digital design of a customized product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size, may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of a plastic may be selected for manufacturing a bike helmet.

The properties may also include a body texture such as the fabric weave of a t-shirt may be specified to be smooth or slubby. For instance, the surface of a plastic bike helmet may be polished or satin. Each property is necessarily specific to each class of materials. Examples of materials and properties may include a fabric (such as a weave or knit type, a fiber type (cotton, wool, flax, polyester, polypropylene), a thread size, a thread count, a color, an integral design (ikat, knit, tapestry), a bolt width, a selvage type, a surface (hand), and the like.

The properties may also include plastics, which may include sub-properties such as a color, a surface quality (e.g., a bidirectional luminance function), a melting point, impact resistance, a forming method (e.g., thermoplastic, cast), a type (e.g., acrylic, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, a toxicity, and the like.

The properties may also include non-woven specified by a type (e.g., paper, felt, Tyvek, etc.), a color, a surface quality (e.g., a bidirectional luminance function), a surface type (e.g., hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during laser sintering of metals, a mix of metal alloys with a variety of properties may be deposited, resulting in a product composed of gradations of metallic properties. According to yet another example, during high resolution uv-printing, layers of the uv-cured material with different refractive indices may be deposited, resulting in a large variety of optical effects.

The properties may also include embellishment such as a trim-color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key-value pairs. These manufacturing constraints are propagated through the entire system and method, and by using these product option key-values, allowing for the manufacturing of a series of custom products that meet these physical constraints.

Referring again to FIG. 1C, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like.

In some embodiments, core services 16 may also utilize internal tools 16F, such as a "Phlow" computational photographical tools 16E, a customer support tools 16G, a launch pads tools 16H, and the like.

Product option framework 16AA is also referred to as a persistent design data framework. The framework data may include a product options set, which may include a set of product options pertaining to a specific product type. It usually contains the product instructions (e.g., collaboration components 106 in FIG. 2) for manufacturing, or producing, the product.

In some embodiments, product option framework 16AA is configured to provide services for transforming ProductOption key-value pairs (i.e., manufacturing constraints) from one product to the other. Transforming the ProductOption key-value pairs from one product to another may require, for example, transforming the color space (i.e., sRGB to CMYK US Web Coated (SWOP) v2), transforming an image from raster to vector, and/or resizing the image for the fit.

An example use case of the product option framework is described in detail in FIG. 2.

In some embodiments, there are two basic types of product instructions (1) fixed (that include the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a customized product are usually parametric. The parameters include the size of the customized product (this can be multi-dimensional, and include width, height, depth). The parameters may also relate to human sizes or age. The parameters may also be custom and based on biometric information.

The parameters may also include a component body color, a component body texture, a trim body color, a trim body texture, a design area, and the like.

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (i.e., enumerated) values may include a discrete type of fabric such as cotton, cotton-polyester blend, silk, and the like. The discrete values may also include specific colors, such as white, navy, black, and the like.

Examples of continuous values of key-value pairs may include a single element, such a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship.

In some embodiments, a product option framework event chain includes one or more products, and the chain may represent or memorialize an event. The products may represent or memorialize an event. Examples of events may include weddings, birthdays, anniversaries, graduations, national holidays, reunions, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthday event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role for the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

In an embodiment, a product option framework is configured to generate a product option framework user interface. Accordingly, each product option set is associated with logic and code to build a user interface element for each parametric product option. Furthermore, each product options set contains style hints so that each user interface element may be artfully placed to produce a high quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product configurable image, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

8.0. Example Manufacturing System

Referring again to FIG. 1C manufacturing instructions may be communicated from core services 16 to manufacturing 18, which may include one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

A final product may be manufactured using markups. A markup for, for example, a body color of a product may be made by specifying a distinct and separate color for Body-Color key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product RealView may be performed by setting its product option key-values and shading each of its constructed layers.

8.1. Output Style

As described above, a manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework (described in detail in FIG. 2) builds an interface for a key called OutputStyle. The interface for the OutputStyle key may allow a designer (or any other collaborator) to select values for the media for the presentation of an interactive design. The choices may include a JPEG_Image, a GIF_Image, and an H264_Video.

If a designer chooses the GIF_Image option, then the product options framework may send the instructions to the manufacturing system to traverse each of the key-values in the KeyValueJournal, and for each key, and use a User Product Renderer to render the state of the custom physical product with that modification as images in the sRGB 32-bit RGBA format.

8.2. Example Manufacturing Process

The manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input KeyValueJournal's UUID in the 8 bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input KeyValueJournal's UUID.

Next, the manufacturing system sets a FrameCount to 1 and proceeds to processing each frame in the image file. The processing includes checking if there is an image in the 8 bit indexed color image cache; and if so, then the manufacturing system continues; otherwise, the manufacturing system proceeds to taking the next image.

To continue, the manufacturing system writes the gif Graphic Control Description for the FrameCount, and then processes the first 8 bit indexed color image cache into blocks of 255 LZW compressed bytes.

Next, the manufacturing system writes the compressed bytes, and removes the first image from the 8 bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

9.0. Example Product Collaboration Platform

In some embodiments, the approach presented herein is implemented in one or more computer systems that host a product collaboration platform. Alternatively, the approach may be implemented in one or more computer systems that communicate with the collaboration platform but that do not actually host the platform itself. For the clarity of the description, it is assumed that the computer environment supporting the approach presented herein is implemented in the product collaboration platform.

FIG. 2 is a block diagram showing an example of a collaboration platform. In the example depicted in FIG. 2, a computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155 (including a monitoring system 156, and a request analyzer 159), one or more blacklist databases 163, one or more actions databases 162, an agreement processor 152, a communications processor 153, and a code embedder 158. Computer collaboration system 100 may communicate directly, or via one or more communications networks 130, with one or more user computers 140A-140G, all described in detail later.

Computer collaboration system 100 shown in FIG. 2 is provided herein to illustrate clear examples and should not be considered as limiting in any way. Other computer collaboration systems may include additional components such as computer servers, various input/output devices, and additional software and/or hardware components that are not depicted in FIG. 2. Other computer collaboration systems may be implemented in cloud-based systems, distributed computer networks, and the like. Other computer collaboration systems may include fewer components than example computer collaboration system 100 shown in FIG. 2. Computer collaboration system 100 is described in detail later.

10.0. Designing an Asset

In some implementations, a product visualization platform is configured to execute authoring software applications designed to generate high quality renderings and manufacturing outputs of custom products. The high quality renderings may be used to, for example, generate depictions of various products and the products' components. The products are also referred to herein as assets. The assets may be displayed on a website featuring the assets and facilitating the personalization, customization and ordering the product by customers. The customizing of the products may involve, for example, employing the high quality renderings to be able to display the products using functionalities of the website.

However, before a high quality rendering of an asset may be generated, the asset needs to be designed and then a test needs to be performed to determine whether a manufacturer can manufacture a physical product corresponding to the asset according to the designer's specifications.

10.1. Asset Definition Data

Asset definition data is the data that parametrically describes an asset and/or a customized product. In some implementations, the asset definition data includes the Product Description Key-Values as disclosed in, for example, U.S. patent application Ser. No. 17/458,116, U.S. patent application Ser. No. 17/501,513, U.S. patent application Ser. No. 17/387,154, U.S. patent application Ser. No. 17/384,636, U.S. patent application Ser. No. 17/501,451, U.S. patent application Ser. No. 16/867,898, and U.S. Pat. No. 11,080,912.

In addition to the Product Description Key-Values, manufacturing constraints may also be used. The manufacturing constraints may be used to set forth the metes and bounds for the equipment employed by the manufacturers involved in producing the products. The manufacturing instructions are usually compatible with the configurations of, for example, manufacturing servers, such as print servers, that process the manufacturing instructions and generate outputs that meet the requirements of the customer settings.

Manufacturing instructions usually capture all the information that needs to be provided to a manufacturer so that the manufacturer can produce/manufacture a product that was customized by a user and/or a designer. The manufacturing instructions capture the key-value pairs (described in detail later) in the form that is understandable by the equipment deployed by the manufacturer. As it will be described later, two or more customized products may have their own individual sets of key-value pairs; however, not all, but some of the key-value pairs in the corresponding individual sets of the key-value pairs may be the same. For example, a collection of coffee mugs having a particular floral design imprinted on the mugs of the collection may share, or have similar, subsets of the key-value pairs that capture the details of the particular floral design.

Certain details of a group of certain customized products may be captured by a subset of the key-value pairs that may be specific to each and every certain customized product. That subset of the key-value pairs may be included in, so-called, a dictionary and labeled as reusable key-value pairs. The dictionary may be stored in a storage or a memory unit by, for example, a product customization platform, which is described later.

Similarly, one or more certain manufacturing constraints of a plurality of manufacturing constraints for manufacturing a group of certain customized products, may be specific to each and every certain customized product. The one or more certain manufacturing constraints may be included in the dictionary and labeled as reusable manufacturing constraints.

Realistically, during conversations with a manufacturer, it might be difficult to describe the necessary manufacturing constraints in the way that a product that the manufacturer manufactured would match the customized product (described using the key-value pairs). Therefore, there is a need to use the dictionary with the labeled particular manufacturing instructions (corresponding to a subset of the certain key-value pairs), and then select a short list of the manufacturing instructions, selected from the labeled particular manufacturing instructions, and use them as a starting point to capture the characteristics of the customized product. Then the manufacturing instructions from the shortlist may be refined and further fine-tuned until the accurate manufactured product can be produced.

10.2. Collaboration on Custom Fitting

FIG. 3 is a block diagram showing an example of collaboration on custom fitting and manufacturing parametric products. Stating differently, FIG. 3 is a block diagram showing a collaboration example implemented in a product collaboration platform. In the depicted example, a user 202 collaborates with a designer 212 and/or a user support agent 216. Generally, user 202 may contemporaneously collaborate with several peers, several support agents, and/or several designers.

In FIG. 3, user 202 communicates with designer 212 via a communications session established along link 256 and communicates with user support agent 216 via a communications session established along link 252. The data communicated by designer 212 are transmitted to collaboration server 155 via a link 204A; the data communicated by user 202 are transmitted to collaboration server 155 via a link 202A; and the data communicated by agent 216 are transmitted to collaboration server 155 via a link 216A.

In some embodiments, monitoring system 156 of collaboration server 155 intercepts a data stream exchanged along link 256 and/or intercepts a data stream exchanged along link 252. Collaboration server 155 may cooperate with product options framework 110 and transmit (20E1) data to product options framework 110. Collaboration server 155 may also collaborate with attribute engine 108 and transmit (20E3) data to collaboration server 155.

Furthermore, collaboration server 155 may cooperate with request analyzer 159 and transmit (20E2) a request made by user 202 for, for example, assistance from designer 212 (or agent 216), to request analyzer 159.

In some embodiments, request analyzer 159 may request and receive (20E4) the data from product options framework 110. Furthermore, request analyzer 159 may request and receive (20E5) the data from attribute engine 108. Request analyzer 159 may also request information from designer database 562, designs database 564, and the like. Processing of the request is described in detail later.

Collaboration server 155, product option framework 110, attribute engine 108 and request analyzer 159 may cooperate with each other. This may include journaling a plurality of key-value pairs generated during the interactive session during which designer 212, user 202 and user support agent 216 create the interactive digital design. This may also include transforming ownership and license agreements, embedded in the plurality of key-value pairs journaled during a collaboration session, into, for example, a graph-network and then into an ownership-agreement tree. This may also include evaluating the ownership-agreement tree with respect to communications channels 256 and 252, established between user 202, designer 212 and user support agent 216, respectively to determine whether any communications between any users 202, 204 and 216 violated any constraints included in the ownership-agreement tree.

Collaboration server 155, product option framework 110, attribute engine 108 and request analyzer 159 may also cooperate with each other when a request for ordering, for example, a physical product corresponding to the interactive digital design is received. In response to receiving the request, collaboration server 155, product option framework 110, attribute engine 108 and request analyzer 159 may collaborate to generate, determine, or retrieve, a token 330 that represents a plurality of key-value pairs for the interactive design.

In some embodiments, digital token 330, capturing a plurality of key-value pairs for the product, may be stored at a location in a storage unit. The location may be identified using a hyperlink or a UUID, described before. The generating of the token and storing of the token may be performed by, for example, a code embedder 158, depicted in FIG. 2.

In some embodiments, the hyperlink pointing to the location at which the plurality of key-value pairs is stored, or the UUID, is communicating to a manufacturing server 335. Manufacturing server 335 may retrieve, based on the hyperlink or the UUID, the plurality of the key-value pairs, and translate the pairs into, for example, manufacturing instructions for manufacturing an actual product. Then, manufacturing server 335 may use the manufacturing instructions to manufacture, based on the key-value pairs, an actual product. Depending on the manufacturing instructions, the actual product may be either a digital product 332 or a physical product 334.

Digital product 332 may be a digital greeting card, a digital invitation, or the like. Physical product 334 may be a physical water bottle, a physical mug, or the like.

In some embodiments, manufacturing server 335 generates a token that captures token data and describes how a user may request services related to the manufactured product, and how to access a product customization platform. The token, i.e., token digital data, may be encoded in a token label.

In some embodiments, if the actual product is digital product 332, then a token label is a token digital label pasted into an image of digital product 332. However, if the actual product is physical product 334, then a token label is a token physical label attached to the physical product 334.

11.0. Custom Fitting and Manufacturing Parametric Products

Figure 4A:
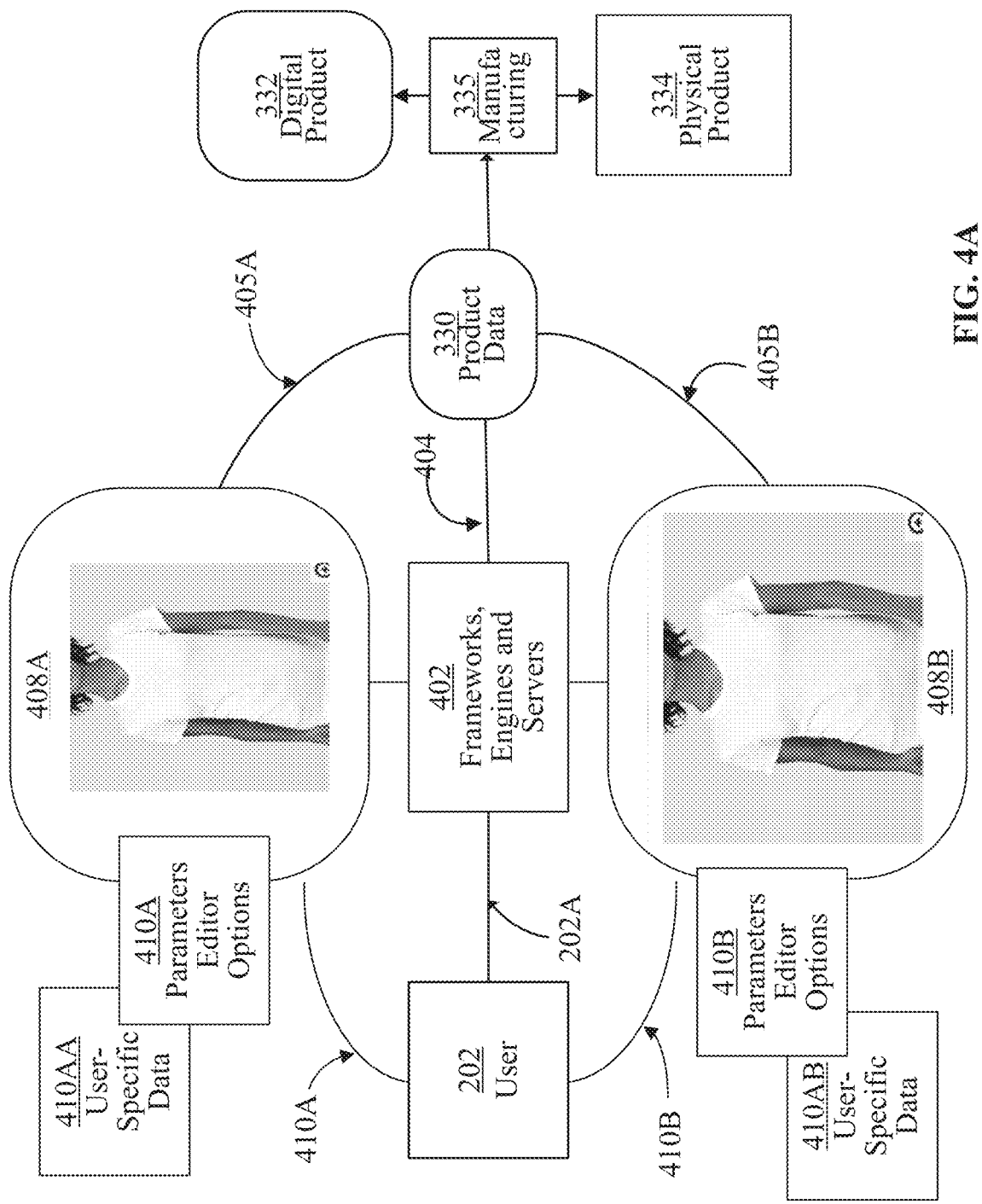
FIG. 4A is a block diagram showing an example of collaboration on modifying custom fitting and manufacturing parametric products.

FIG. 4A is a block diagram showing an example of collaboration on modifying custom fitting and manufacturing parametric products. In FIG. 4A, user 202 communicates with framework, engines, and servers 402 of product collaboration platform 100 via a communications session established along a link 202A.

User 202 may use user-specific data 410AA to help the user to select a particular custom product that would more-less meet the user's characteristics and expectation.

User 202 may modify the custom product by utilizing, for example, parameters editor options 410A, and in result generate the customized product, which then may be displayed in, for example, a window 408.

If the user is satisfied with the appearance of the customized product (as shown in window 408A), then product data 330 associated with the customized product may be transmitted to manufacturing 335 to generate either digital product 332 or physical product 334, or both.

However, if the user is not satisfied with the customized product, the user may repeat the customization steps by modifying the custom product by utilizing, for example, parameters editor options 410A, and in result generate an updated customized product, which then may be displayed in, for example, window 408.

In parallel, or independently, user 202 may establish another communications session and communicate (along link 202A) with a framework, engines, and servers 402 of product collaboration platform 100.

During that session, user 202 may use user-specific data 410AB to help the user to select a particular custom product that would more-less meet the user's characteristics and expectation.

User 202 may modify the custom product by utilizing, for example, parameters editor options 410AB, and in result generate the customized product, which then may be displayed in, for example, a window 408B.

If the user is satisfied with the appearance of the customized product (as shown in window 408B), then corresponding product data 330 associated with the customized product may be transmitted to manufacturing 335 to generate either digital product 332 or physical product 334, or both.

However, if the user is not satisfied with the customized product, the user may repeat the customization steps by modifying the custom product by utilizing, for example, parameters editor options 410AB, and in result generate an updated customized product, which then may be displayed in, for example, window 408B.

12.0. Fitting to Shapes

Customizing an appearance of a custom product may also include fitting a custom product to a shape provided by a user until the best fit for the product is achieved for the user.

For example, suppose that a user is browsing an online repository of custom products, and is particularly interested in selecting, customizing, and ordering a tennis shoe. Suppose that the user selected a particular custom product, which solely for the purpose of providing a simple example, is a tennis shoe. Then, suppose that the user provided his measurements (described in detail later). However, although the tennis shoes corresponding to the particular product come in several sizes, none of the sizes actually have the measurements that actually correspond to the measurements provided by the user.

In some implementations, the method presented herein allows implementing a modified novel interpolation approach to customize a custom product until the custom product has the measurements matching (within a tolerance as described later) the measurements provided by a user. The interpolation may be performed by interpolating two or more measurements corresponding to the respective two or more measurements of the corresponding versions, or sizes, of the custom product.

As it will be described later, from the implementation perspective, each of those types of shoes may have associated categories, and the categories may capture the information about the corresponding shoes' shapes. For example, children's shoes may have shapes that are different from women's shoes and/or men's shoes. Indeed, children's shoes may be smaller than women's shoes or men's shoes. Suppose that the user selected the women's shoes.

The user may also want to determine the occasion for the shoes. For example, if the user selected women's shoes, in the next step, the user may want to determine whether the user is looking for women's sneakers, tennis shoes, sleepers, heels, boots, flats, flip flops, evening shoes, etc. From the implementation perspective, each of those sub-types of shoes may have associated categories, and the categories may capture the information about the corresponding shoes' shapes. For example, the women's evening shoes may have the shapes that are different than, for example, the women's sleepers and/or the women's boots. Indeed, the women's evening shoes may have heels, while the women's sleepers may have no heels. Suppose that the user selected women's sneakers.

There are also different shapes and types of patterns for the customized products. Some custom products may come with different options, parameters, patterns, finishes, and the like. For example, the women's sneakers may come with a standard finish, an extra cushion, an extra support for an arch, leather finishes, leather shoelaces, fabric shoelaces, patterns, and the like. The subset of the options may be specific to the type of the shoes, the occasion, and the like.

For the shoes, for example, there might be a different set of flat patterns that are then sewn together to make the shoe. Hence, the fitting may include designing and fitting each of the flat patterns in the set for each size, each type, and the like.

12.1. Tennis Shoe Example

Figure 4B:
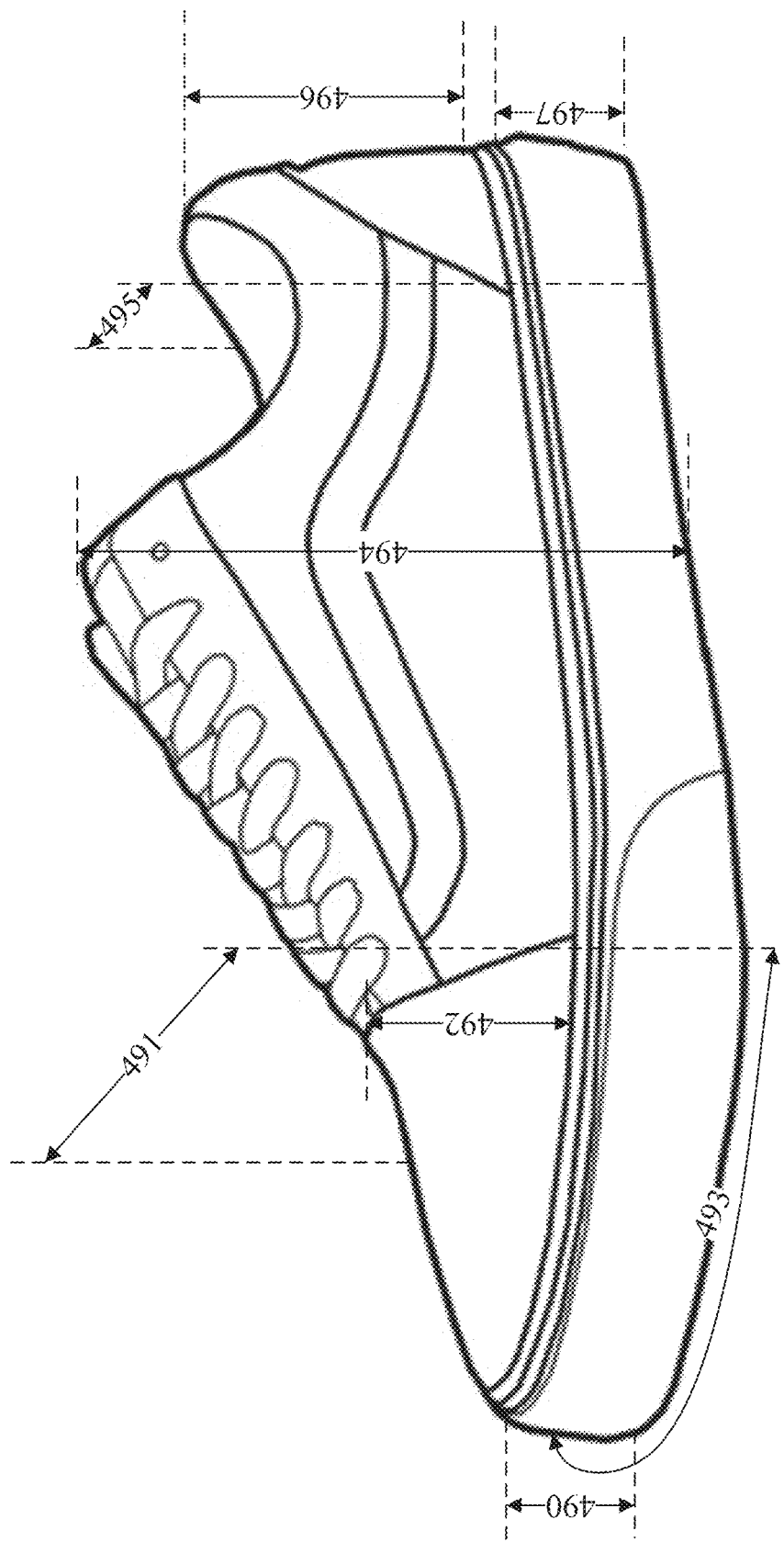
FIG. 4B is a block diagram showing an example of fitting to a shape.

FIG. 4B is a block diagram showing an example of fitting to a shape. This example illustrates the approach of fitting a tennis shoe template to the shape of a foot of a user.

Suppose that a shoe, depicted in FIG. 4B, has various parameters, including a shoe width 491, a front length 492, a front length 493, a shoe height 494, a shoe back width 495, a heel height 496, a sole height 497. Other parameters (e.g., dimensions) may also be included for a tennis shoe, as well as for other types of shoes.

Using the approach presented herein and using the graphical user interface presented herein, a user may adjust the values of parameters 491-497 (and others) until a desired shape of the shoe is achieved.

12.2. Purse Example

Figure 4C:
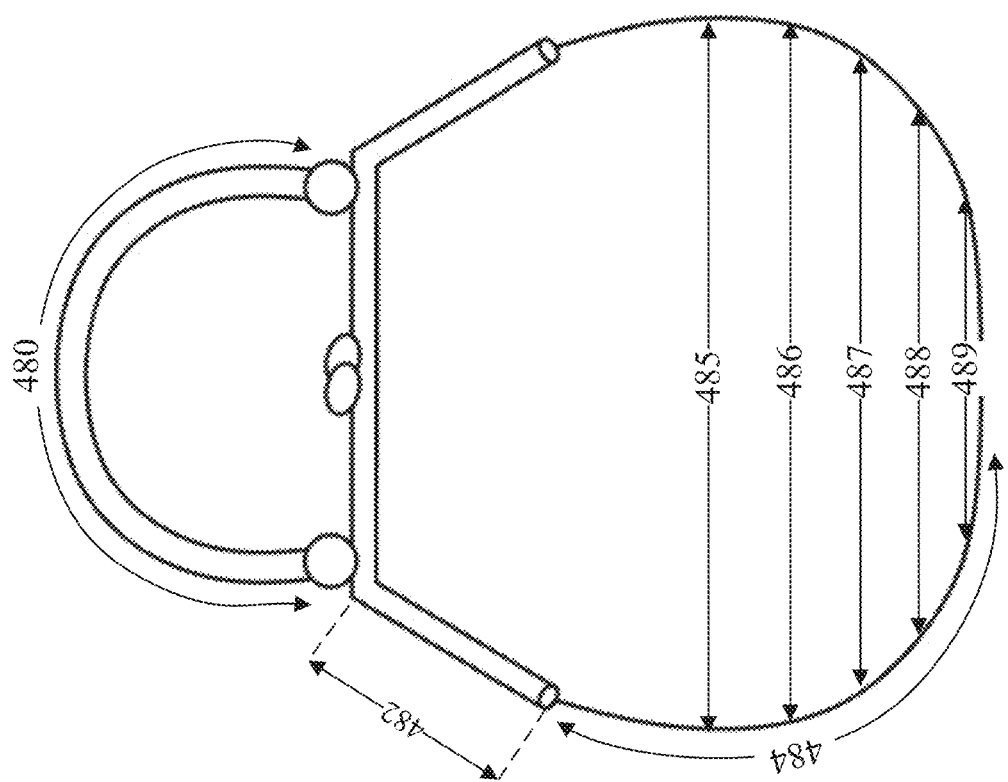
FIG. 4C is a block diagram showing an example of fitting to a shape.

FIG. 4C is a block diagram showing an example of fitting to a shape. This example illustrates the approach of fitting a purse template to the shape of a purse that a user would like to order.

Suppose that a purse, depicted in FIG. 4B, has various parameters, including a purse handle length 480, a purse opening height 482, a purse compartment length 484, and several parameters defining the purses' compartment shape, such as parameters 485-489. Other parameters (e.g., dimensions) may also be included for a purse, as well as for other types of shoes.

Using the approach presented herein and using the graphical user interface presented herein, a user may adjust the values of parameters 480-489 (and others) until a desired shape of the purse is achieved.

13.0. CUSTOMIZATION USING A LINEAR INTERPOLATION

Figure 4D:
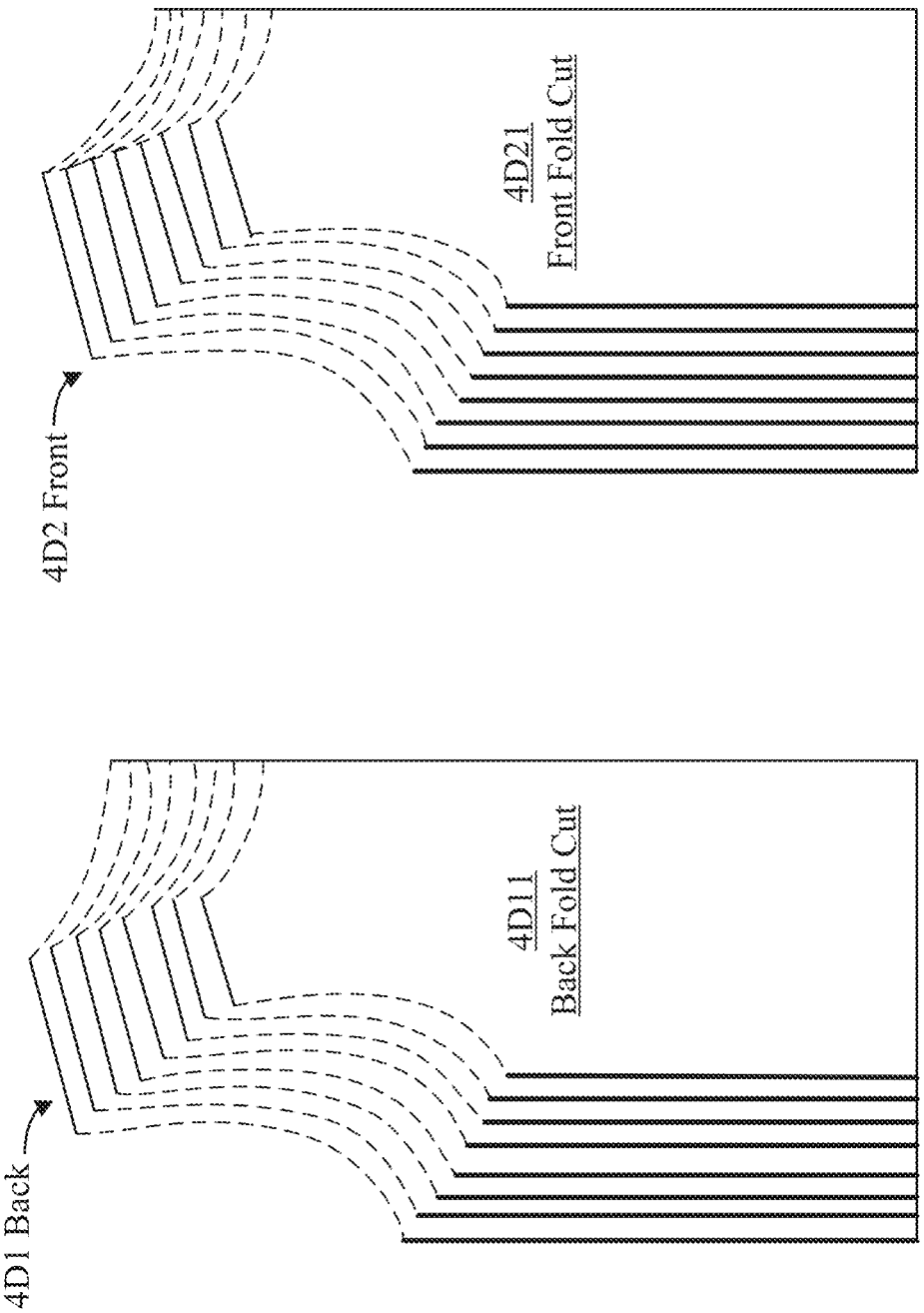
FIG. 4D is a block diagram showing examples of templates used to custom fit a parametric product using a 2D linear interpolation.

FIG. 4D is a block diagram showing examples of templates used to custom fit a parametric product using a 2D linear interpolation. The example depicted in FIG. 4D shows a back fold cut 4D11 of a back portion 4D1 of an example shirt and a front fold cut 4D21 of a front portion 4D2 of the example shirt.

Figure 4E:
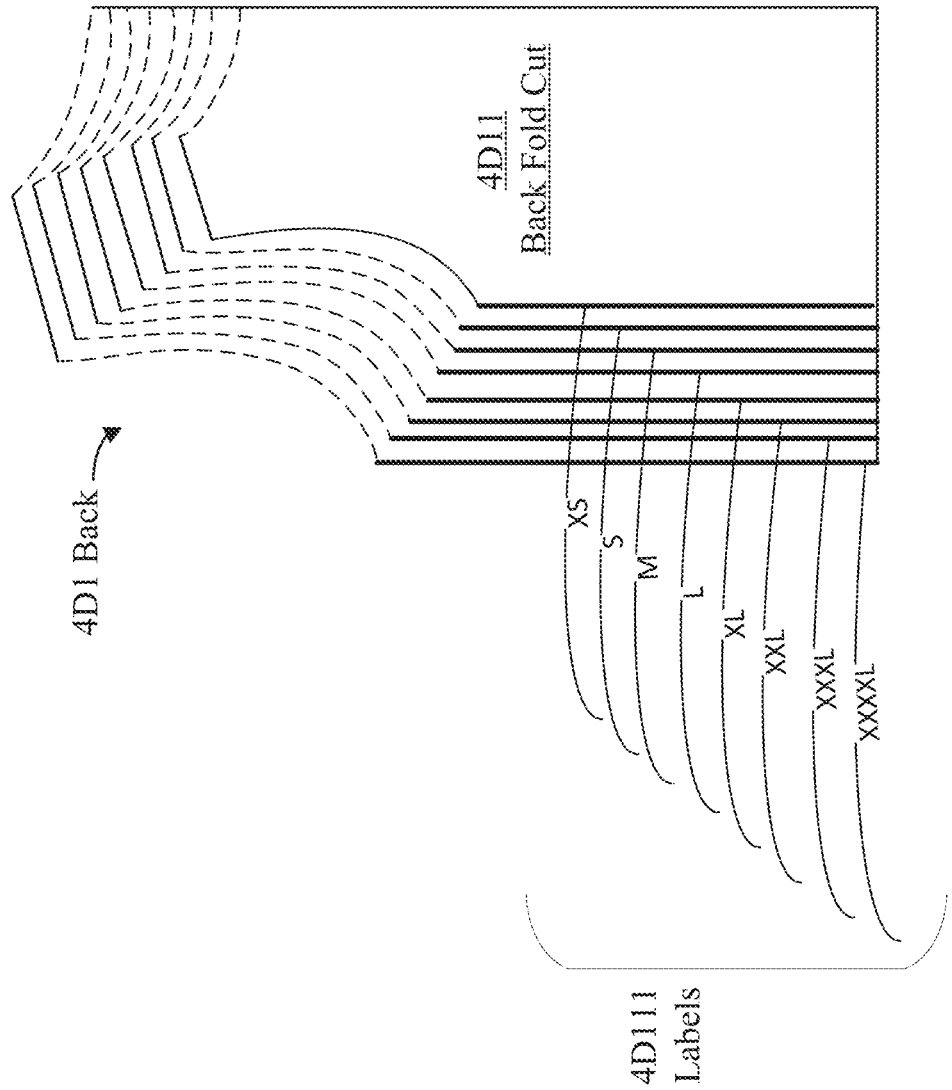
FIG. 4E is a block diagram showing an example of a template used to custom fit a parametric product using a 2D linear interpolation based on the product's sizes.

In the depicted example, the straight continuous lines are the lines of the corresponding fold cuts that can be represented using line geometric segments, while the broken lines are the lines of the corresponding fold cuts that can be represented using geometric curves. As shown in FIG. 4E, the straight continuous lines are shown for the torso portion of the example shirt and for the shoulder portion of the shirt, while the broken curved lines are shown for the around-arm portion of the shirt and for the around-neck portion of the shirt.

14.0. Customization Using a Linear Interpolation and Products' Sizes

FIG. 4E is a block diagram showing an example of a template used to custom fit a parametric product using a 2D linear interpolation based on the product's sizes. The depicted example not only shows back fold cut 4D11 of back portion 4D1 of the example shirt shown in FIG. 4D, but also shows labels 4D111, such as XS, S, M, L, XL, 2XL, 3XL, and 4XL, associated with the different sizes of the back-fold cut of the shirt. The labels are pointing to the corresponding straight continuous lines indicating the corresponding sizes of the shirt.

For the clarity of the description, the labels, such as XS, S, M, L, XL, 2XL, 3XL, and 4XL, associated with the different sizes of the back fold cut of the shirt, are shown only for the straight continuous lines for the torso portion of the example shirt. The labels, such as XS, S, M, L, XL, 2XL, 3XL, and 4XL, associated with the different sizes of the back fold cut of the shirt may be used by a manufacturer, and more specifically by a cutting machine used by the manufacturer, to cut, for example, the fabric for back portion of the shirt.

Figure 4F:
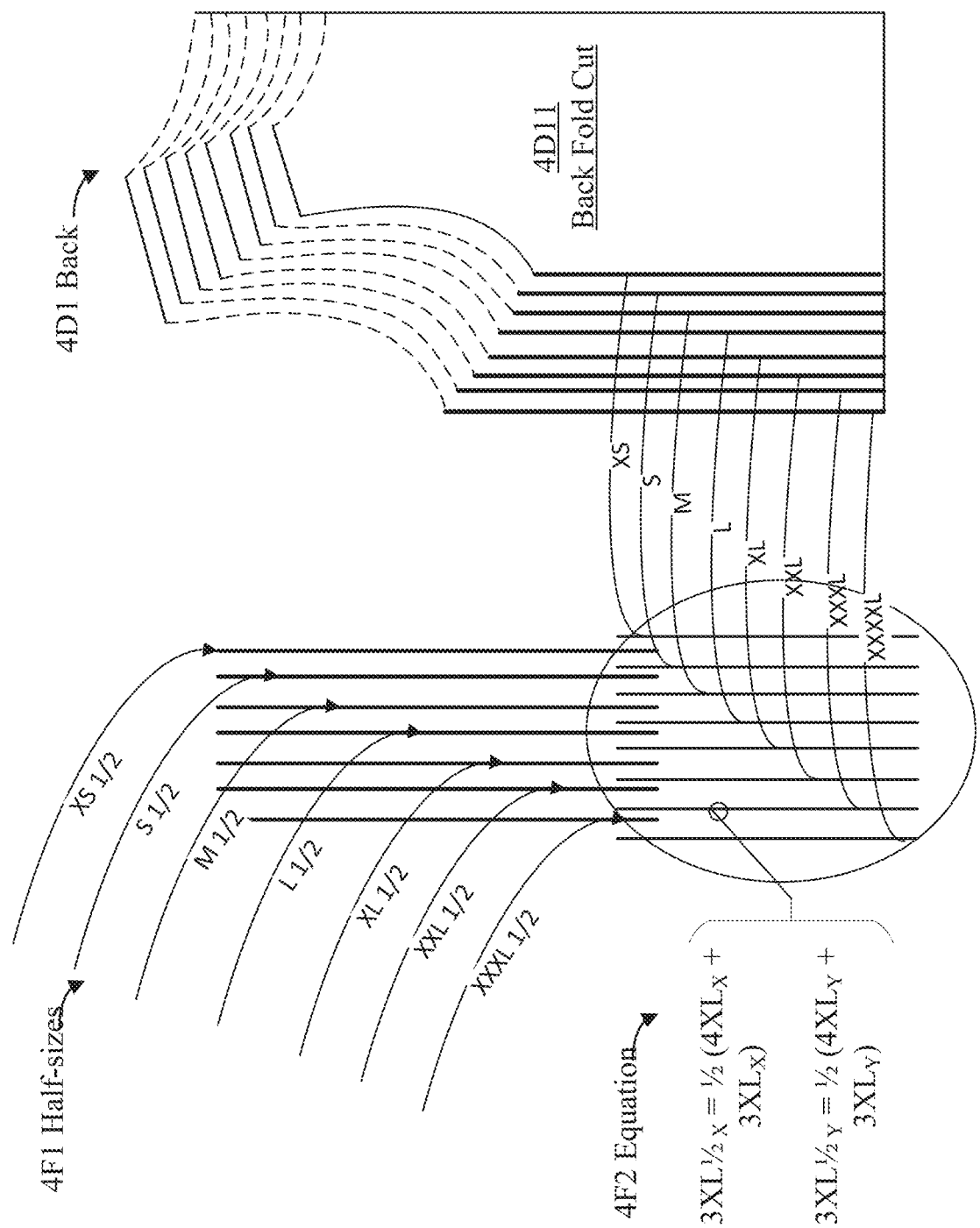
FIG. 4F is a block diagram showing an example of a template used to custom fit a parametric product using a 2D linear interpolation based on the product's sizes.

FIG. 4F is a block diagram showing an example of a template used to custom fit a parametric product using a 2D linear interpolation based on the product's sizes. The depicted example not only shows back fold cut 4D11 of back portion 4D1 of the example shirt shown in FIG. 4D, but also shows labels, such as XS, S, M, L, XL, 2XL, 3XL, and 4XL, associated with the different sizes of the back-fold cut of the shirt.

Furthermore, FIG. 4F shows how half-sizes 4F1 are computed using a linear interpolation equation 4F2. In this example, linear interpolation equation 4F2 is used to compute a 3XL ½ size as an average of an 4XL and 3XL for each dimension (i.e., in an X dimension and in a Y dimension).

15.0. Customization Using BSpline Interpolation and Products' Sizes

Figure 4G:
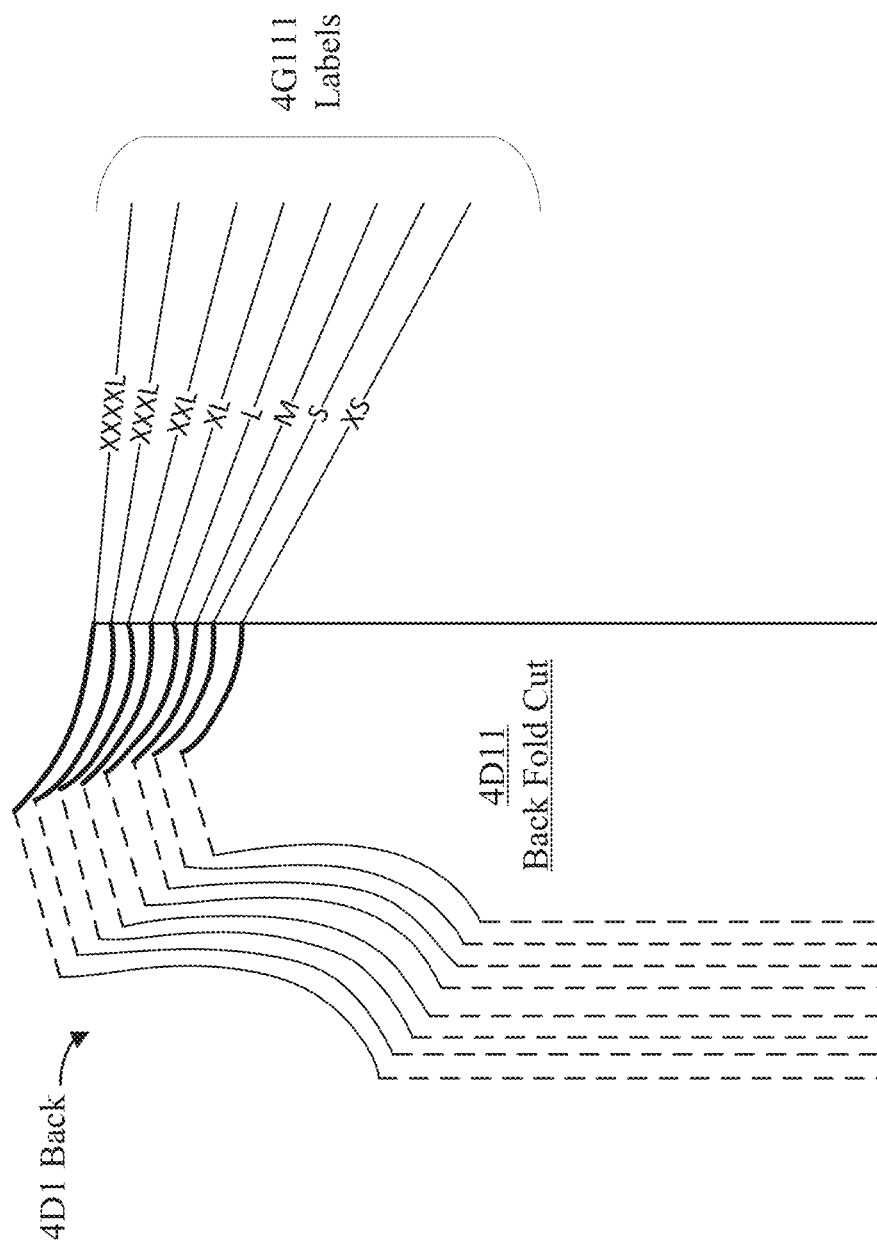
FIG. 4G is a block diagram showing an example of a template used to custom fit a parametric product using a 2D BSpline interpolation based on the product's sizes.

FIG. 4G is a block diagram showing an example of a template used to custom fit a parametric product using a 2D BSpline interpolation based on the product's sizes. The depicted example not only shows back fold cut 4D11 of back portion 4D1 of the example shirt shown in FIG. 4D, but also shows labels 4G111, such as XS, S, M, L, XL, 2XL, 3XL, and 4XL associated with the different sizes of the back fold cut of the shirt. The labels are pointing to the corresponding broken curved lines indicating the corresponding sizes of a neck opening of the shirt.

For the clarity of the description, the labels, such as XS, S, M, L, XL, 2XL, 3XL, and 4XL, associated with the different sizes of the back fold cut of the shirt, are shown only for the broken curved lines for the neck opening portion of the example shirt. The labels, such as XS, S, M, L, XL, 2XL, 3XL, and 4XL, associated with the different sizes of the back fold cut of the shirt may be used by a manufacturer, and more specifically by a cutting machine used by the manufacturer, to cut, for example, the fabric for back portion of the shirt.

The process of computing half-sizes based on BSpline interpolation is described in the following figures.

Figure 4H:
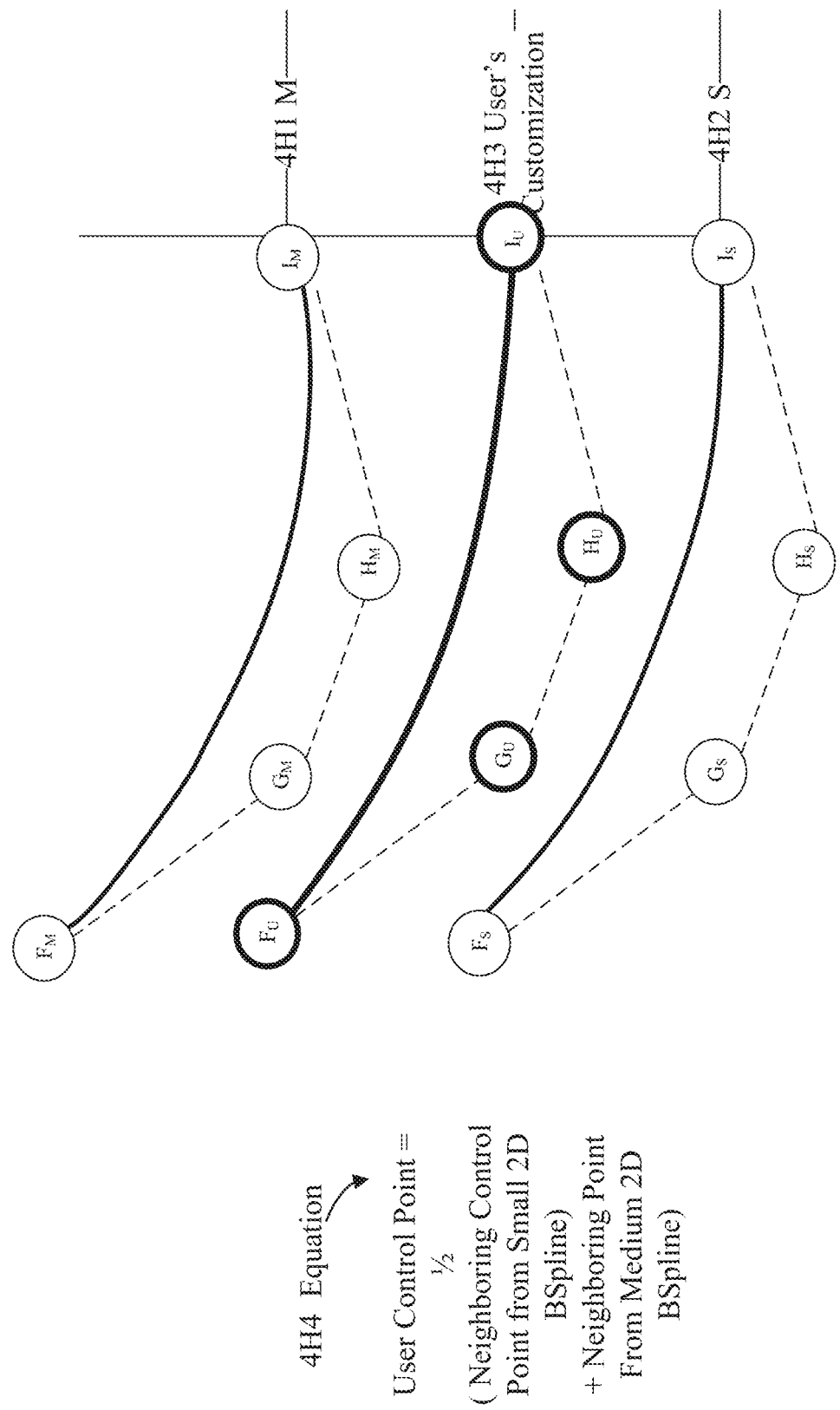
FIG. 4H is a block diagram showing an example of a template used to custom fit a parametric product using a 2D BSpline interpolation based on the product's sizes and 2D control points.
Figure 41:
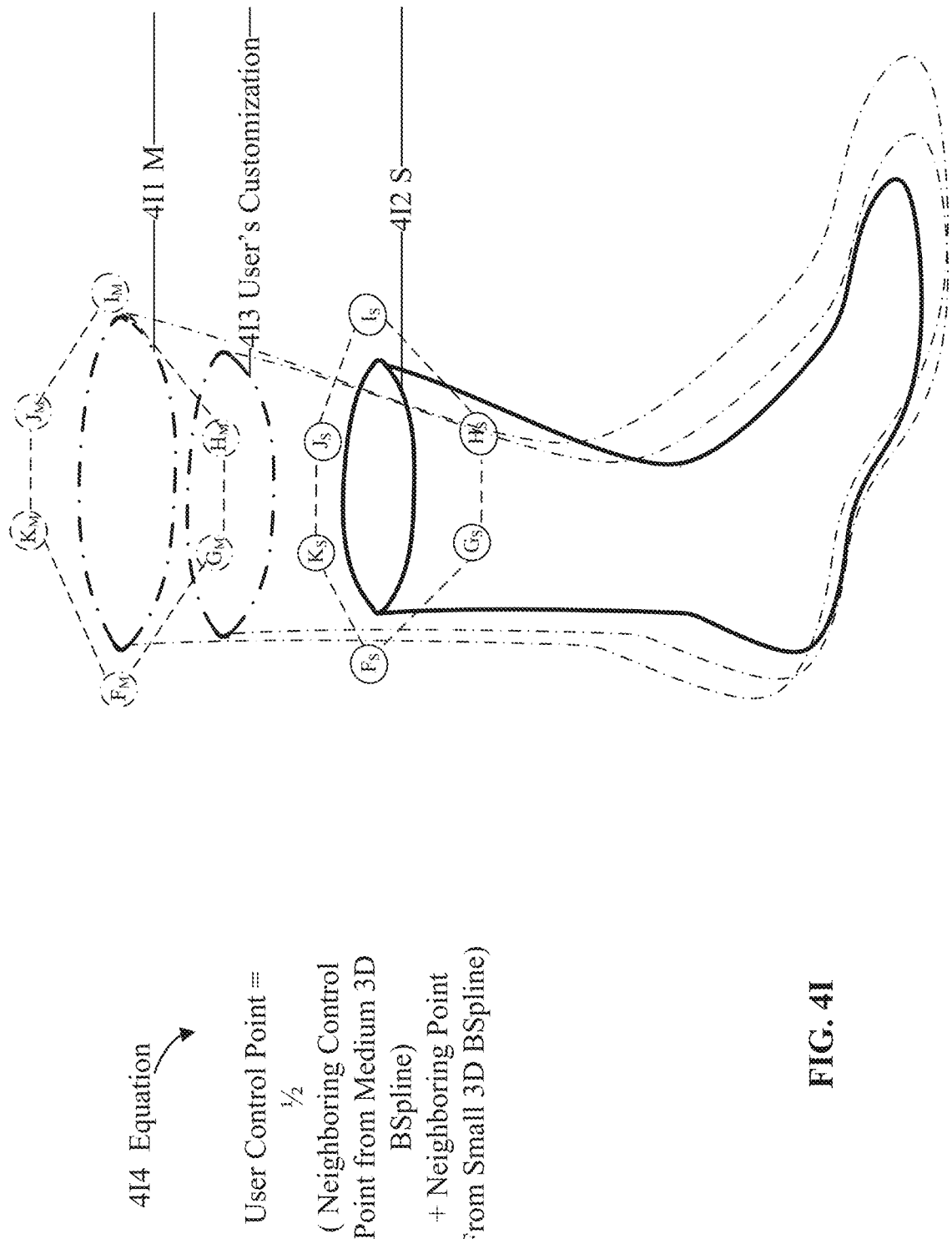

16.0. Customization Using BSpline Interpolation, Products' Sizes and 2D Control Points FIG. 4H is a block diagram showing an example of a template used to custom fit a parametric product using a 2D BSpline interpolation based on the product's sizes and 2D control points. The example depicted in FIG. 4H corresponds to a neck opening (shown using labels 4G111) of a shirt depicted in FIG. 4G and that a user may customize so it fits.

FIG. 4H shows examples of three curves, including a curve 4H1 (corresponding to a M size shown in FIG. 4G), a curve 4H2 (corresponding to a S size shown in FIG. 4G), and a curve 4H3 (corresponding to a user customized size of an example shirt that a user is customizing).

In the example shown in FIG. 4H, each of curves 4H1, 4H2 and 4H3 is defined by a set of control points, and each control point has either 2D coordinates or 3D coordinates.

In computer-aided geometric 2D/3D design, a control point is a member of a set of points used to determine the shape of a curve defined in a 2D/3D plane.

For Bézier curves, a set of discrete control points defines a smooth, continuous curve by means of a formula. Usually, the curve is intended to approximate a real-world shape that otherwise has no mathematical representation or whose representation is unknown or too complicated.

A Bézier curve is defined by a set of control points $P_0$ through $P_n$, where n is called the order of the curve (n=1 for linear, 2 for quadratic, etc.). The first and last control points are always the endpoints of the curve, while the intermediate control points (if any) generally do not lie on the curve. The sums in the following sections are to be understood as affine combinations, i.e., the coefficients sum to 1.

For example, a cubic Bezier curve is defined by four points $P_0$, $P_1$, $P_2$ and $P_3$ in the plane or in higher-dimensional space. The curve starts at $P_0$ going toward $P_1$ and arrives at $P_3$ coming from the direction of $P_2$. Usually, the curve will not pass through $P_1$ or $P_2$ as those control points are only there to provide directional information. An explicit form of a cubic Bezier curve formula defined by points $P_0$, $P_1$, $P_2$ and $P_3$ may be expressed as:

$$B(t)=(1-t)^3 P_0 + 3(1-t)^2 t P_1 + 3(1-t)t^2 P_2 + t^3 P_3, \text{ wherein } 0 \leq t \leq 1.$$

A spline is a basis curve expressed using a spline function of order n, which is a piecewise polynomial function of degree n−1 in a variable x. The places where the pieces meet are known as knots. The key property of spline functions is that they and their derivatives may be continuous. B-splines of order n are basis functions that can be expressed as follows:

$$B_{i,n}(x) = \begin{cases} 0 & \text{if } x < t_i \text{ or } x \geq t_{i+n}, \\ \text{non-zero} & \text{otherwise.} \end{cases}$$

For simplicity of the description, it is assumed herein that each of the curves depicted in FIG. 4H has four control points. However, this limitation should not be considered as limiting in any way. Indeed, each of the curves may have any number of control points; in fact, in practical applications, the curves may have, for example, hundreds of control points.

Referring again to FIG. 4H, suppose that curve 4H1 (corresponding to a M size shown in FIG. 4G) has four control points $F_M$, $G_M$, $H_M$, and $I_M$; curve 4H2 (corresponding to a S size shown in FIG. 4G) has four control points $F_S$, $G_S$, $H_S$ and $I_S$; and curve 4H3 (corresponding to a user customized size of an example shirt that a user is customizing) has four control points $F_U$, $G_U$, $H_U$ and $I_U$.

The task is to determine the control points $F_U$, $G_U$, $H_U$, and $I_U$ for the curve 4H3, and then, based on the control points $F_U$, $G_U$, $H_U$ and $I_U$ define the curve 4H3.

Assuming that $F_M$, $G_M$, $H_M$, $I_M$, $F_S$, $G_S$, $H_S$, and $I_S$ are known, the control points $F_U$, $G_U$, $H_U$, and $I_U$ for the curve 4H3 (corresponding to a user customized size of an example shirt that a user is customizing) are to be determined.

In some implementations, each of the control points of the curve 4H3 (corresponding to a user customized size of an example shirt that a user is customizing), is computed using a linear interpolation of the corresponding control points of 4H1 and 4H2.

Hence, the example control points of the curve 4H3 may be computed using an equation 4H4 as follows:

$$F_U = \tfrac{1}{2}(F_M + F_S);$$

$$G_U = \tfrac{1}{2}(G_M + G_S);$$

$$H_U = \tfrac{1}{2}(H_M + H_S);$$

$$I_U = \tfrac{1}{2}(I_M + I_S).$$

The above approach may be expanded for any degree curve and having any number of control points.

Once the control points $F_U$, $G_U$, $H_U$, and $I_U$ for the curve 4H3 are determined, the control points $F_U$, $G_U$, $H_U$ and $I_U$ may be used to determine the shape of the curve 4H3.

The above process may be repeated for each curve shown using labels 4G111 and depending on the user's request and customization parameters.

17.0. Customization Using 3D BSpline Interpolation, Products' Sizes, and 3D Control Points FIG. 4I is a block diagram showing an example of a template used to custom fit a parametric product using a 3D BSpline interpolation based on the product's sizes and 3D control points. The example depicted in FIG. 4I is a custom sock that a user may want to customize until the sock fits.

FIG. 4I shows the examples of two curves, including a curve 4I1 (corresponding to a M size of a sock), and a curve 4I2 (corresponding to a S size of the sock). For clarity of the description, a third curve 4I3 (corresponding to a user customized size of the sock) is shown, but without the corresponding control points. However, it should be understood that, in the example depicted in FIG. 4I, to customize the sock, the system would use the curve 4I3 and its corresponding control points.

Each of curves 4I1, 4I2 and 4I3 is defined by a set of control points, and each control point has either 2D coordinates or 3D coordinates. Control points in 2D/3D space have been described in FIG. 4H.

For simplicity of the description, it is assumed herein that each of the curves depicted in FIG. 4I has six control points. However, this limitation should not be considered as constraining in any way. Indeed, each of the curves may have any number of control points; in fact, in practical applications, the curves may have, for example, hundreds of control points.

Referring again to FIG. 4I, suppose that curve 4I1 (corresponding to a M size of the sock) has six control points $F_M$, $G_M$, $H_M$, $I_M$, $J_M$, $K_M$; curve 4I2 (corresponding to a S size of the sock) has six control points $F_S$, $G_S$, $H_S$, $I_S$, $J_S$, $K_S$; and curve 4I3 (corresponding to a user customized size of the sock) has six control points $F_U$, $G_U$, $H_U$, $I_U$, $J_U$, $K_U$ (not shown in FIG. 4I). The task is to determine the control points $F_U$, $G_U$, $H_U$, $I_U$, $J_U$, $K_U$ for the curve 4I3, and then, based on the control points $F_U$, $G_U$, $H_U$, $I_U$, $J_U$, $K_U$, define the curve 4I3.

Assuming that $F_M$, $G_M$, $H_M$, $I_M$, $J_M$, $K_M$, $F_S$, $G_S$, $H_S$, $I_S$, $J_S$, $K_S$ are known, the control points $F_U$, $G_U$, $H_U$, $I_U$, $J_U$, $K_U$ for the curve 4I3 (corresponding to a user customized size of the sock) are to be determined.

In some implementations, each of the control points of the curve 4I3 (corresponding to a user customized size of an example shirt that a user is customizing) is computed using a linear interpolation of the corresponding control points of 4I1 and 4I2.

Hence, the example control points of the curve 4I3 may be computed (for each x, y, z) using an equation 4I4 as follows:

$$F_U = \tfrac{1}{2}(F_M + F_S);$$

$$G_U = \tfrac{1}{2}(G_M + G_S);$$

$$H_U = \tfrac{1}{2}(H_M + H_S);$$

$$I_U = \tfrac{1}{2}(I_M + I_S);$$

$$J_U = \tfrac{1}{2}(J_M + J_S);$$

$$K_U = \tfrac{1}{2}(K_M + K_S).$$

The above described approach may be expanded for any degree curve and having any number of control points.

Once the control points $F_U$, $G_U$, $H_U$, $I_U$, $J_U$, $K_U$ for the curve 4I3 are determined, the control points $F_U$, $G_U$, $H_U$, $I_U$, $J_U$, $K_U$ may be used to determine the shape of the curve 4I3. Based on the curve 4I3, the shape and the width of the sock at, for example, the opening of the sock may be determined.

The above process may be repeated for each curve depicting customization of the sock, which may include a calf area of the sock, an ankle area of the sock, a heel area of the sock, an arch area of the sock, a toe area of the sock, and the like.

18.0. Customization Using 3D BSpline Interpolation and 3D Control Points

Figure 4J:
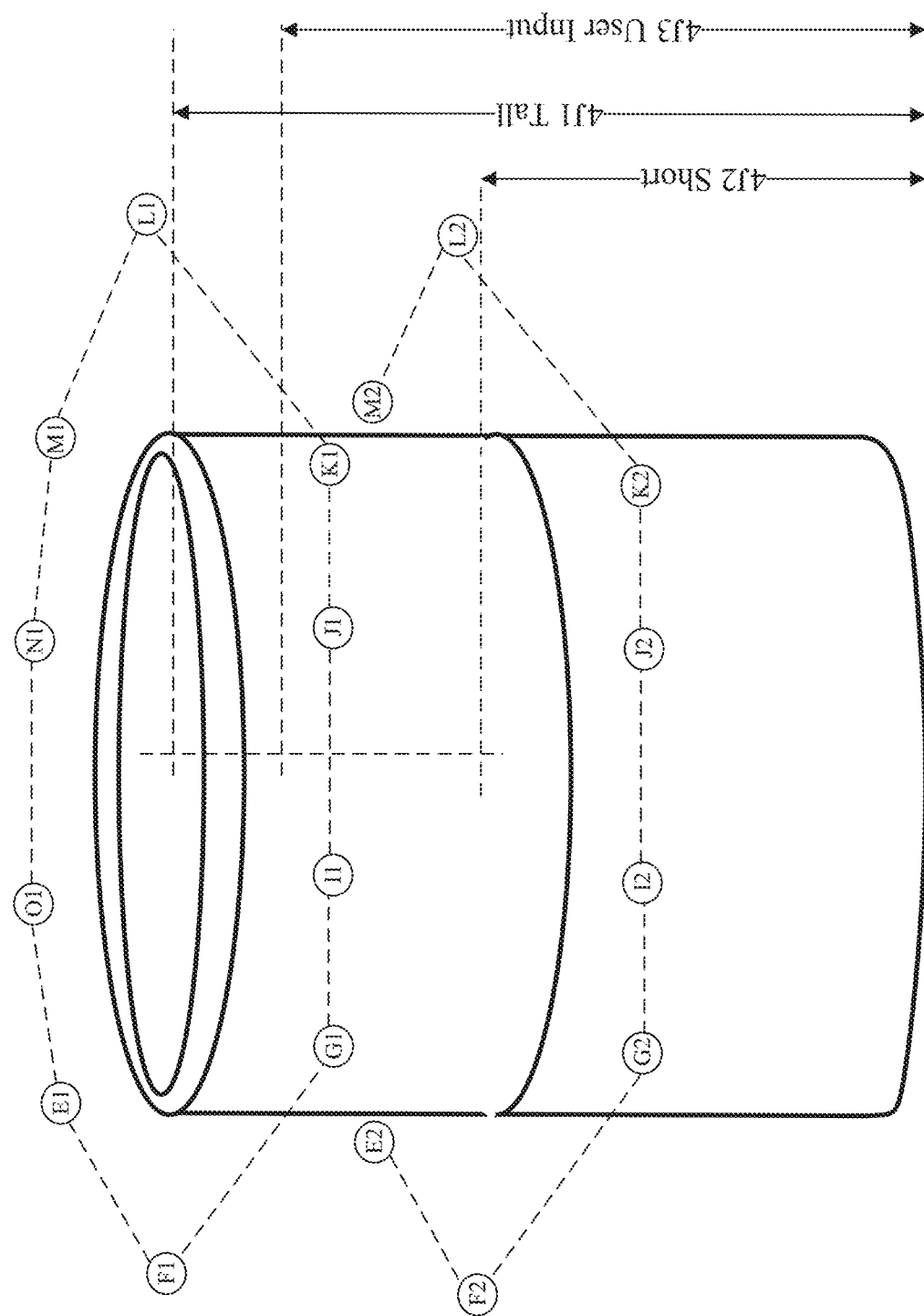
FIG. 4J is a block diagram showing an example of a template used to custom fit a parametric product using a 3D BSpline interpolation and 3D control points.

FIG. 4J is a block diagram showing an example of a template used to custom fit a parametric product using a 3D BSpline interpolation and 3D control points. The example depicted in FIG. 4J is a vase that a user may customize. Suppose that the vase comes in different sizes. For example, the vase may come in the form of a tall vase (shown as a 4J1 vase) and a short vase (shown as a 4J2 vase). Merely to illustrate simple examples, it is assumed that a user wishes to customize the vase's opening that is a vase's height that is between tall vase 4J1 and short vase 4J1. It is further assumed that the opening of the short vase has a shape that is different from the opening of the tall vase. This, however, is not necessary. In fact, a user may as well customize any dimension or parameter of the vase.

FIG. 4J shows two example curves: one curve corresponds to an upper rim of the tall vase and another curve corresponds to an upper rim of the short vase. Suppose that a user wishes to customize an opening of the vase so that the vase's height is between the tall vase and the short vase. However, it should be understood that the user could customize the vase to be, for example, taller than the depicted tall vase, or shorter than the depicted short vase.

The upper rim of the tall vase is defined using a curve that has control points, and the upper rim of the short vase is defined using a curve that has its own control points. The task is to determine the control points of a curve that would define the opening (i.e., a rim) of the vase customized by the user.

Each of the curves defining the corresponding rims of the different vases is defined by a set of control points, and each control point has either 2D coordinates or 3D coordinates. Control points in 2D/3D space have been described in FIG. 4H.

For simplicity of the description, it is assumed herein that each of the curves depicted in FIG. 4J has 10 control points. However, this limitation should not be considered as constraining in any way. Indeed, each of the curves may have any number of control points; in fact, in practical applications, the curves may have, for example, hundreds of control points.

Referring again to FIG. 4J, suppose that the upper rim curve of the tall vase has ten control points $E_1, F_1, G_1, H_1, I_1, J_1, K_1, L_1, M_1, N_1, O_1$; the upper rim curve of the short vase has ten control points $E_2, F_2, G_2, H_2, I_2, J_2, K_2, L_2, M_2, N_2, O_2$; the upper rim curve of the user's customized vase has ten control points $E_3, F_3, G_3, H_3, I_3, J_3, K_3, L_3, M_3, N_3, O_3$.

Assuming that $E_1, F_1, G_1, H_1, I_1, J_1, K_1, L_1, M_1, N_1, O_1, E_2, F_2, G_2, H_2, I_2, J_2, K_2, L_2, M_2, N_2, O_2$ are known, the control points $E_3, F_3, G_3, H_3, I_3, J_3, K_3, L_3, M_3, N_3, O_3$ for the curve defining the rim of the user's customized vase are to be determined.

In some implementations, each of the control points of the curves is computed (in each dimension x, y, z) using a linear interpolation of the corresponding control points $E_1, F_1, G_1, H_1, I_1, J_1, K_1, L_1, M_1, N_1, O_1, E_2, F_2, G_2, H_2, I_2, J_2, K_2, L_2, M_2, N_2, O_2$, respectively.

Hence, the example control points of the curve defining the rim of the user's customized vase may be computed using an equation 4I4 as follows:

$F_3 = \frac{1}{2}(F_1 + F_2);$ $G_3 = \frac{1}{2}(G_1 + G_2);$ $H_3 = \frac{1}{2}(H_1 + H_2);$ $I_3 = \frac{1}{2}(I_1 + I_2);$ $J_3 = \frac{1}{2}(J_1 + J_2);$ $K_3 = \frac{1}{2}(K_1 + K_2);$ $L_3 = \frac{1}{2}(L_1 + L_2);$ $M_3 = \frac{1}{2}(M_1 + M_2);$ $N_3 = \frac{1}{2}(N_1 + N_2);$ $O_3 = \frac{1}{2}(O_1 + O_2).$ The above approach may be expanded for any degree curve and having any number of control points.

Once the control points $E_3, F_3, G_3, H_3, I_3, J_3, K_3, L_3, M_3, N_3, O_3$ for the curve representing a rim at the height corresponding to the user's customized vase are determined, the control points $E_3, F_3, G_3, H_3, I_3, J_3, K_3, L_3, M_3, N_3, O_3$ may be used to determine the height of the user-customized vase.

Figure 4K:
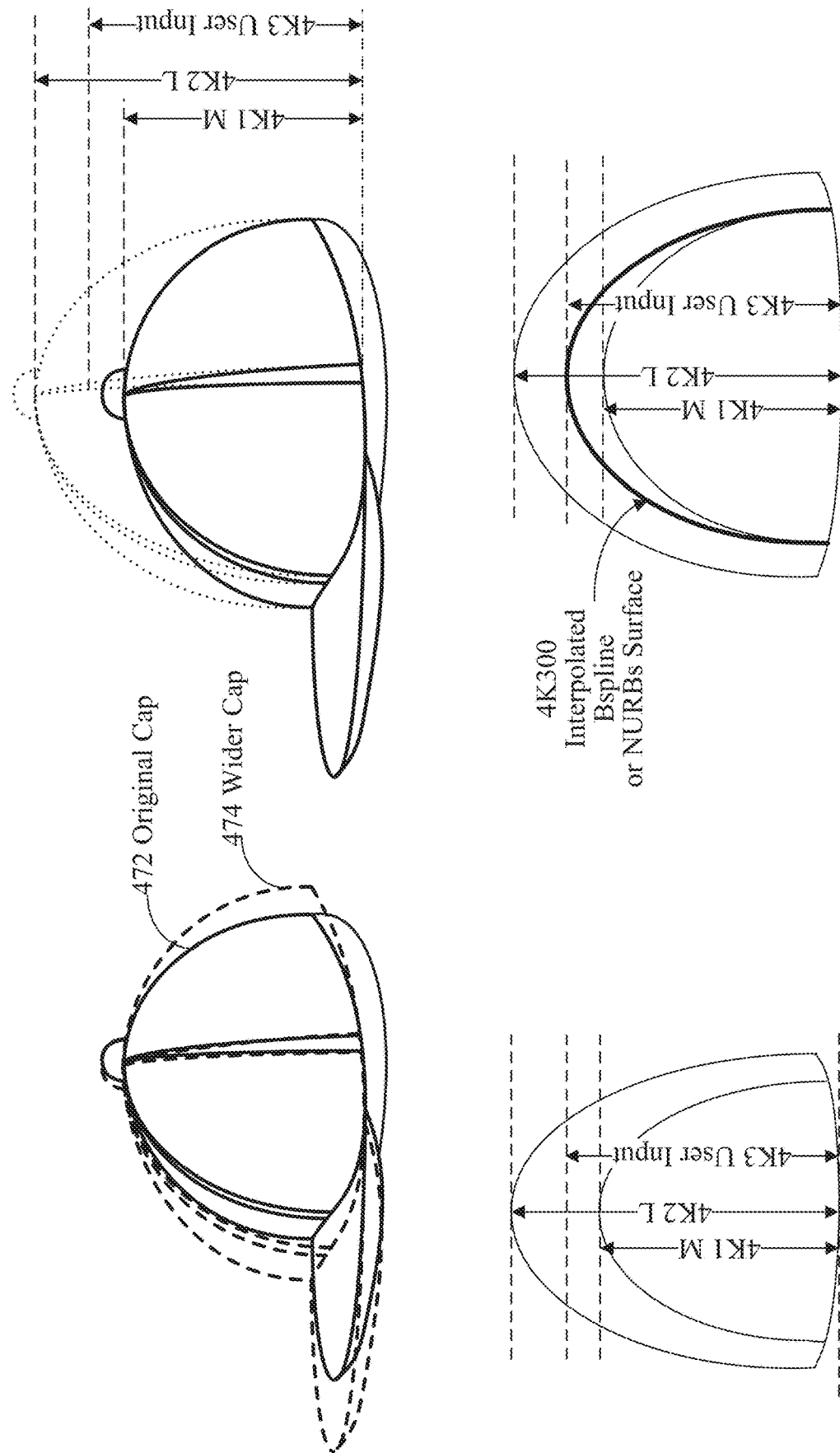
FIG. 4K is a block diagram showing an example of a template used to custom fit to a shape and using a 2D BSpline interpolation based on the product's sizes and 2D control points.

19.0. Customization Using 2D BSpline Interpolation, Products' Sizes and 2D Control Points FIG. 4K is a block diagram showing an example of a template used to custom fit to a shape and using a 2D BSpline interpolation based on the product's sizes and 2D control points. The example depicted in FIG. 4K is a baseball cap, made out of, for example, a fabric or any other material, that has a large visor and an adjustable strap at the back.

A user may customize the cap. Suppose that the cap comes in different sizes, including a small (not shown in FIG. 4K), a medium 4K1 M, and a large 4K2 L. Furthermore, the cap may come with different sizes of cap circumference (i.e., the size around the head), including a wide cap 474 and an original cap 473. Merely to illustrate simple examples, it is assumed that a user wishes to customize the cap height to be between tall cap 4K2 L and medium cap 4K1 M. However, the user may want to customize any dimension of the cap.

Suppose that one BSpline surface (not shown in FIG. 4K) defines a large cap and another BSpline surface (not shown in FIG. 4K) defines a medium cap. Suppose that a user wishes to customize the cap's height so that the cap's height is between the large cap and the medium cap. However, it should be understood that the user could customize the cap to be, for example, taller than the depicted large cap, or shorter than the depicted medium cap.

The shape of the tall cap may be defined using a surface that has control points (not shown in FIG. 4K), and the shape of the medium cup may be defined using a surface that has its own control points (not shown in FIG. 4K). The task is to determine the control points of a surface that would define the height and the shape of the cap as customized by the user.

Each of the surfaces defining the corresponding large cap and the corresponding medium cap is defined by a set of control points, and each control point has either 2D coordinates or 3D coordinates. Control points in 2D/3D space have been described in FIG. 4H.

For simplicity of the description, it is assumed herein that each of the surfaces depicted in FIG. 4K has 10 control points. However, this limitation should not be considered as constraining in any way. Indeed, each of the surfaces may have any number of control points; in fact, in practical applications, the surfaces may have, for example, hundreds of control points.

Referring again to FIG. 4K, suppose that the upper surface of the large cup has ten control points $E_1, F_1, G_1, H_1, I_1, J_1, K_1, L_1, M_1, N_1, O_1$ (not shown); the upper surface of the medium cup has ten control points $E_2, F_2, G_2, H_2, I_2, J_2, K_2, L_2, M_2, N_2, O_2$ (not shown); the upper surface of the cup customized by a user has ten control points $E_3, F_3, G_3, H_3, I_3, J_3, K_3, L_3, M_3, N_3, O_3$ (not shown).

Assuming that $E_1, F_1, G_1, H_1, I_1, J_1, K_1, L_1, M_1, N_1, O_1, E_2, F_2, G_2, H_2, I_2, J_2, K_2, L_2, M_2, N_2, O_2$ are known, the control points $E_3, F_3, G_3, H_3, I_3, J_3, K_3, L_3, M_3, N_3, O_3$ for the surface defining the cap that is customized by a user are to be determined.

In some implementations, each of the control points of the surfaces is computed (in each dimension x, y, z) using a linear interpolation of the corresponding control points $E_1, F_1, G_1, H_1, I_1, J_1, K_1, L_1, M_1, N_1, O_1, E_2, F_2, G_2, H_2, I_2, J_2, K_2, L_2, M_2, N_2, O_2$, respectively.

Hence, the example control points of the surface defining the shape and the height of the cap customized by the user may be computed using an equation 414 as follows:

$$F_3 = \tfrac{1}{2}(F_1 + F_2);$$

$$G_3 = \tfrac{1}{2}(G_1 + G_2);$$

$$H_3 = \tfrac{1}{2}(H_1 + H_2);$$

$$I_3 = \tfrac{1}{2}(I_1 + I_2);$$

$$J_3 = \tfrac{1}{2}(J_1 + J_2);$$

$$K_3 = \tfrac{1}{2}(K_1 + K_2);$$

$$L_3 = \tfrac{1}{2}(L_1 + L_2);$$

$$M_3 = \tfrac{1}{2}(M_1 + M_2);$$

$$N_3 = \tfrac{1}{2}(N_1 + N_2);$$

$$O_3 = \tfrac{1}{2}(O_1 + O_2).$$

The above approach may be expanded for any degree surface and having any number of control points.

Once the control points $E_3, F_3, G_3, H_3, I_3, J_3, K_3, L_3, M_3, N_3, O_3$ for the surface representing the height and the shape of the cup that is customized by the user are determined, the control points $E_3, F_3, G_3, H_3, I_3, J_3, K_3, L_3, M_3, N_3, O_3$ may be used to determine a surface 4K300 representing the cup that is customized by the user.

Figure 4L:
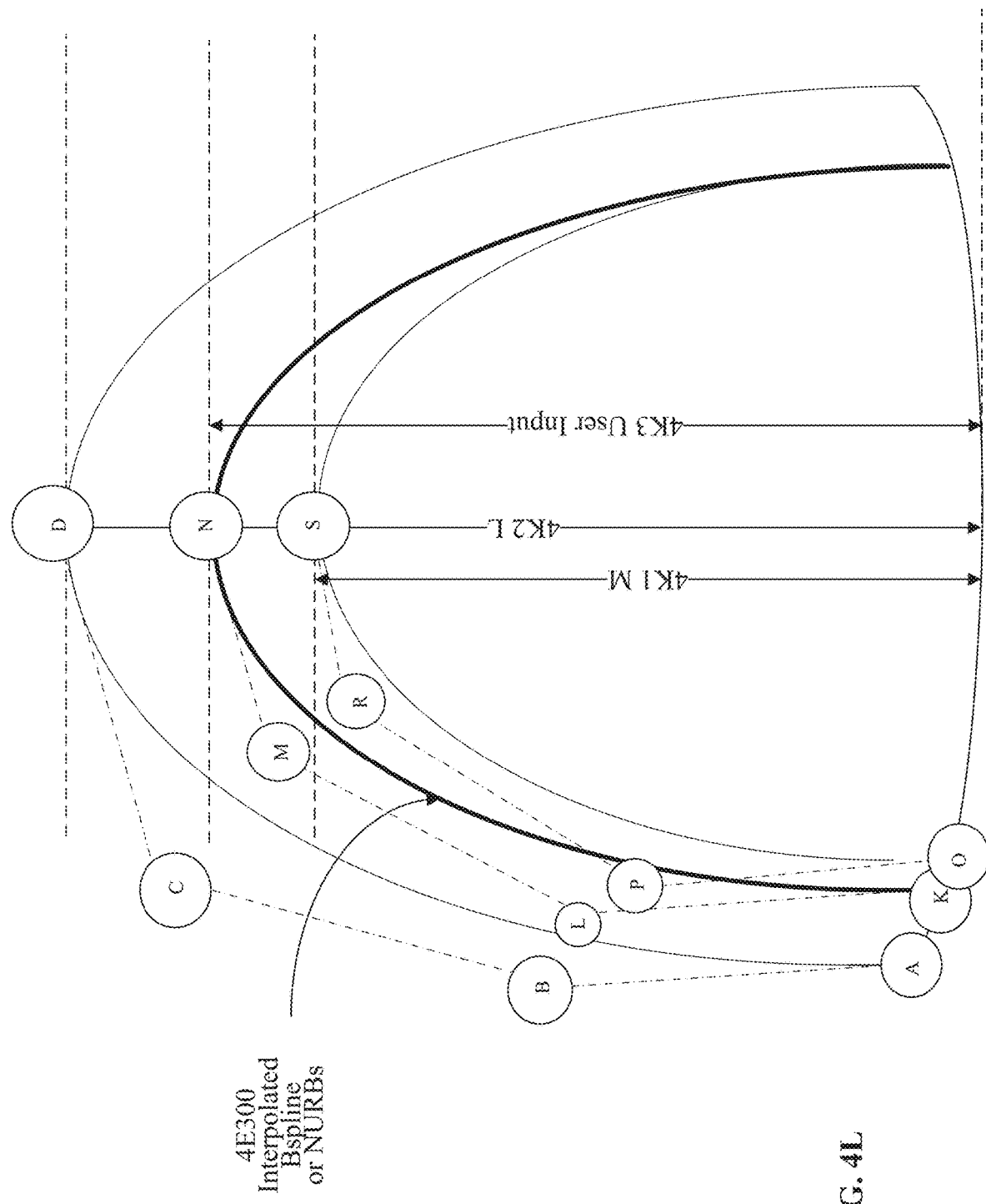
FIG. 4L is a block diagram showing an example of a template used to custom fit to a shape and using a 2D BSpline interpolation based on the product's sizes and 2D control points.

FIG. 4L is a block diagram showing an example of a template used to custom fit to a shape and using a 2D BSpline interpolation based on the product's sizes and 2D control points. More specifically, FIG. 4L depicts the approach for determining the surface representing a cap that a user is customized as it is applied to computing just one "rib" of the cap. FIG. 4L, showing how one "rib" of the user's customized cap is determined is provided herein because it is difficult to represent, on one drawing, all three surfaces (i.e., the entire surface and its control points collectively representing a large cap, the entire surface and its control points collectively representing a medium cap and the entire surface and its control points collectively representing a user's customized cup).

Referring again to FIG. 4L, suppose that one rib of the upper surface of the large cup has control points A, B, C, and D; suppose that one rib the upper surface of the medium cup has control points O, P, R, and S; suppose that one rib of the upper surface of the cup customized by a user has control points K, L, M, and N.

Assuming that A, B, C, D, O, P, R, and S, are known, the control points K, L, M, and N for the surface defining the cap that is customized by a user are to be determined.

In some implementations, each of the control points of the surface is computed (in each dimension x, y, z) using a linear interpolation of the corresponding control points A, B, C, D, O, P, R, and S, respectively.

Hence, the example control points of the surface defining the shape and the height of the cap customized by the user may be computed using an equation 414 as follows:

$$K = \tfrac{1}{2}(A + O);$$

$$L = \tfrac{1}{2}(B + P);$$

$$M = \tfrac{1}{2}(C + R);$$

$$N = \tfrac{1}{2}(D + S).$$

The above approach may be expanded for any degree surface and having any number of control points.

20.0. Customization Using 3D BSpline Interpolation Using 3D Control

Figure 4M:
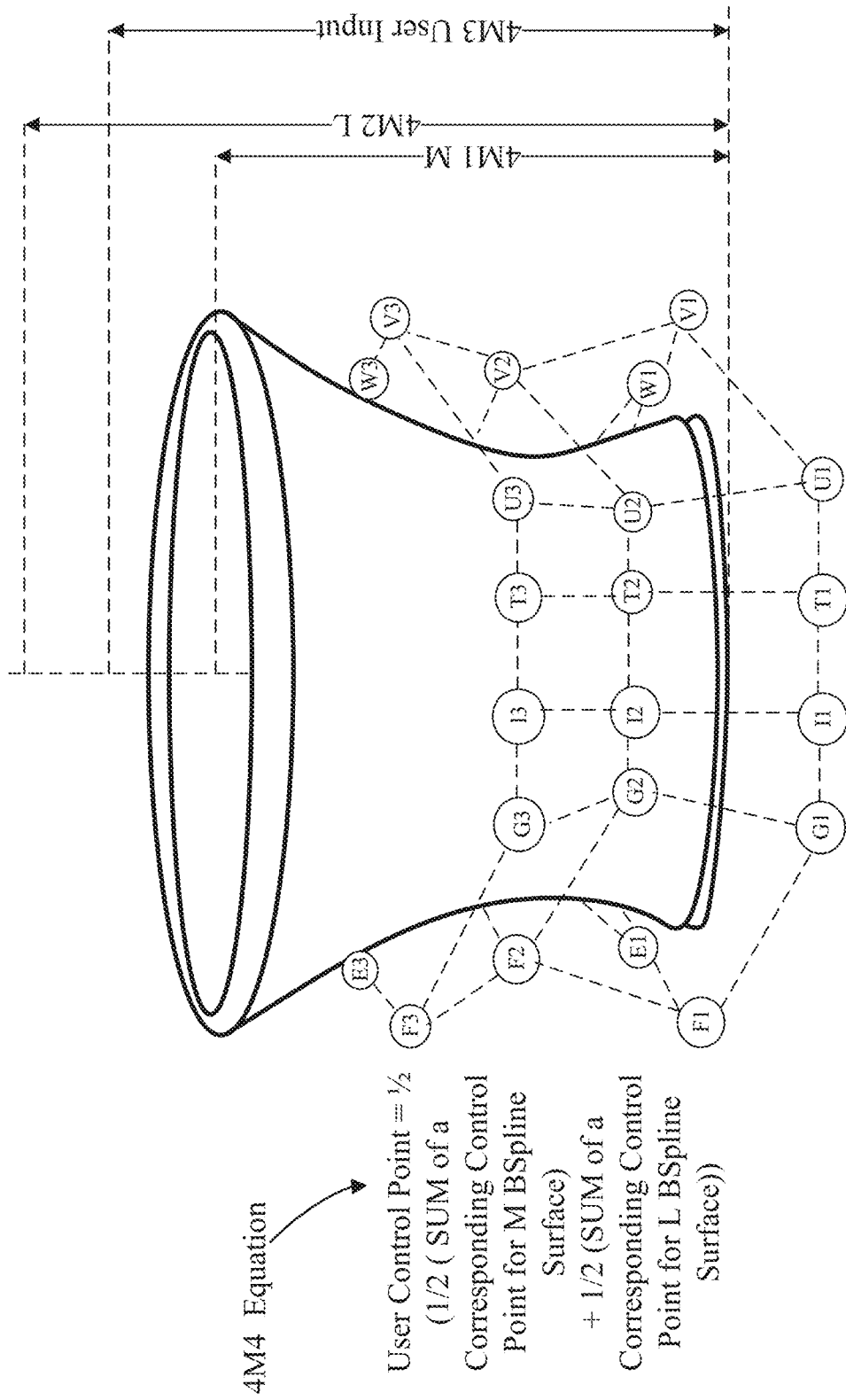
FIG. 4M is a block diagram showing an example of a template used to custom fit to a shape and using a 3D BSpline using 3D control points.

FIG. 4M is a block diagram showing an example of a template used to custom fit to a shape and using a 3D BSpline using 3D control points. The example depicted in FIG. 4M is a vase, made out of, for example, glass, clay, or any other material.

A user may customize the vase. Suppose that the vase comes in different sizes, including a small (not shown in FIG. 4M), a medium 4M1 M, and a large 4M2 L. Furthermore, the vase may come in different shapes. The vase may be defined by, for example, (a) the circumference of the bottom of the vase, (b) the circumference of the mid-part of the vase, and (c) the circumference of the top of the case.

Merely to illustrate simple examples, it is assumed that a user wishes to customize the vase height to be between tall vase 4M2 L and medium vase 4M1 M. However, the user may want to customize any dimension of the cap.

Suppose that one BSpline surface defines a large vase and another BSpline surface (not shown in FIG. 4M) defines a medium vase. Suppose that a user wishes to customize the vase's height so that the vase's height is between the large vase and the medium vase. However, it should be understood that the user could customize the vase to be, for example, taller than the depicted large vase, or shorter than the depicted medium vase.

The shape of the tall vase may be defined using a surface that has control points (not shown in FIG. 4M), and the shape of the medium vase may be defined using a surface that has its own control points (shown in FIG. 4M and including points E1, F1, G1, I1, T1, U1, V1, W1, E2, F2, G2, I2, T2, U2, V2, W2, E2, F2, G2, I2, T2, U2, V2, W2). Additional control points (behind the vase) are not shown in FIG. 4M. The task is to determine the control points of a surface that would define the height and the shape of the vase as customized by the user.

Each of the surfaces defining the corresponding large vase and the corresponding medium vase is defined by a set of control points, and each control point has 3D coordinates. Control points in 3D space have been described in FIG. 4H.

It is assumed herein that each of the surfaces has K control points. In practical implementations, the surfaces may have, for example, hundreds of control points.

Referring again to FIG. 4M, suppose that the shape of the medium vase may be defined using a surface that has its own control points (shown in FIG. 4M and including points E1, F1, G1, I1, T1, U1, V1, W1, E2, F2, G2, $I_2$, T2, U2, V2, W2, E2, F2, G2, I2, T2, U2, V2, W2). Additional control points (behind the vase) are not shown in FIG. 4M.

Although not shown in FIG. 4M, the shape of the large vase may be defined using a surface that has its own control points (e.g., $E1_L$, $F1_L$, $G1_L$, $I1_L$, $T1_L$, $U1_L$, $V1_L$, $W1_L$, $E2_L$, $F2_L$, $G2_L$, $I2_L$, $T2_L$, $U2_L$, $V2_L$, $W2_L$, $E2_L$, $F2_L$, $G2_L$, $I2_L$, $T2_L$, $U2_L$, $V2_L$, $W2_L$). Additional control points (behind the vase) are not shown in FIG. 4M.

The task here is to determine the control points of the surface that defines the shape and the height of the vase that the user is customizing. Suppose that such a surface (not shown in FIG. 4M) has the following control points $E1_U$, $F1_U$, $G1_U$, $I1_U$, $T1_U$, $U1_U$, $V1_U$, $W1_U$, $E2_U$, $F2_U$, $G2_U$, $I2_U$, $T2_U$, $U2_U$, $V2_U$, $W2_U$, $E2_U$, $F2_U$, $G2_U$, $I2_U$, $T2_U$, $U2_U$, $V2_U$, $W2_U$ and some additional control points.

In some implementations, each of the control points of the surfaces is computed (in each dimension x, y, z) using a linear interpolation of the corresponding control points.

Furthermore, suppose that to compute the control points of the surface that would define the shape and the height of the vase that the user is customizing, each new control point is computed as an average of a corresponding control point of, for example, the medium vase and a corresponding control point of, for example, the large vase.

Hence, the example control points of the surface defining the shape and the height of the cap customized by the user may be computed using an equation 4M4 as follows:

$$E_U = \tfrac{1}{2}(E_M + E_L);$$

$$F_U = \tfrac{1}{2}(F_M + F_L);$$

$$G_U = \tfrac{1}{2}(G_M + G_L);$$

$$I_U = \tfrac{1}{2}(I_M + I_L);$$

$$T_U = \tfrac{1}{2}(T_M + T_L);$$

$$U_U = \tfrac{1}{2}(U_M + U_L);$$

$$V_U = \tfrac{1}{2}(V_M + V_L);$$

$$W_U = \tfrac{1}{2}(W_M + W_L);$$

etc . . . .

The above approach may be expanded for any degree surface and having any number of control points.

Once the control points $E1_U$, $F1_U$, $G1_U$, $I1_U$, $T1_U$, $U1_U$, $V1_U$, $W1_U$, $E2_U$, $F2_U$, $G2_U$, $I2_U$, $T2_U$, $U2_U$, $V2_U$, $W2_U$, $E2_U$, $F2_U$, $G2_U$, $I2_U$, $T2_U$, $U2_U$, $V2_U$, $W2_U$ for the surface representing the height and the shape of the vase that is customized by the user are determined, the control points $E1_U$, $F1_U$, $G1_U$, $I1_U$, $T1_U$, $U1_U$, $V1_U$, $W1_U$, $E2_U$, $F2_U$, $G2_U$, $I2_U$, $T2_U$, $U2_U$, $V2_U$, $W2_U$, $E2_U$, $F2_U$, $G2_U$, $I2_U$, $T2_U$, $U2_U$, $V2_U$, $W2_U$ may be used to determine a surface representing the vase that is customized by the user.

21.0. Example Flow Chart for Custom Fitting

Figure 5:
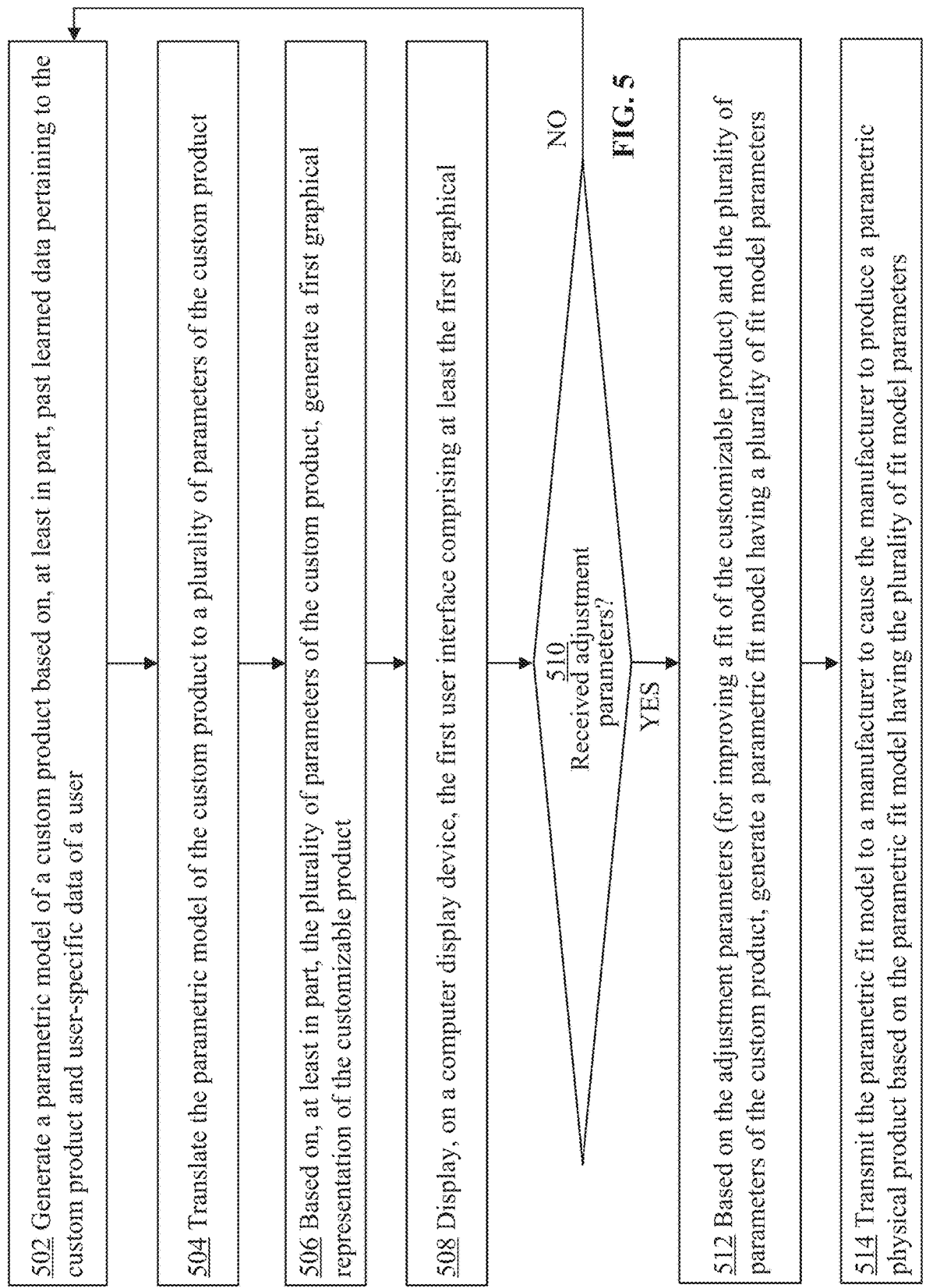
FIG. 5 is a flow chart depicting an example process for implementing a method for custom fitting and manufacturing parametric products.

FIG. 5 is a flow chart depicting an example process for implementing a method for custom fitting and manufacturing parametric products.

The example process described in FIG. 5 may be executed by one or more components of core services 16AA described in FIG. 1C. For simplicity of the description, it is assumed that the steps described in FIG. 5 are performed by a core service.

In step 502, a core service generates a parametric model of a custom product based on, at least in part, past learned data pertaining to the custom product and user-specific data of a user.

In step 504, the core service translates the parametric model of the custom product to a plurality of parameters of the custom product. Each parameter, of the plurality of parameters of the custom product, may be represented as a key-value pair, as described before.

In step 506, the core service generates, based on, at least in part, the plurality of parameters of the custom product, a first graphical representation of the custom product.

In step 508, the core service generates a first user interface and displays, on a computer display device, the first user interface comprising at least the first graphical representation of the custom product.

In step 510, the core service tests whether any adjustment parameters have been received. If, in step 510, it is determined that the adjustment parameters have been received, then the core service proceeds to step 512; otherwise, the core service continues testing in step 502.

Once, in step 510, it is determined that a plurality of adjustment parameters for improving a fit of the custom product in relation to the user-specific data has been received, then, in step 512, based on the plurality of adjustment parameters and the plurality of parameters of the custom product, the core service generates a parametric fit model for the custom product. The parametric fit model may include, for example, a plurality of fit model parameters. A fit model parameter, of the plurality of fit model parameters of the parametric fit model, may be represented as a fit key-value pair.

In step 514, the core service transmits the parametric fit model to a manufacturer to cause the manufacturer to produce a parametric physical product based on the parametric fit model having the plurality of fit model parameters.

22.0. Example Flow Chart for Custom Fitting Using Interpolation

Figure 6:
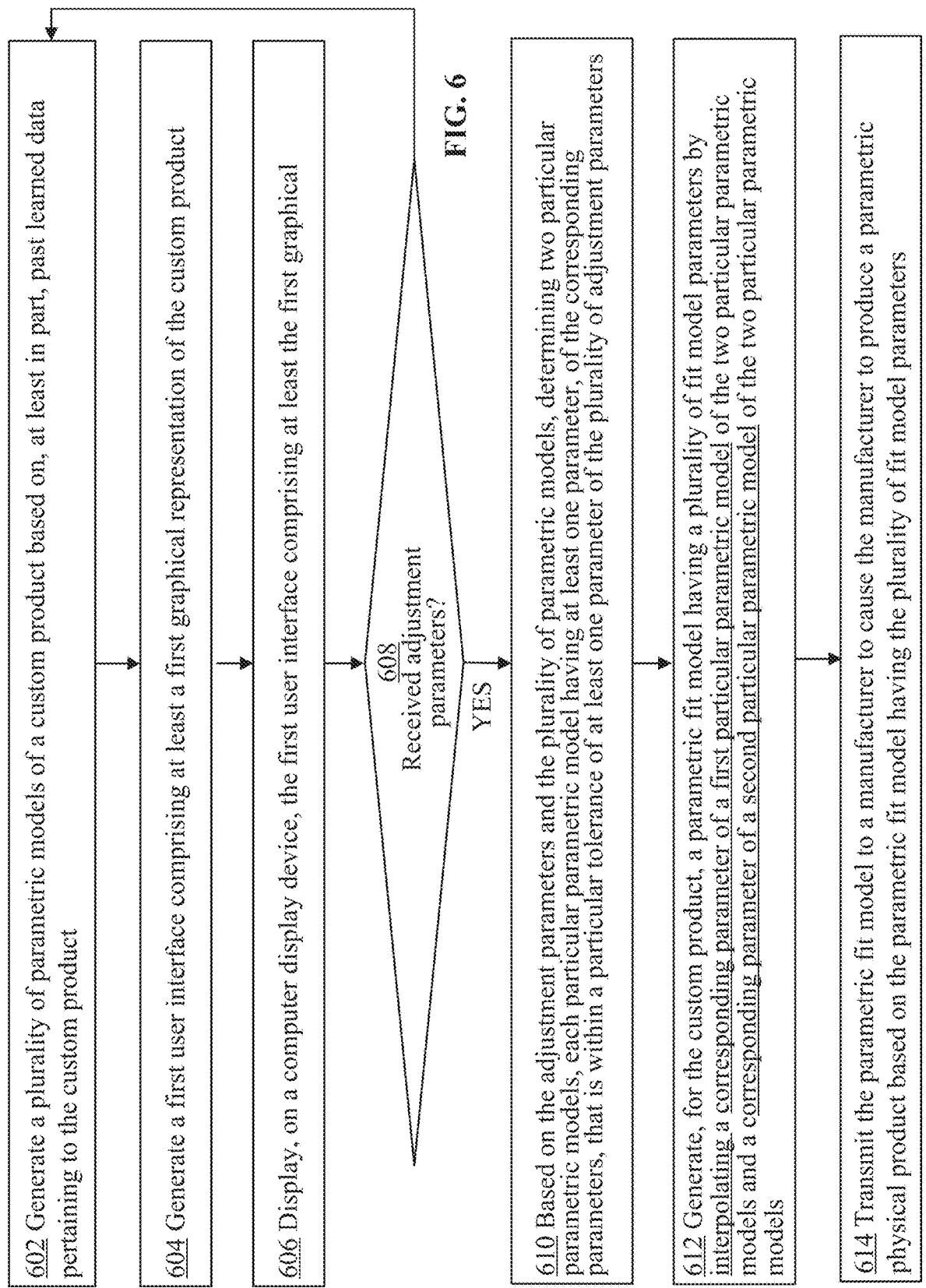
FIG. 6 is a flow chart depicting an example process for implementing a method for custom fitting and manufacturing parametric products using an interpolation.

FIG. 6 is a flow chart depicting an example process for implementing a method for custom fitting and manufacturing parametric products using an interpolation.

The example process described in FIG. 6 may be executed by one or more components of core services 16AA described in FIG. 1C. For simplicity of the description, it is assumed that the steps described in FIG. 6 are performed by a data processing module of a plurality of data processing modules of a core service.

In step 602, a core service generates a plurality of parametric models of a custom product based on, at least in part, past learned data pertaining to the custom product, each parametric model identified by a parametric model identifier and having a plurality of corresponding parameters. For example, suppose that the custom product is a t-shirt. Furthermore, suppose that the t-shirt, as a custom product, is offered by the collaboration platform in a variety of sizes, including XS, S, M, L, XL, 2XL, 3XL, and 4XL. Moreover, suppose that the core service generates the plurality of parametric models where each parametric model captures the dimensions and characteristics of the corresponding sizes XS, S, M, L, XL, 2XL, 3XL, and 4XL. Hence, the core service may generate a parametric model for an XS size t-shirt, a parametric model for an X size t-shirt, a parametric model for a M size t-shirt, a parametric model of an L size t-shirt, a parametric model of an XL size t-shirt, and so forth.

In step 604, once the plurality of parametric models is generated, the core service generates a first user interface comprising at least a first graphical representation of the custom product and, in step 606, the core service displays the first user interface on a computer display device. An example of the first user interface was described in FIG. 5.

In step 608, the core service tests whether adjustment parameters have been received. As described in FIG. 5, the adjustment parameters may be provided by a customer, an agent, or both, and may include indications as to how to improve the fit of the custom product for the customer. Examples of different adjustment parameters that may be provided for, for example a t-shirt, via a GUI is described in FIG. 1A3.

If it is determined that the core services have received via, for example, the first user interface, a plurality of adjustment parameters for improving a fit of the customizable product in relation to the user-specific data, then the core service performs step 610. Otherwise, the core service continues testing in step 602.

In step 610, the core service determines, based on the plurality of adjustment parameters and the plurality of parametric models, two particular parametric models, each particular parametric model having at least one parameter, of the corresponding parameters, that is within a particular tolerance of at least one parameter of the plurality of adjustment parameters. For example, referring to FIG. 4D, the core service may establish that the particular tolerance is computed based on an averaged difference between the different sizes for the custom product. Suppose that the adjustment parameters provided for, for example, a t-shirt. In this case, the particular tolerance may be computer as an averaged difference between an XS size of the t-shirt and a S size of the t-shirt, between a S size of the t-shirt and a M size of the t-shirt, between a M size of the t-shirt and a L size of the t-shirt, between L size of the t-shirt and an XL size of the t-shirt, between an XL size of the t-shirt and 2XL size of the t-shirt, between a 2XL size of the t-shirt and a 3XL size of the t-shirt, and between a 3XL size of a t-shirt and a 4XL size of a t-shirt.

In step 612, the core service generates, for the custom product, a parametric fit model having a plurality of fit model parameters. Each fit model parameter, of the plurality of fit model parameters, may be computed by interpolating a corresponding parameter of a first particular parametric model of the two particular parametric models and a corresponding parameter of a second particular parametric model of the two particular parametric models. For example, referring to FIG. 4D, if one of the adjustment parameters provided for, for example, a t-shirt pertains to a width of the t-shirt, and the user provided width appears to be between the width of a 3X size of a t-shirt and the width of a 4X size of a t-shirt, then a custom width may be computed by determining an average width between the width of a 3X size of a t-shirt and the width of a 4X size of a t-shirt.

A fit model parameter, of the plurality of fit model parameters of the parametric fit model, may be represented as a fit key-value pair. Examples of key-value pairs were described before.

In step 614, the core service transmits the parametric fit model to a manufacturer to cause the manufacturer to produce a parametric physical product based on the plurality of fit model parameters of the parametric fit model.

In some implementations, the parametric fit model, having the plurality of fit model parameters, is stored in association with a user profile of the user.

23.0. Example Flow Chart for Custom Fitting Using Interpolation Based on 2D Control Points FIG. 7 is a flow chart depicting an example process for implementing a method for custom fitting and manufacturing parametric products using a 2D interpolation between 2D control points of Splines/NURBS lines.

Figure 7:
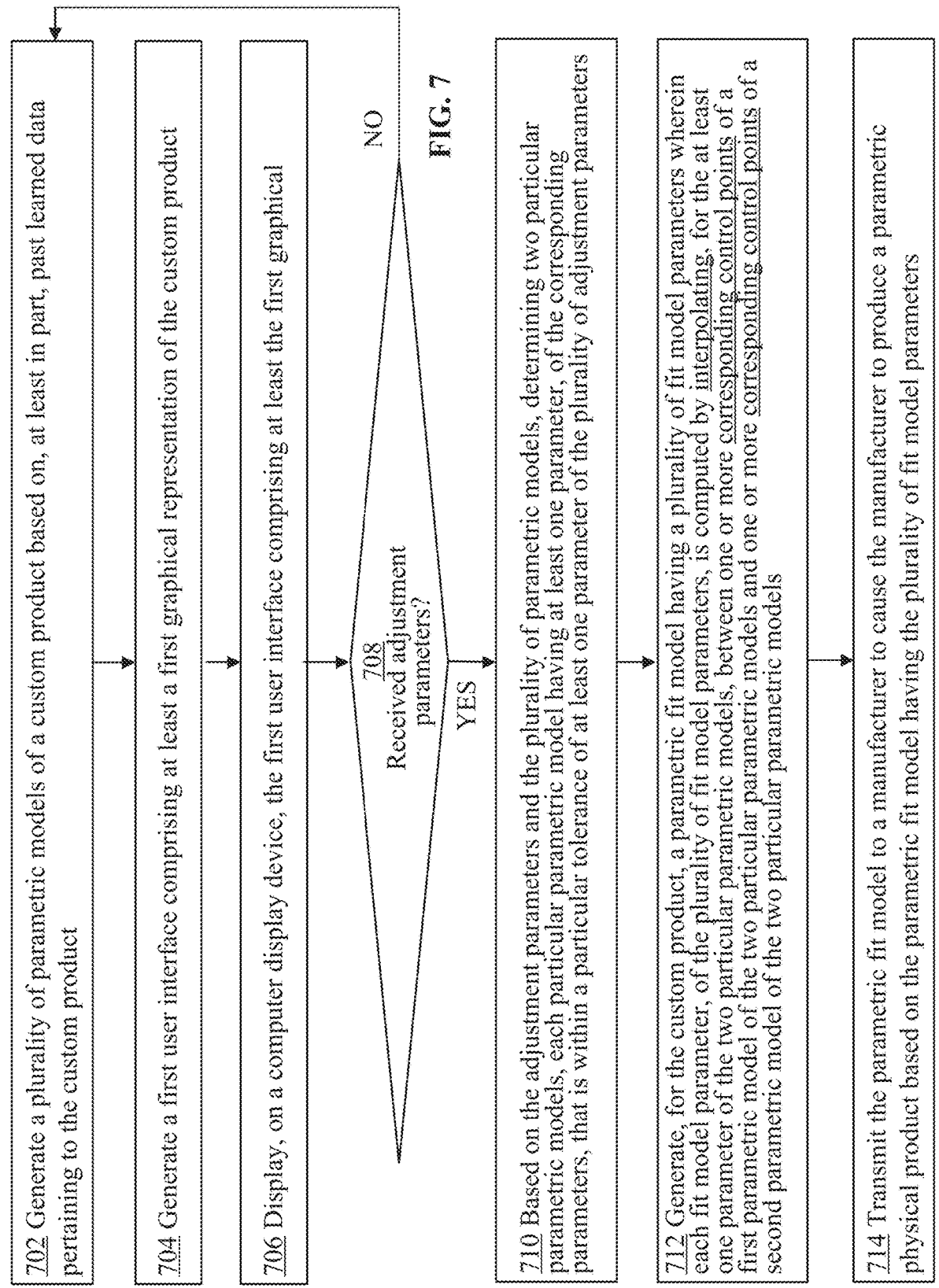
FIG. 7 is a flow chart depicting an example process for implementing a method for custom fitting and manufacturing parametric products using a 2D interpolation between 2D control points of Splines/NURBS lines.

The example process described in FIG. 7 may be executed by one or more components of core services 16 described in FIG. 2, and/or via a manual construction using service tools. For simplicity of the description, it is assumed that the steps described in FIG. 7 are performed by a core service.

In step 702, a core service generates a plurality of parametric models of a custom product based on, at least in part, past learned data pertaining to the custom product. Each parametric model can be identified by a parametric model identifier and may have a plurality of corresponding control points.

In step 704, the core service generates a first user interface comprising at least a first graphical representation of the custom product.

In step 706, the core service displays the first user interface on a computer display device. The first user interface may display, on the computer display device, the first graphical representation of the custom product as a visualization of the parametric model of the custom product. The visualization may show how the parametric physical product, manufactured based on the plurality of fit model parameters using a plurality of fit key-values of the parametric fit model, fits the user having the user-specific data.

Furthermore, the first user interface may also display one or more regions of the visualization of the parametric model of the custom product. A region of the one or more regions of the visualization may be adjustable using one or more functionalities of the first user interface. The one or more functionalities of the first user interface may allow adjusting a fit of the parametric physical product to the user having the user-specific data.

In some implementations, the core service receives, from the first user interface, a selection of a region, from the one or more regions, and an indication that the customized product should have either a looser fit or a tighter fit. Based on that information, the core service may start testing, in step 708, whether adjustment parameters have been received.

In step 708, the core service tests whether the core service has received, via the first user interface, a plurality of adjustment parameters for improving a fit of the custom product in relation to user-specific data. If the adjustment parameters have been received, then the core service proceeds to perform step 710. Otherwise, the core service continues testing in step 702.

In step 710, the core service determines, based on the plurality of adjustment parameters and the plurality of parametric models, two particular parametric models. Each particular parametric model may have at least one parameter, of the plurality of corresponding parameters, that is within a particular tolerance of at least one parameter of the plurality of adjustment parameters of a particular parametric model of the two particular parametric models.

In step 712, the core service generates, for the custom product, a parametric fit model having a plurality of fit model parameters. Each fit model parameter, of the plurality of fit model parameters, may be computed by interpolating, for the at least one parameter of the two particular parametric models, between one or more corresponding control points of a first parametric model of the two particular parametric models and one or more corresponding control points of a second parametric model of the two particular parametric models. A fit model parameter, of the plurality of fit model parameters of the parametric fit model, may be represented as a fit key-value pair.

In step 714, the core service transmits the parametric fit model to a manufacturer to cause the manufacturer to produce a parametric physical product based on the plurality of fit model parameters of the parametric fit model.

In some implementations, the parametric fit model, having the plurality of fit model parameters, is stored in association with a user profile of a user.

The core service may also perform the steps (not shown in FIG. 7) for enable collaboration between users. Those steps may include receiving a request to invite an agent to collaborate on adjusting the parametric fit model; generating, based on, at least in part, a plurality of fit parameters of the parametric fit model, a second graphical representation of the parametric physical product; generating a second user interface and displaying, on a user computer display device, the second user interface comprising at least the second graphical representation of the parametric physical product; and generating a third user interface and displaying, on an agent computer display device, the third user interface comprising at least the second graphical representation of the parametric physical product.

Upon receiving, via the second user interface, a plurality of user adjustment parameters for improving a fit of the parametric physical product and receiving, via the third user interface, a plurality of agent adjustment parameters for improving a fit of the parametric physical product, the core service may generate, based on the plurality of user adjustment parameters, the plurality of agent adjustment parameters and the plurality of fit parameters of the parametric physical product, an adjusted parametric fit model having a plurality of new fit model parameters. A new fit model parameter, of the plurality of new fit model parameters of the adjusted parametric fit model, may be represented as an adjusted fit key-value pair.

Once the adjusted parametric fit model is generated, the core service may transmit the adjusted parametric fit model to the manufacturer to cause the manufacturer to produce the parametric physical product based on a plurality of adjusted fit model parameters of the adjusted parametric fit model.

24.0. Example Flow Chart for Custom Fitting Using 3D Interpolation Based on 3D Control Points FIG. 8 is a flow chart depicting an example process for implementing a method for custom fitting and manufacturing parametric products using a 3D interpolation between 3D control points of Splines/NURBS surfaces.

Figure 8:
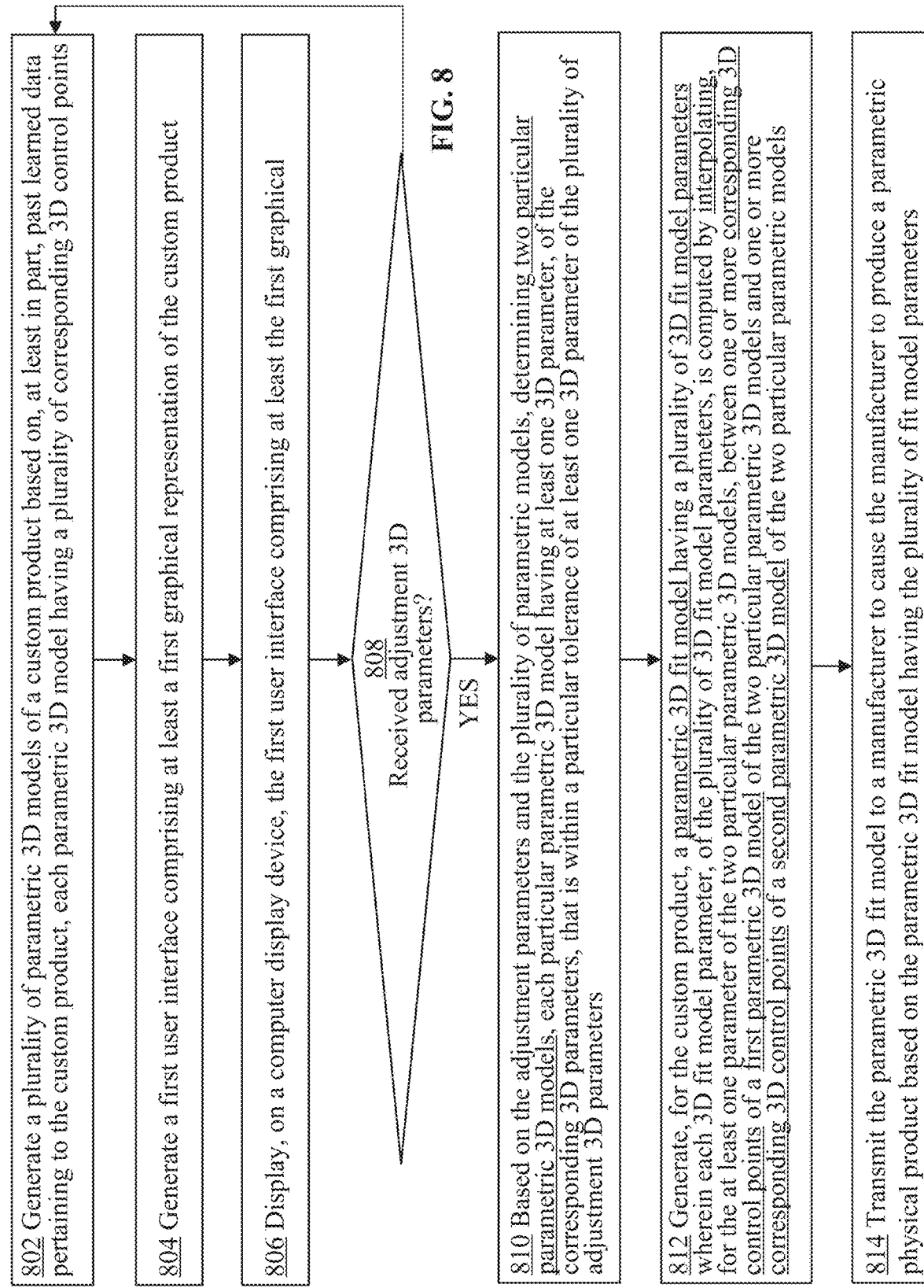
FIG. 8 is a flow chart depicting an example process for implementing a method for custom fitting and manufacturing parametric products using a 3D interpolation between 3D control points of Splines/NURBS surfaces.

The example process described in FIG. 8 may be executed by one or more components of core services 16 described in FIG. 2. For simplicity of the description, it is assumed that the steps described in FIG. 8 are performed by a core service.

In step 802, a core service generates a plurality of parametric 3D models of a custom product based on, at least in part, past learned data pertaining to the custom product. Each parametric 3D model may have a plurality of corresponding 3D control points.

In step 804, the core service generates a first user interface comprising at least a first graphical representation of the custom product.

In step 806, the core service displays the first user interface on a computer display device.

In step 808, the core service tests whether the core service has received, via the first user interface, a plurality of 3D adjustment parameters for improving a fit of the custom product in relation to user-specific data. If the 3D adjustment parameters have been received, then the core service proceeds to perform step 810. Otherwise, the core service continues testing in step 802.

In step 810, the core service determines, two particular parametric 3D models where each particular parametric 3D model having at least one 3D parameter, of the corresponding 3D parameters, that is within a particular tolerance of at least one 3D parameter of the plurality of adjustment 3D parameters In step 812, the core service generates, for the custom product, a parametric 3D fit model having a plurality of 3D fit model parameters. Each 3D fit model parameter, of the plurality of 3D fit model parameters, may be computed by interpolating, for the at least one parameter of the two particular parametric models, between one or more corresponding 3D control points of a first parametric 3D model of the two particular 3D parametric models and one or more corresponding 3D control points of a second parametric model of the two particular 3F parametric models. A 3D fit model parameter, of the plurality of 3D fit model parameters of the parametric 3D fit model, may be represented as a fit key-value pair.

In step 814, the core service transmits the parametric 3D fit model to a manufacturer to cause the manufacturer to produce a parametric physical product based on the plurality of 3D fit model parameters of the parametric 3D fit model.

In some implementations, the parametric 3D fit model, having the plurality of 3D fit model parameters, is stored in association with a user profile of a user.

The core service may also perform the steps (not shown in FIG. 8) for enable collaboration between users. Those steps may include receiving a request to invite an agent to collaborate on adjusting the parametric 3D fit model; generating, based on, at least in part, a plurality of fit parameters of the parametric 3D fit model, a second graphical representation of the parametric physical product; generating a second user interface and displaying, on a user computer display device, the second user interface comprising at least the second graphical representation of the parametric physical product; and generating a third user interface and displaying, on an agent computer display device, the third user interface comprising at least the second graphical representation of the parametric physical product.

Upon receiving, via the second user interface, a plurality of user adjustment parameters for improving a fit of the parametric physical product and receiving, via the third user interface, a plurality of agent adjustment parameters for improving a fit of the parametric physical product, the core service may generate, based on the plurality of user adjustment parameters, the plurality of agent adjustment parameters and the plurality of fit parameters of the parametric physical product, an adjusted parametric 3D fit model having a plurality of new fit model parameters. A new fit model parameter, of the plurality of new fit model parameters of the adjusted parametric 3D fit model, may be represented as an adjusted fit key-value pair.

Once the adjusted parametric 3D fit model is generated, the core service may transmit the adjusted parametric 3D fit model to the manufacturer to cause the manufacturer to produce the parametric physical product based on a plurality of adjusted fit model parameters of the adjusted parametric 3D fit model.

24.0. Example Flow Chart for Custom Fitting

Figure 9:
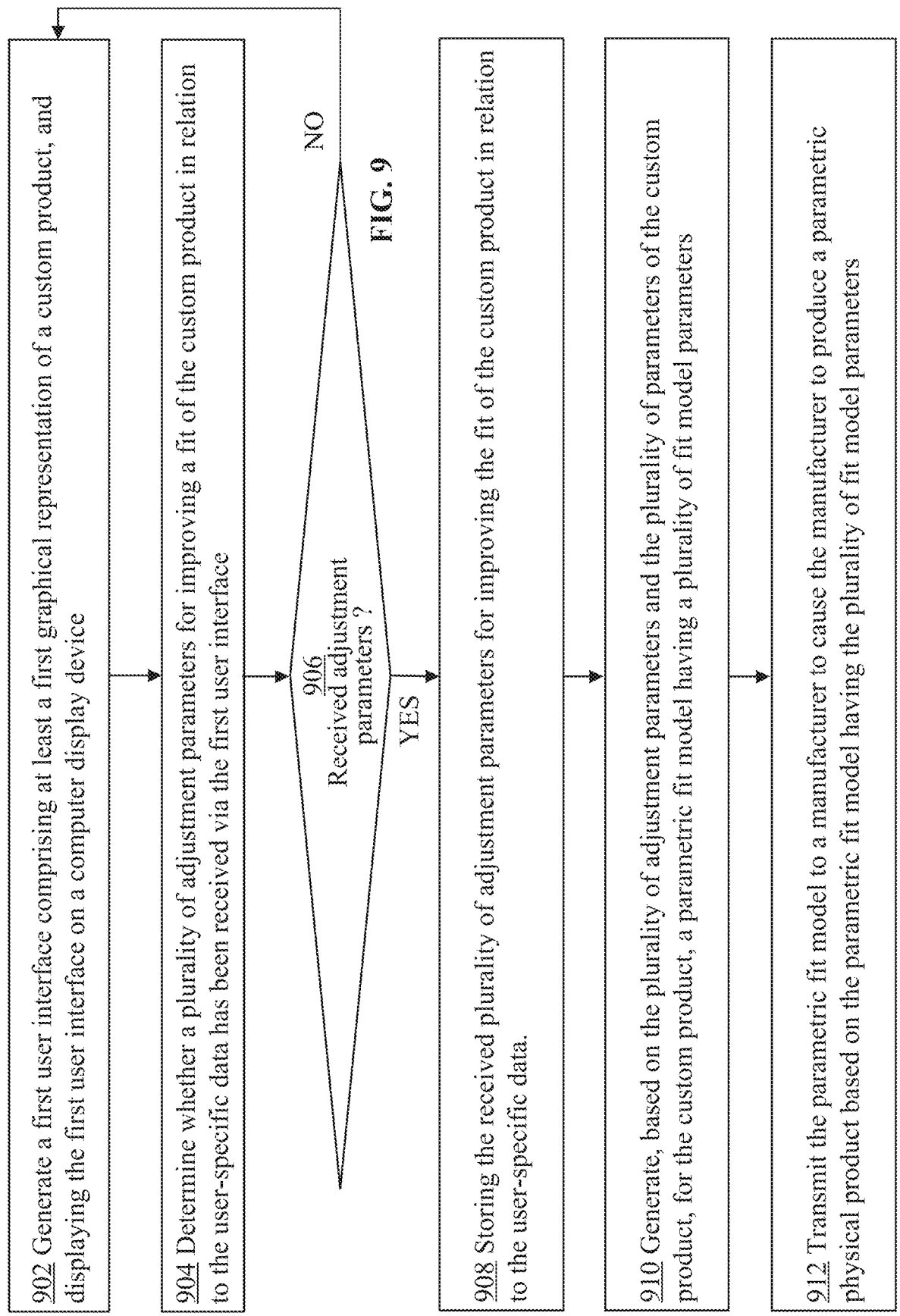
FIG. 9 is a flow chart depicting an example process for generating a user interface for implementing a method for custom fitting and manufacturing parametric products.
Figure 10:
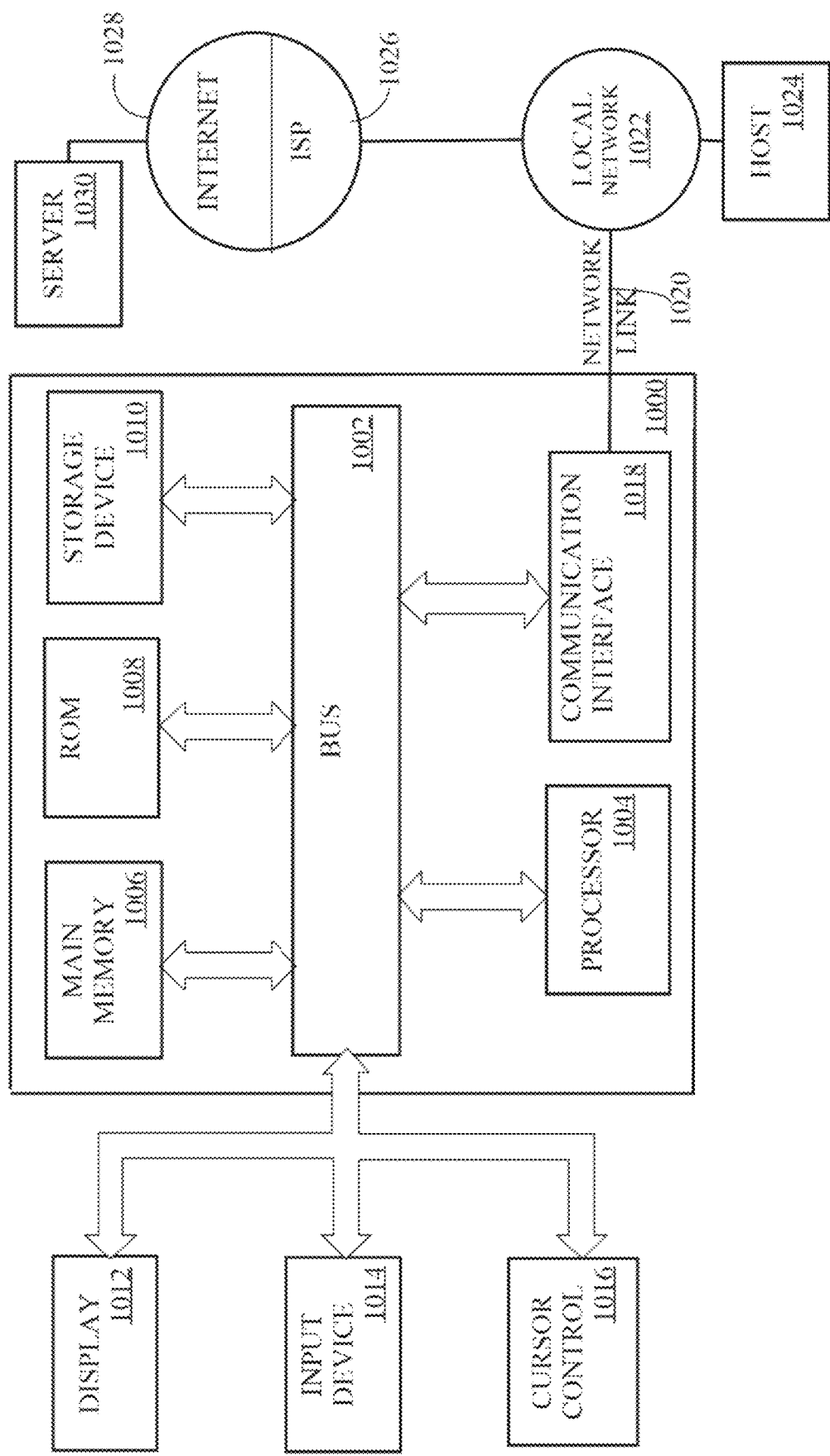
FIG. 10 is a block diagram that illustrates a computer system with which the techniques herein may be implemented.

FIG. 9 is a flow chart depicting an example process for generating a user interface for implementing a method for custom fitting and manufacturing parametric products. The example process described in FIG. 9 may be executed by one or more components of core services 16 described in FIG. 2. For simplicity of the description, it is assumed that the steps described in FIG. 10 are performed by a core service.

In step 902, the core service generates a first user interface comprising at least a first graphical representation of a custom product and displays the first user interface on a computer display device.

The first graphical representation of the custom product may be generated based on, at least in part, a plurality of parameters of the custom product.

The plurality of parameters of the custom product may be generated by translating a parametric model of the custom product to the plurality of parameters. Each parameter, of the plurality of parameters of the custom product, may be represented as a key-value pair. The parametric model of the custom product may be generated based on, at least in part, past learned data pertaining to the custom product and user-specific data of a user.

In some implementations, the first user interface displays, on the computer display device, the first graphical representation of the custom product as a visualization of a parametric model of the custom product showing how the parametric physical product fits the user having corresponding user-specific data. The parametric physical product may be a product manufactured based on a plurality of fit model parameters using a plurality of fit key-value pairs of the parametric fit model. A fit key-value pair, of the plurality of fit key-value pairs, is a data structure that includes an attribute key and a corresponding attribute value. Examples of key-value pairs were described above.

In step 904, the core service determines whether a plurality of adjustment parameters for improving a fit of the custom product in relation to the user-specific data has been received via the first user interface.

If, in step 906, the core service determines that the adjustment parameters have been received, then the core service proceeds to perform step 908. Otherwise, the core service continues testing in step 902.

In step 908, the core service stores the received plurality of adjustment parameters for improving a fit of the custom product in relation to the user-specific data.

In step 910, the core service generates, based on the plurality of adjustment parameters and the plurality of parameters of the custom product, a parametric fit model having a plurality of fit model parameters for the custom product. A fit model parameter, of the plurality of fit model parameters of the parametric fit model, may be represented as a fit key-value pair;

In step 912, the core service transmits the parametric fit model to a manufacturer to cause the manufacturer to produce a parametric physical product based on the parametric fit model having the plurality of fit model parameters.

The GUI managed by the core service may also be configured to facilitate collaboration between a user and, for example, user's colleagues, agents, designers, and the like.

For example, the core service may receive a request to invite an agent to collaborate on adjusting the parametric fit model. Based on a plurality of fit parameters of the parametric fit model, the core service may generate a second graphical representation of the parametric physical product. Then, the core service may generate a second user interface and display, on a user computer display device, the second user interface comprising at least the second graphical representation of the parametric physical product.

Then, the core service may generate a third user interface and display, on an agent computer display device, the third user interface comprising at least the second graphical representation of the parametric physical product.

Upon receiving, via the second user interface, a plurality of user adjustment parameters for improving a fit of the parametric physical product, and upon receiving, via the third user interface, a plurality of agent adjustment parameters for improving a fit of the parametric physical product, the core service may generate an adjusted parametric fit model. The adjusted parametric fit model may be generated based on the plurality of user adjustment parameters, the plurality of agent adjustment parameters and the plurality of fit parameters of the parametric physical product. The adjusted parametric fit model may have a plurality of new fit model parameters. A new fit model parameter, of the plurality of new fit model parameters of the adjusted parametric fit model, may be represented as an adjusted fit key-value pair.

Then, the core service may send the adjusted parametric fit model to the manufacturer to cause the manufacturer to produce the parametric physical product based on a plurality of adjusted fit model parameters of the adjusted parametric fit model.

Usually, the process of receiving the user adjustment parameters and/or receiving the agent adjustment parameters may be repeated many times until, for example, the user is satisfied with the fit.

Once the user is satisfied with the fit of the custom product, the core service may send the adjusted parametric fit model to the manufacturer to cause the manufacturer to produce the parametric physical product based on a plurality of adjusted fit model parameters of the adjusted parametric fit model.

25.0. Implementations Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

FIG. 10 is a block diagram that depicts an example computer system 1000 upon which embodiments may be implemented. Computer system 1000 includes a bus 1002 or other communication mechanism for communicating information, and a processor 1004 coupled with bus 1002 for processing information. Computer system 1000 also includes a main memory 1006, such as a random-access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. Although bus 1002 is illustrated as a single bus, bus 1002 may comprise one or more buses. For example, bus 1002 may include without limitation a control bus by which processor 1004 controls other devices within computer system 1000, an address bus by which processor 1004 specifies memory locations of instructions for execution, or any other type of bus for transferring data or signals between components of computer system 1000.

An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input-device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic or computer software which, in combination with the computer system, causes or programs computer system 1000 to be a special-purpose machine. According to one embodiment, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1000, various computer-readable media are involved, for example, in providing instructions to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated service digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic, or optical signals that carry digital data streams.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A method for custom fitting and manufacturing parametric products, the method comprising:
   generating a plurality of parametric 3D models of a custom product based on, at least in part, past learned data pertaining to the custom product, each parametric 3D model having a plurality of corresponding 3D control points;
   generating a first user interface comprising at least a first graphical representation of the custom product, and displaying the first user interface on a computer display device;

receiving, via the first user interface, a plurality of adjustment 3D parameters for improving a fit of the custom product in relation to user-specific data;

based on the plurality of adjustment 3D parameters and the plurality of parametric 3D models, determining two particular parametric 3D models of the plurality of parametric 3D models, each having at least one 3D parameter, of the plurality of corresponding 3D parameters, that is within a particular tolerance of at least one 3D parameter of the plurality of adjustment 3D parameters;

generating, for the custom product, a parametric 3D fit model having a plurality of 3D fit model parameters;

wherein each 3D fit model parameter, of the plurality of 3D fit model parameters, is computed by interpolating, for the at least one parameter of the two particular parametric 3D models, between a plurality of corresponding 3D control points of a first parametric 3D model of the two particular 3D parametric models and a plurality of corresponding 3D control points of a second parametric 3D model of the two particular parametric 3D models;

wherein a 3D fit model parameter, of the plurality of 3D fit model parameters of the parametric 3D fit model, is represented as a fit key-value pair;

sending the parametric 3D fit model to a manufacturer to cause the manufacturer to produce a parametric physical product based on the plurality of 3D fit model parameters of the parametric 3D fit model.

2. The method of claim 1, further comprising storing the parametric 3D fit model, having the plurality of 3D fit model parameters, in association with a user profile of a user.

3. The method of claim 2, further comprising:

receiving a request to invite an agent to collaborate on adjusting the parametric 3D fit model;

based on, at least in part, a plurality of fit parameters of the parametric 3D fit model, generating a second graphical representation of the parametric physical product;

generating a second user interface and displaying, on a user computer display device, the second user interface comprising at least the second graphical representation of the parametric physical product;

generating a third user interface and displaying, on an agent computer display device, the third user interface comprising at least the second graphical representation of the parametric physical product;

receiving, via the second user interface, a plurality of user adjustment parameters for improving a fit of the parametric physical product;

receiving, via the third user interface, a plurality of agent adjustment parameters for improving a fit of the parametric physical product;

based on the plurality of user adjustment parameters, the plurality of agent adjustment parameters and the plurality of fit parameters of the parametric physical product, generating, for the custom product, an adjusted parametric 3D fit model having a plurality of new 3D fit model parameters;

wherein a new 3D fit model parameter, of the plurality of new 3D fit model parameters of the adjusted parametric 3D fit model, is represented as an adjusted fit key-value pair;

sending the adjusted parametric 3D fit model to the manufacturer to cause the manufacturer to produce the parametric physical product based on a plurality of adjusted 3D fit model parameters of the adjusted parametric 3D fit model.

4. The method of claim 2, further comprising:

receiving a request to adjust the parametric 3D fit model;

based on, at least in part, a plurality of fit parameters of the parametric 3D fit model, generating a fourth graphical representation of the parametric physical product;

generating a fourth user interface and displaying, on a user computer display device, the fourth user interface comprising at least the fourth graphical representation of the parametric physical product;

receiving, via the fourth user interface, a plurality of user adjustment parameters for improving a fit of the parametric physical product;

based on the plurality of user adjustment parameters and the plurality of fit parameters of the parametric physical product, generating, for the custom product, an adjusted parametric 3D fit model having a plurality of new 3D fit model parameters;

wherein a new 3D fit model parameter, of the plurality of new 3D fit model parameters of the adjusted parametric 3D fit model, is represented as an adjusted fit key-value pair;

sending the adjusted parametric 3D fit model to the manufacturer to cause the manufacturer to produce the parametric physical product based on a plurality of adjusted 3D fit model parameters of the parametric 3D fit model.

5. The method of claim 1, wherein the first user interface displays, on the computer display device, the first graphical representation of the custom product as a visualization of the parametric model of the custom product showing how the parametric physical product, manufactured based on the plurality of 3D fit model parameters using a plurality of fit key-values of the parametric 3D fit model, fits the user having the user-specific data;

wherein the key-value pair is a data structure that includes an attribute key and a corresponding attribute value.

6. The method of claim 5, wherein the first user interface further displays one or more regions of the visualization of the parametric model of the custom product;

wherein a region of the one or more regions of the visualization is adjustable using one or more functionalities of the first user interface;

wherein the one or more functionalities of the first user interface allow adjusting a fit of the parametric physical product to the user having the user-specific data.

7. The method of claim 6, further comprising: receiving, from the first user interface, a selection of a region, from the one or more regions, and an indication that the customized product should have either a looser fit or a tighter fit.

8. A non-transitory computer-readable medium storing one or more instructions, which, when executed by one or more processors, cause the one or more processors to perform:

generating a plurality of parametric models of a custom product based on, at least in part, past learned data pertaining to the custom product, each parametric model identified by a parametric model identifier and having a plurality of corresponding control points;

generating a first user interface comprising at least a first graphical representation of the custom product, and displaying the first user interface on a computer display device;

receiving, via the first user interface, a plurality of adjustment parameters for improving a fit of the custom product in relation to user-specific data;

based on the plurality of adjustment parameters and the plurality of parametric models, determining two particular parametric models, each having at least one parameter, of the plurality of corresponding parameters, that is within a particular tolerance of at least one parameter of the plurality of adjustment parameters of a particular parametric model of the two particular parametric models;

generating, for the custom product, a parametric 3D fit model having a plurality of 3D fit model parameters;

wherein each 3D fit model parameter, of the plurality of 3D fit model parameters, is computed by interpolating, for the at least one parameter of the two particular parametric models, between one or more corresponding control points of a first parametric model of the two particular parametric models and one or more corresponding control points of a second parametric model of the two particular parametric models;

wherein a 3D fit model parameter, of the plurality of 3D fit model parameters of the parametric 3D fit model, is represented as a fit key-value pair;

transmitting the parametric 3D fit model to a manufacturer to cause the manufacturer to produce a parametric physical product based on the plurality of 3D fit model parameters of the parametric 3D fit model.

9. The non-transitory computer-readable medium of claim 8, storing additional instructions for: storing the parametric 3D fit model, having the plurality of 3D fit model parameters, in association with a user profile of a user.

10. The non-transitory computer-readable medium of claim 9, storing additional instructions for:
receiving a request to invite an agent to collaborate on adjusting the parametric 3D fit model;
based on, at least in part, a plurality of fit parameters of the parametric 3D fit model, generating a second graphical representation of the parametric physical product;
generating a second user interface and displaying, on a user computer display device, the second user interface comprising at least the second graphical representation of the parametric physical product;
generating a third user interface and displaying, on an agent computer display device, the third user interface comprising at least the second graphical representation of the parametric physical product;
receiving, via the second user interface, a plurality of user adjustment parameters for improving a fit of the parametric physical product;
receiving, via the third user interface, a plurality of agent adjustment parameters for improving a fit of the parametric physical product;
based on the plurality of user adjustment parameters, the plurality of agent adjustment parameters and the plurality of fit parameters of the parametric physical product, generating, for the custom product, an adjusted parametric 3D fit model having a plurality of new 3D fit model parameters;
wherein a new 3D fit model parameter, of the plurality of new 3D fit model parameters of the adjusted parametric 3D fit model, is represented as an adjusted fit key-value pair;
sending the adjusted parametric 3D fit model to the manufacturer to cause the manufacturer to produce the parametric physical product based on a plurality of adjusted 3D fit model parameters of the adjusted parametric 3D fit model.

11. The non-transitory computer-readable medium of claim 9, storing additional instructions for:
receiving a request to adjust the parametric 3D fit model;
based on, at least in part, a plurality of fit parameters of the parametric 3D fit model, generating a fourth graphical representation of the parametric physical product;
generating a fourth user interface and displaying, on a user computer display device, the fourth user interface comprising at least the fourth graphical representation of the parametric physical product;
receiving, via the fourth user interface, a plurality of user adjustment parameters for improving a fit of the parametric physical product;
based on the plurality of user adjustment parameters and the plurality of fit parameters of the parametric physical product, generating, for the custom product, an adjusted parametric 3D fit model having a plurality of new 3D fit model parameters;
wherein a new 3D fit model parameter, of the plurality of new 3D fit model parameters of the adjusted parametric 3D fit model, is represented as an adjusted fit key-value pair;
sending the adjusted parametric 3D fit model to the manufacturer to cause the manufacturer to produce the parametric physical product based on a plurality of adjusted 3D fit model parameters of the parametric 3D fit model.

12. The non-transitory computer-readable medium of claim 8, wherein the first user interface displays, on the computer display device, the first graphical representation of the custom product as a visualization of the parametric model of the custom product showing how the parametric physical product, manufactured based on the plurality of 3D fit model parameters using a plurality of fit key-values of the parametric 3D fit model, fits the user having the user-specific data;
wherein the key-value pair is a data structure that includes an attribute key and a corresponding attribute value.

13. The non-transitory computer-readable medium of claim 12, wherein the first user interface further displays one or more regions of the visualization of the parametric model of the custom product;
wherein a region of the one or more regions of the visualization is adjustable using one or more functionalities of the first user interface;
wherein the one or more functionalities of the first user interface allow adjusting a fit of the parametric physical product to the user having the user-specific data.

14. The non-transitory computer-readable medium of claim 13, storing additional instructions for: receiving, from the first user interface, a selection of a region, from the one or more regions, and an indication that the customized product should have either a looser fit or a tighter fit.

15. A custom product computer system generator comprising:
a memory unit;
one or more processors; and
a custom product computer storing one or more instructions, which, when executed by one or more processors, cause the one or more processors to perform:
generating a plurality of parametric models of a custom product based on, at least in part, past learned data pertaining to the custom product, each parametric model identified by a parametric model identifier and having a plurality of corresponding control points;

generating a first user interface comprising at least a first graphical representation of the custom product, and displaying the first user interface on a computer display device;

receiving, via the first user interface, a plurality of adjustment parameters for improving a fit of the custom product in relation to user-specific data;

based on the plurality of adjustment parameters and the plurality of parametric models, determining two particular parametric models, each having at least one parameter, of the plurality of corresponding parameters, that is within a particular tolerance of at least one parameter of the plurality of adjustment parameters of a particular parametric model of the two particular parametric models;

generating, for the custom product, a parametric 3D fit model having a plurality of 3D fit model parameters;

wherein each 3D fit model parameter, of the plurality of 3D fit model parameters, is computed by interpolating, for the at least one parameter of the two particular parametric models, between one or more corresponding control points of a first parametric model of the two particular parametric models and one or more corresponding control points of a second parametric model of the two particular parametric models;

wherein a 3D fit model parameter, of the plurality of 3D fit model parameters of the parametric 3D fit model, is represented as a fit key-value pair;

transmitting the parametric 3D fit model to a manufacturer to cause the manufacturer to produce a parametric physical product based on the plurality of 3D fit model parameters of the parametric 3D fit model.

16. The custom product computer system generator of claim 15, storing additional instructions for: storing the parametric 3D fit model, having the plurality of 3D fit model parameters, in association with a user profile of a user.

17. The custom product computer system generator of claim 16, storing additional instructions for:
receiving a request to invite an agent to collaborate on adjusting the parametric 3D fit model;
based on, at least in part, a plurality of fit parameters of the parametric 3D fit model, generating a second graphical representation of the parametric physical product;
generating a second user interface and displaying, on a user computer display device, the second user interface comprising at least the second graphical representation of the parametric physical product;
generating a third user interface and displaying, on an agent computer display device, the third user interface comprising at least the second graphical representation of the parametric physical product;
receiving, via the second user interface, a plurality of user adjustment parameters for improving a fit of the parametric physical product;
receiving, via the third user interface, a plurality of agent adjustment parameters for improving a fit of the parametric physical product;
based on the plurality of user adjustment parameters, the plurality of agent adjustment parameters and the plurality of fit parameters of the parametric physical product, generating, for the custom product, an adjusted parametric 3D fit model having a plurality of new 3D fit model parameters;
wherein a new 3D fit model parameter, of the plurality of new 3D fit model parameters of the adjusted parametric 3D fit model, is represented as an adjusted fit key-value pair;
sending the adjusted parametric 3D fit model to the manufacturer to cause the manufacturer to produce the parametric physical product based on a plurality of adjusted 3D fit model parameters of the adjusted parametric 3D fit model.

18. The custom product computer system generator of claim 16, storing additional instructions for:
receiving a request to adjust the parametric 3D fit model;
based on, at least in part, a plurality of fit parameters of the parametric 3D fit model, generating a fourth graphical representation of the parametric physical product;
generating a fourth user interface and displaying, on a user computer display device, the fourth user interface comprising at least the fourth graphical representation of the parametric physical product;
receiving, via the fourth user interface, a plurality of user adjustment parameters for improving a fit of the parametric physical product;
based on the plurality of user adjustment parameters and the plurality of fit parameters of the parametric physical product, generating, for the custom product, an adjusted parametric 3D fit model having a plurality of new 3D fit model parameters;
wherein a new 3D fit model parameter, of the plurality of new 3D fit model parameters of the adjusted parametric 3D fit model, is represented as an adjusted fit key-value pair;
sending the adjusted parametric 3D fit model to the manufacturer to cause the manufacturer to produce the parametric physical product based on a plurality of adjusted 3D fit model parameters of the parametric 3D fit model.

19. The custom product computer system generator of claim 15, wherein the first user interface displays, on the computer display device, the first graphical representation of the custom product as a visualization of the parametric model of the custom product showing how the parametric physical product, manufactured based on the plurality of 3D fit model parameters using a plurality of fit key-values of the parametric 3D fit model, fits the user having the user-specific data;
wherein the key-value pair is a data structure that includes an attribute key and a corresponding attribute value.

20. The custom product computer system generator of claim 19, wherein the first user interface further displays one or more regions of the visualization of the parametric model of the custom product;
wherein a region of the one or more regions of the visualization is adjustable using one or more functionalities of the first user interface;
wherein the one or more functionalities of the first user interface allow adjusting a fit of the parametric physical product to the user having the user-specific data.

* * * * *